US012633840B2

(12) United States Patent
Sato

(10) Patent No.: US 12,633,840 B2
(45) Date of Patent: May 19, 2026

(54) SEMICONDUCTOR DEVICE

(71) Applicant: FUJI ELECTRIC CO., LTD.,
Kawasaki (JP)

(72) Inventor: Tadahiko Sato, Matsumoto-city (JP)

(73) Assignee: FUJI ELECTRIC CO., LTD.,
Kawasaki (JP)

( * ) Notice: Subject to any disclaimer, the term of this
patent is extended or adjusted under 35
U.S.C. 154(b) by 263 days.

(21) Appl. No.: 18/606,242

(22) Filed: Mar. 15, 2024

(65) Prior Publication Data

US 2024/0223101 A1      Jul. 4, 2024

Related U.S. Application Data

(63) Continuation of application No.
PCT/JP2023/007947, filed on Mar. 3, 2023.

(30) Foreign Application Priority Data

Apr. 13, 2022    (JP) ................................. 2022-065969

(51) Int. Cl.
H02M 7/00          (2006.01)
H02M 7/537          (2006.01)
(52) U.S. Cl.
CPC ........... H02M 7/003 (2013.01); H02M 7/537
(2013.01)
(58) Field of Classification Search
CPC .............................. H02M 7/003; H02M 7/537
USPC ........................................................ 363/121
See application file for complete search history.

(56) References Cited

U.S. PATENT DOCUMENTS

| 10,212,838 | B2 | 2/2019 | McPherson et al. |
| 2007/0252169 | A1 | 11/2007 | Tokuyama et al. |
| 2012/0300522 | A1* | 11/2012 | Tokuyama ........ H01L 23/49575 |
| | | | 257/691 |
| 2017/0077044 | A1* | 3/2017 | Soyano ................. H02M 7/003 |
| 2020/0266240 | A1 | 8/2020 | Morisaki et al. |

(Continued)

FOREIGN PATENT DOCUMENTS

| EP | 3442020 A1 | 2/2019 |
| JP | 2007-299781 A | 11/2007 |

(Continued)

OTHER PUBLICATIONS

International Search Report for PCT/JP2023/007947, mailed on
May 9, 2023.
Written Opinion for PCT/JP2023/007947, mailed on May 9, 2023.

*Primary Examiner* — Yemane Mehari
(74) *Attorney, Agent, or Firm* — Rabin & Berdo, P.C.

(57) ABSTRACT

A semiconductor device includes a group of semiconductor
elements each having a collector electrode and emitter
electrode, a conductive plate electrically connected to the
collector electrodes, and a case housing these. The semi-
conductor device further includes an OUT terminal and a P
terminal respectively extending across the case so as to be
disposed inside and outside the case. The OUT terminal
includes an extension portion which includes a branch base
portion extending across one side of the case toward the
inside of the case and a pair of branch portions branching off
from the branch base portion and being electrically con-
nected to the emitter electrodes. The P terminal includes an
extension portion sandwiched between the pair of branch
portions, the P terminal being electrically connected to the
conductive plate.

26 Claims, 30 Drawing Sheets

(56)                References Cited

U.S. PATENT DOCUMENTS

| | | | |
|---|---|---|---|
| 2020/0395344 A1* | 12/2020 | Horie | .................... H02M 7/003 |
| 2021/0280549 A1* | 9/2021 | Kato | ....................... H01L 24/41 |
| 2021/0280550 A1 | 9/2021 | Kato et al. | |
| 2021/0280555 A1 | 9/2021 | Murata et al. | |
| 2021/0280556 A1 | 9/2021 | Kato et al. | |

FOREIGN PATENT DOCUMENTS

| | | | |
|---|---|---|---|
| JP | 2020-504459 | A | 2/2020 |
| JP | 2021-141219 | A | 9/2021 |
| JP | 2021-141220 | A | 9/2021 |
| JP | 2021-141221 | A | 9/2021 |
| JP | 2021-141222 | A | 9/2021 |
| WO | 2017/163612 | A1 | 9/2017 |
| WO | 2018/193929 | A1 | 10/2018 |
| WO | 2020/054806 | A1 | 3/2020 |
| WO | 2020/071098 | A1 | 4/2020 |

* cited by examiner

SEMICONDUCTOR DEVICE

CROSS-REFERENCE TO RELATED APPLICATION

This application is a continuation application of International Application PCT/JP2023/007947 filed on Mar. 3, 2023, which designated the U.S., which claims priority to Japanese Patent Application No. 2022-065969, filed on Apr. 13, 2022, the entire contents of which are incorporated herein by reference.

BACKGROUND OF THE INVENTION

1. Field of the Invention

The embodiments discussed herein relate to a semiconductor device.

2. Background of the Related Art

For a semiconductor device that includes a circuit board on which semiconductor elements are disposed, and an output (OUT) terminal, positive electrode (P) terminal, and negative electrode (N) terminal that are connected to the circuit board, there is known a technique for reducing the inductance between the P and N terminals in view of surge voltage suppression.

For example, with respect to a power module in which a current flows from a V+ terminal to a V− terminal through a path passing through a part of a power substrate and across power devices and then passing through power devices to another part of the power substrate, there is known a technique in which a current loop is formed by providing the V− terminal higher than the V+ terminal, so as to reduce inductance with magnetic flux cancellation (Japanese Laid-open Patent Publication No. 2020-504459).

Further, there is known a power module that includes a circuit board including a conductive layer on which a group of semiconductor elements in the upper arm of an inverter circuit is disposed and to which a positive electrode terminal is connected, a conductive layer on which a group of semiconductor elements in the lower arm of the inverter circuit is disposed and to which an output terminal is connected, and a conductive layer to which a negative electrode terminal is connected. For such a power module, there is known a technique in which a main current flowing from the positive electrode terminal is divided into two, which are made to flow to the conductive layer on which the group of semiconductor elements in the upper arm is disposed, then flow through the group of semiconductor elements in the upper arm to the conductive layer on which the group of semiconductor elements in the lower arm is disposed, and then flow through the group of semiconductor elements in the lower arm to the conductive layer to which the negative electrode terminal is connected. For this power module, there is also known a technique in which the circuit board is designed to have a layout such that the flow paths of the main current in the upper and lower arms are parallel to each other, are adjacent to each other, and are in opposite directions, in order to reduce the inductance between the P and N terminals (Japanese Laid-open Patent Publication No. 2021-141219, Japanese Laid-open Patent Publication No. 2021-141221, Japanese Laid-open Patent Publication No. 2021-141222).

Still further, there is known a semiconductor module in which semiconductor switching elements of an upper arm and semiconductor switching elements of a lower arm are disposed on collector patterns provided on insulating plates in such a manner that their collectors are disposed on the collector patterns and their emitters are connected to emitter patterns provided on the insulating plates with emitter wires. With regard to such a semiconductor module, there is known a technique in which a positive electrode is connected to the collector patterns in the upper arm, a negative electrode is connected to the emitter patterns in the lower arm, and a part of the positive electrode that is parallel to the insulating plates coincides in position with a part of the negative electrode that is parallel to the insulating plates, as seen in the vertical direction (International Publication Pamphlet No. WO 2018/193929).

Still further, there is known a power semiconductor module that is configured using two circuit boards and that includes an external lead terminal connected to a high-potential metal pattern of one circuit board, an external lead terminal connected to a low-potential metal pattern of the other circuit board, and an external lead terminal connected to a low-potential metal pattern of the one circuit board and a high-potential metal pattern of the other circuit board. For such a power semiconductor module, there is known a technique in which the positions at which the external lead terminals are respectively connected to the high-potential and low-potential metal patterns are set adjacent to each other within a range causing no problem in mounting technology and in insulation design, so as to reduce the loop area of a path through which a current flows from the high-potential metal pattern to the low-potential metal pattern and thus to achieve low inductance in the current path (International Publication Pamphlet No. WO 2017/163612).

In a semiconductor device that has an OUT terminal, a P terminal, and an N terminal as main current wiring members, it is effective to reduce the inductance between the P and N terminals in view of surge voltage suppression. However, it is difficult to reduce the inductance between the P and N terminals sufficiently and to cause semiconductor elements forming the semiconductor device to fully exert their performance, depending on the layout of the main current wiring members including the OUT terminal, P terminal, and N terminal and the layout of conductive plates to which the main current wiring members, as well as the semiconductor elements, are connected. The conventional techniques may fail to achieve a high-performance semiconductor device that is able to sufficiently reduce the inductance between P and N terminals and fully exert the performance of semiconductor elements.

SUMMARY OF THE INVENTION

According to an aspect, there is provided a semiconductor device, including: a plurality of semiconductor elements each including a first electrode on a first principal surface thereof and a second electrode on a second principal surface thereof opposite to the first principal surface; a conductive plate electrically connected to the first electrodes of the plurality of semiconductor elements; a case having one side and another side opposite to the one side, and housing the plurality of semiconductor elements and the conductive plate; a first main current wiring member extending so as to be disposed inside and outside the case, the first main current wiring member including a first extension portion including a branch base portion extending from outside of the case across the one side of the case toward inside of the case and a first branch portion and a second branch portion branching off from the branch base portion, the first and second branch portions being electrically connected to the second electrodes of the plurality of semiconductor elements; and a second main current wiring member extending across the case so as to be disposed inside and outside the case, the second main wiring member including a second extension portion sandwiched between the first branch portion and the second branch portion inside the case the second main wiring member being electrically connected to the conductive plate.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

First Embodiment

Figure 1:
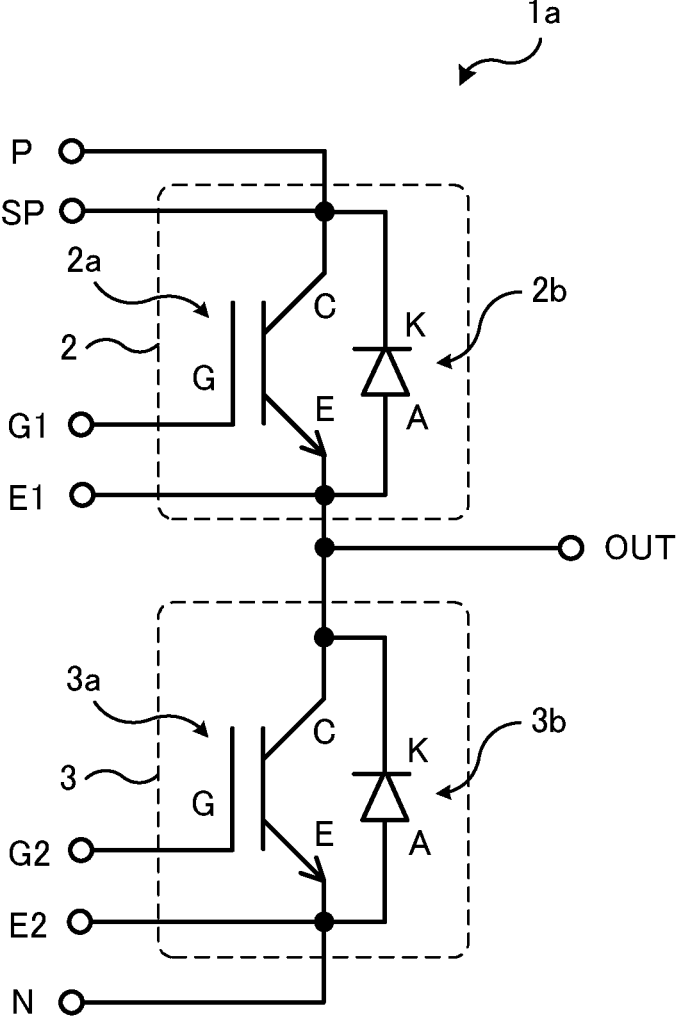
FIG. 1 illustrates a first example of a circuit diagram of a semiconductor device.

FIG. 1 is a first example of a circuit diagram of a semiconductor device.

FIG. 1 illustrates a circuit diagram of a semiconductor device 1a that forms an inverter circuit. The semiconductor device 1a includes a semiconductor element 2 and a semiconductor element 3, which are connected in series. Here, a switch element such as an insulated gate bipolar transistor (IGBT) or a metal-oxide-semiconductor field-effect transistor (MOSFET) is used in each of the semiconductor element 2 and semiconductor element 3. A diode element such as a free-wheeling diode (FWD) or a Schottky barrier diode (SBD) may be connected to each switch element used in the semiconductor element 2 and semiconductor element 3. Referring to the example of FIG. 1, a reverse conducting (RC)-IGBT is used as the semiconductor element 2, in which an IGBT 2a and an FWD 2b are connected. Likewise, an RC-IGBT is used as the semiconductor element 3, in which an IGBT 3a and an FWD 3b are connected.

In the semiconductor element 2, the collector C of the IGBT 2a is connected to the cathode K of the FWD 2b, and the emitter E of the IGBT 2a is connected to the anode A of the FWD 2b. In the semiconductor element 3, the collector C of the IGBT 3a is connected to the cathode K of the FWD 3b, and the emitter E of the IGBT 3a is connected to the anode A of the FWD 3b. The emitter E of the IGBT 2a in the semiconductor element 2 is connected to the collector C of the IGBT 3a in the semiconductor element 3. The gates G of the IGBT 2a and IGBT 3a are respectively connected to gate terminals G1 and G2. The emitters E of the IGBT 2a and IGBT 3a are respectively connected to sense emitter terminals E1 and E2.

The semiconductor element 2 forms the upper arm of the semiconductor device 1a that forms the inverter circuit. The semiconductor element 3 forms the lower arm of the semiconductor device 1a that forms the inverter circuit. The collector C of the semiconductor element 2 is connected to a positive electrode (P) terminal to which a high-potential power supply voltage is applied. The emitter E of the semiconductor element 3 is connected to a negative electrode (N) terminal to which a low-potential power supply voltage is applied. A connection node between the series-connected semiconductor elements 2 and 3 is connected to an output (OUT) terminal from which an output current is output. The P terminal, N terminal, and OUT terminal may each be referred to as a main current wiring member. The collector C of the semiconductor element 2 is also connected to a surge protection (SP) terminal. The SP terminal is used together with the sense emitter terminal E1 to sense a voltage Vce between the collector C and emitter E of the semiconductor element 2 (or a drain-source voltage Vds). When the voltage is higher than or equal to a predetermined value while the semiconductor element 2 is in on-state, the SP terminal determines that an overcurrent due to saturation is flowing through the semiconductor element 2.

In this connection, the semiconductor element 2 forming the upper arm is not limited to one made up of one set of IGBT 2a and FWD 2b, and may be formed by connecting in parallel a plurality of sets each including an IGBT 2a and FWD 2b. The semiconductor element 3 forming the lower arm is not limited to one made up of one set of IGBT 3a and FWD 3b, and may be formed by connecting in parallel a plurality of sets each including an IGBT 3a and FWD 3b.

Figure 2:
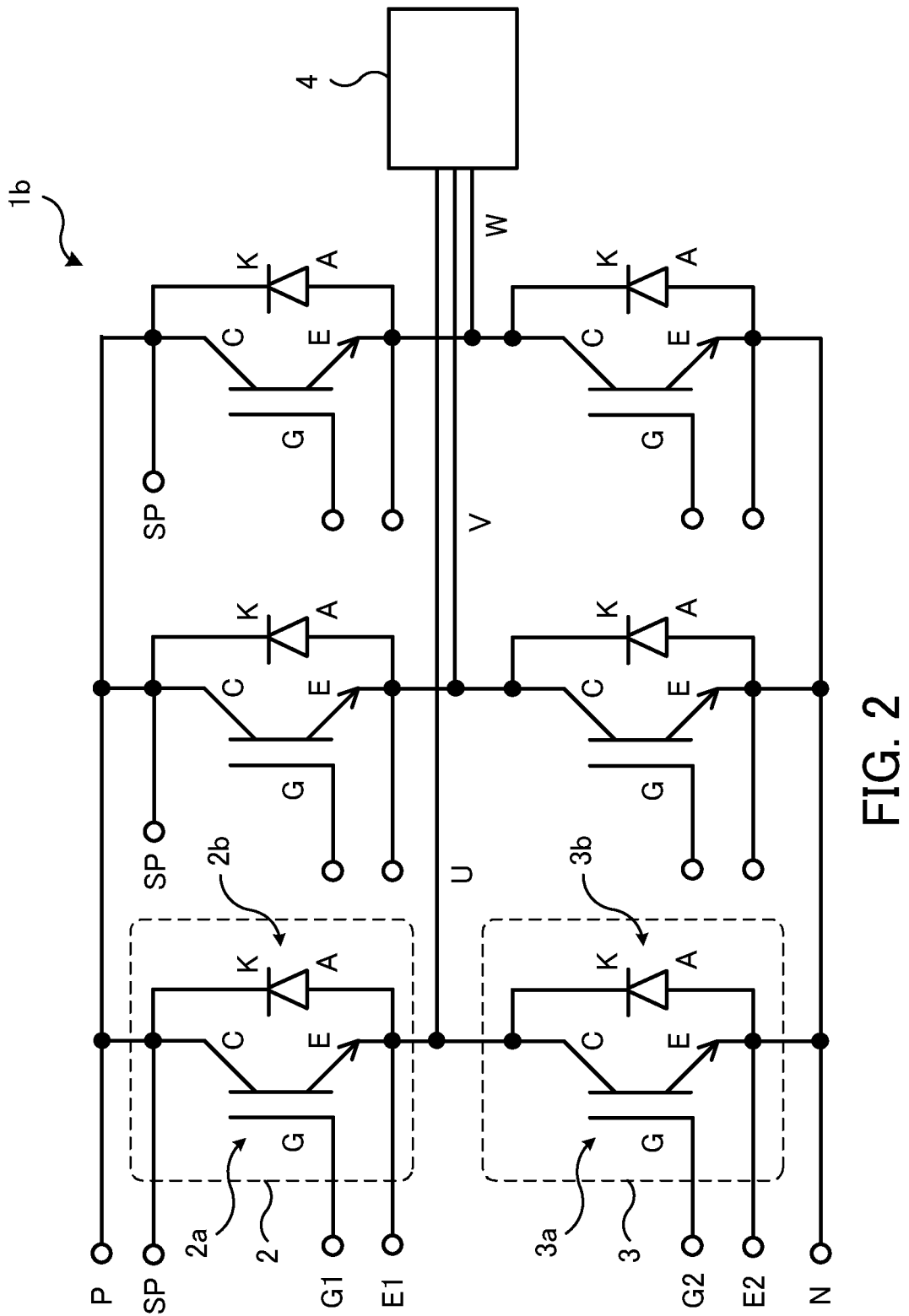
FIG. 2 illustrates a second example of a circuit diagram of a semiconductor device.

FIG. 2 is a second example of a circuit diagram of a semiconductor device.

FIG. 2 illustrates a circuit diagram of a semiconductor device 1b that forms a three-phase voltage inverter circuit with U-phase, V-phase, and W-phase. The semiconductor device 1b illustrated in FIG. 2 is formed by connecting three semiconductor devices 1a, each as illustrated in FIG. 1, in parallel between P and N terminals. The OUT terminals (see FIG. 1) of the three semiconductor devices 1a respectively correspond to the U-phase, V-phase, and W-phase output nodes in the semiconductor device 1b that forms the three-phase voltage inverter circuit, and are connected to a load 4 such as a motor.

In this example, RC-IGBTs are used as the semiconductor elements 2 and semiconductor elements 3. Alternatively, reverse blocking (RB)-IGBTs may be used as the semiconductor elements 2 and semiconductor elements 3. In addition, in this example, the semiconductor elements 2 each include an IGBT 2a and an FWD 2b, and the semiconductor elements 3 each include an IGBT 3a and an FWD 3b. Alternatively, other switch elements such as MOSFETs may be used to replace the IGBTs 2a and IGBTs 3a, and other diode elements such as SBDs may be used to replace the FWDs 2b and FWDs 3b.

The following describes an example configuration of a semiconductor device.

Figures 3A, 3B:
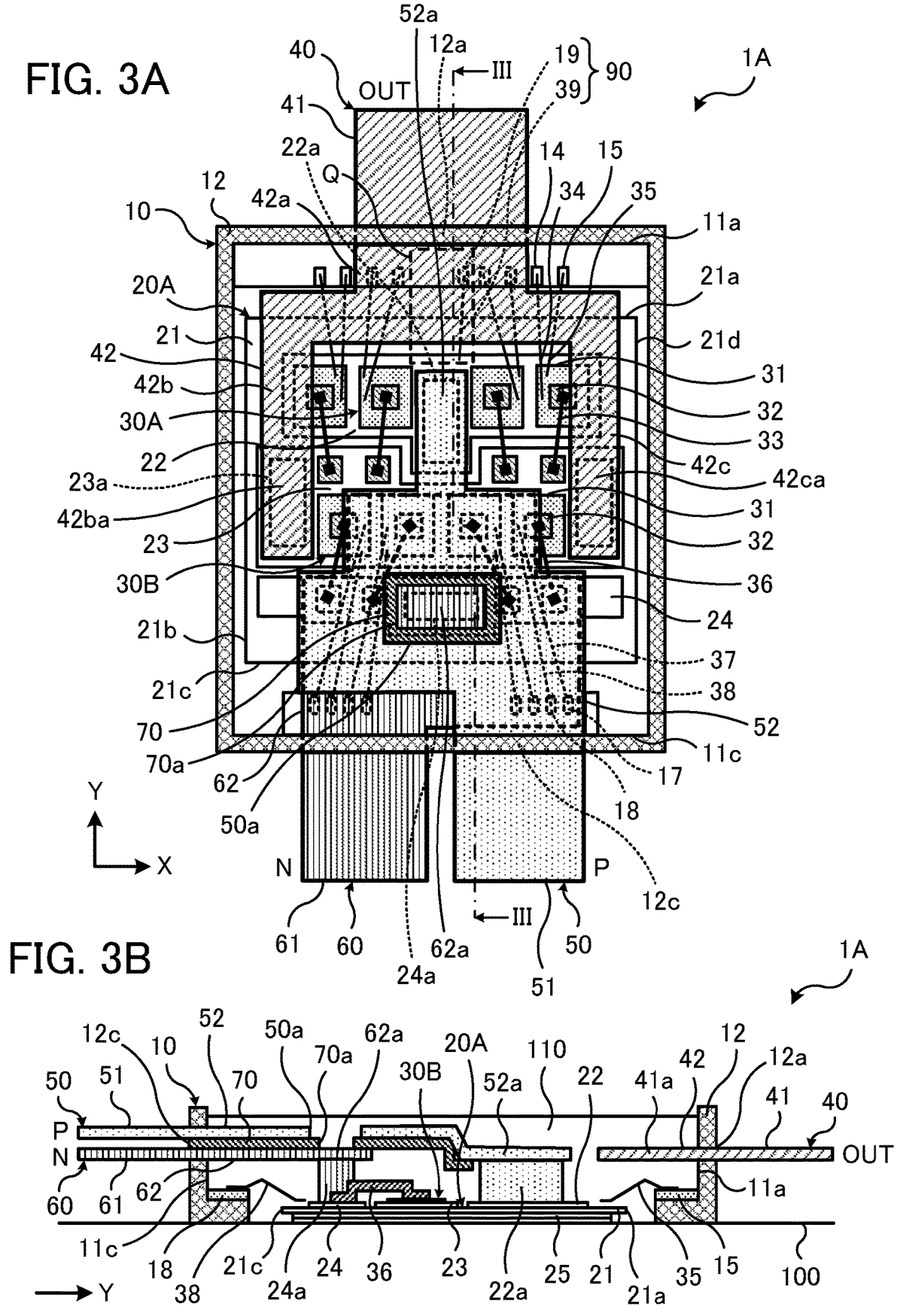
FIGS. 3A and 3B include views for describing an example of a semiconductor device according to a first embodiment (part 1)
Figure 4:
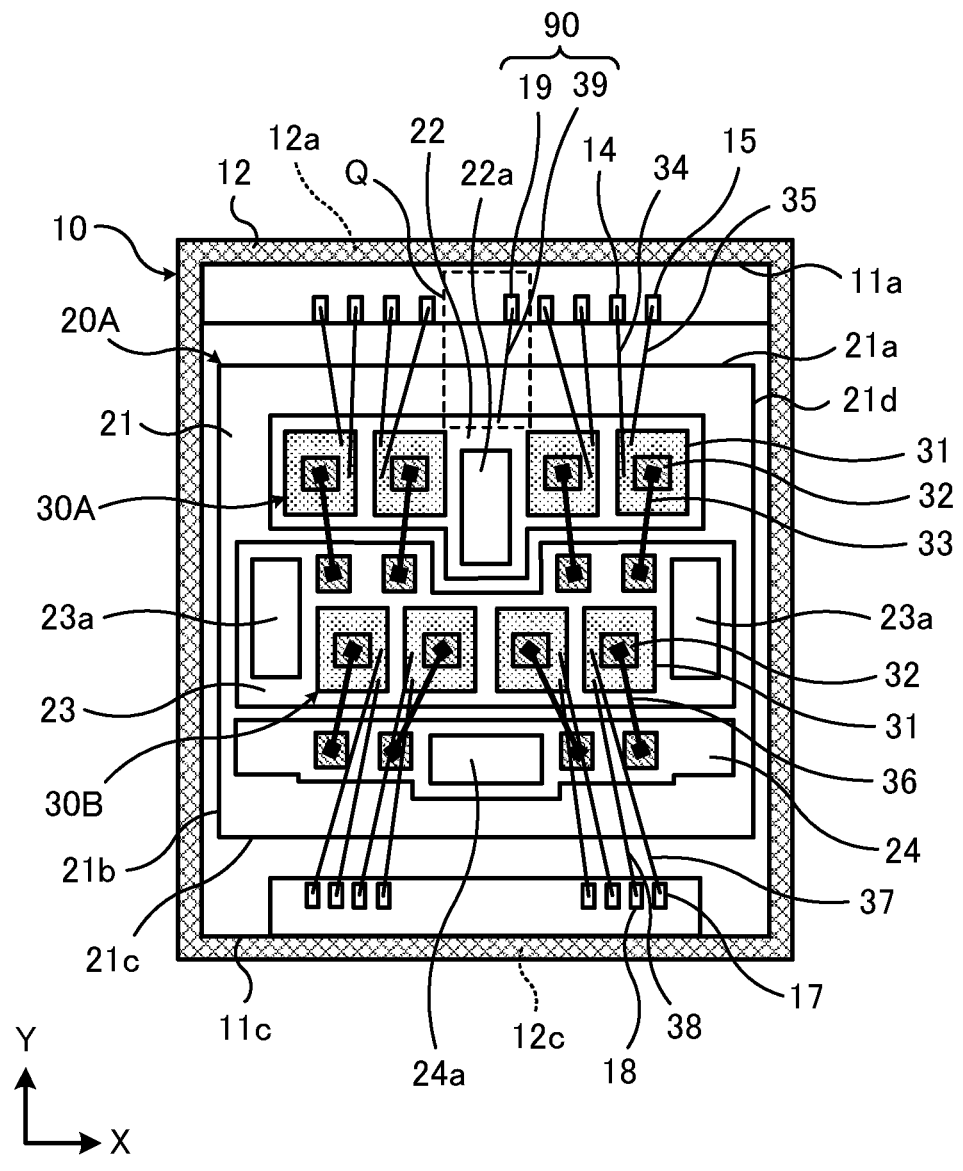
FIG. 4 is a view for describing the example of the semiconductor device according to the first embodiment (part 2)
Figures 5A, 5B, 5C:
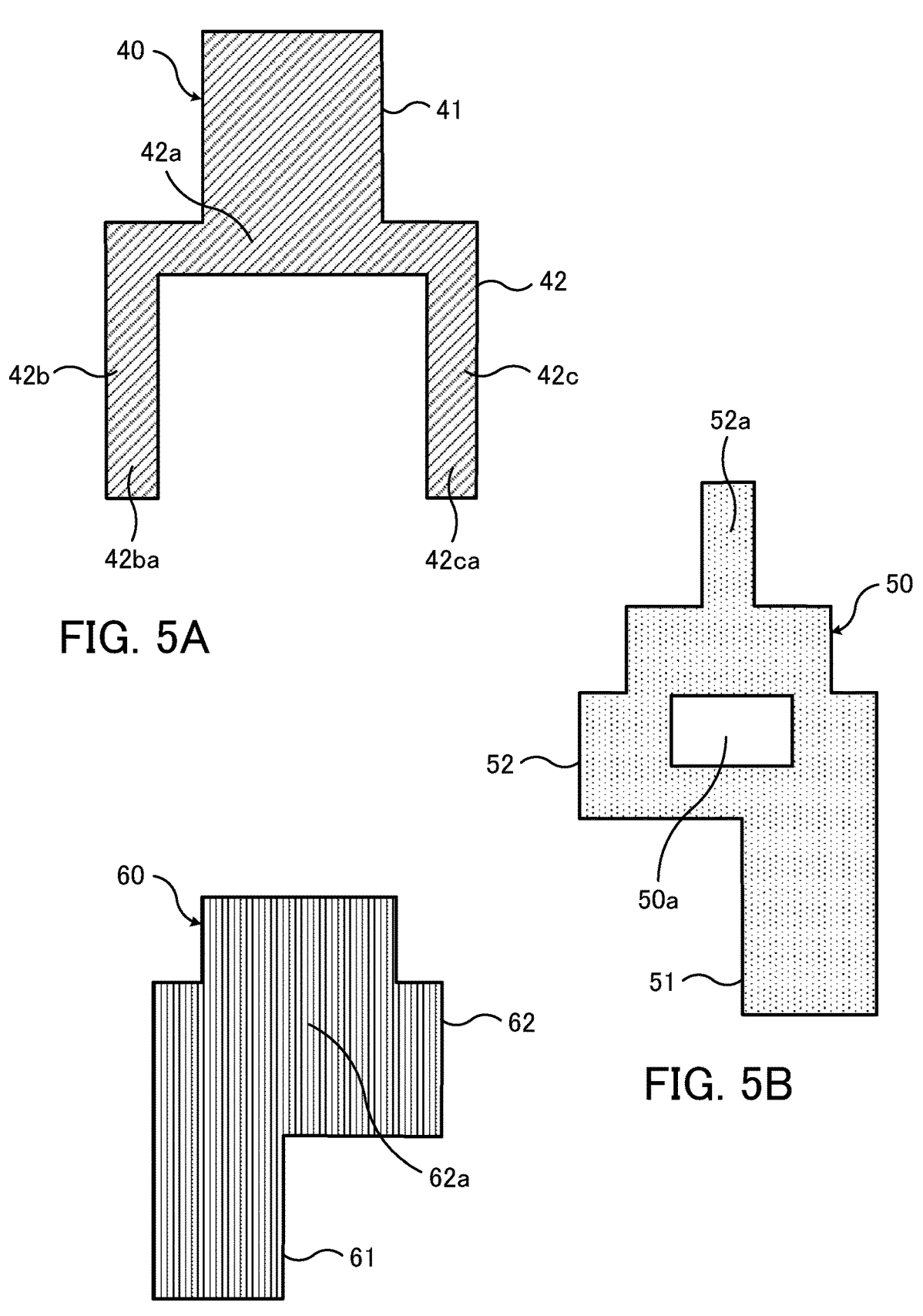
FIGS. 5A to 5C include views for describing the example of the semiconductor device according to the first embodiment (part 3)

FIGS. 3 to 5 are views for describing an example of a semiconductor device according to a first embodiment. FIG. 3A is a main-part plan view schematically illustrating the example of the semiconductor device. FIG. 3B is a schematic sectional view taken along a line III-III of FIG. 3A. FIG. 4 is a main-part plan view schematically illustrating a case, an insulated circuit board, and others in the example of the semiconductor device. FIG. 5A is a main-part plan view schematically illustrating an OUT terminal in the example of the semiconductor device. FIG. 5B is a main-part plan view schematically illustrating a P terminal in the example of the semiconductor device. FIG. 5C is a main-part plan view schematically illustrating an N terminal in the example of the semiconductor device.

A semiconductor device 1A illustrated in FIGS. 3A and 3B is an example of a so-called two-in-one semiconductor device that has a circuit configuration as illustrated in FIG. 1. The semiconductor device 1A includes a case 10, an insulated circuit board 20A, a plurality of semiconductor elements 30A, and a plurality of semiconductor elements 30B, as illustrated in FIGS. 3A, 3B, and 4. The semiconductor device 1A further includes an OUT terminal 40, a P terminal 50, and an N terminal 60, as illustrated in FIGS. 3A, 3B, and 5A to 5C. The OUT terminal 40, P terminal 50, and N terminal 60 may each be referred to as a main current wiring member.

As the case 10, a resin case made of a resin material such as a poly-phenylene-sulfide (PPS) resin is used, for example. The case 10 has a side wall 12 that surrounds the inside thereof. The case 10 may be provided with a lid to cover the inside surrounded by the side wall 12. For example, the case is disposed on a supporting body 100 such as a heat dissipation plate or a cooling unit.

The insulated circuit board 20A is disposed inside the case 10. The plurality of semiconductor elements 30A and the plurality of semiconductor elements 30B are mounted on the insulated circuit board 20A. The insulated circuit board 20A includes an insulating substrate 21 (substrate), conductive plates 22, 23, and 24 provided on one surface (principal surface) of the insulating substrate 21, and a conductive plate 25 provided on the other surface (principal surface) of the insulating substrate 21 opposite to the one surface. A substrate made of a material such as alumina, composite ceramics mainly containing alumina, aluminum nitride, or silicon nitride is used as the insulating substrate 21. A conductive material such as copper is used for the conductive plate 22, conductive plate 23, conductive plate 24, and conductive plate 25. A direct copper bonding (DCB) substrate is used for the insulated circuit board 20A, for example. Alternatively, another substrate such as an active metal brazed (AMB) substrate may be used for the insulated circuit board 20A. The group of semiconductor elements 30A and the group of semiconductor elements 30B are mounted on the one surface side of the insulating substrate 21. Switch elements such as IGBTs and MOSFETs are used in the group of semiconductor elements 30A and the group of semiconductor elements 30B. In addition, diode elements such as FWDs and SBDs are integrated in the group of semiconductor elements 30A and the group of semiconductor elements 30B.

The insulating substrate 21 of the insulated circuit board 20A has four sides, i.e., a side 21a (first side), a side 21b (second side), a side 21c (third side), and a side 21d (fourth side) in plan view. The side 21a and the side 21c face each other, and the side 21b and the side 21d face each other. The case has a side 11a (fifth side) and a side 11c (sixth side) that sandwich the side 21a and side 21c of the insulating substrate 21 and are parallel to the side 21a and side 21c in plan view. The side 11a of the case 10 is located adjacent to the side 21a of the insulating substrate 21, and the side 11c of the case 10 is located adjacent to the side 21c of the insulating substrate 21.

Now, a direction parallel to the side 21a of the insulating substrate 21 is defined as an X direction (first direction), and a direction perpendicular to the X direction is defined as a Y direction (second direction). The conductive plate 22, conductive plate 23, and conductive plate 24 provided on the one surface of the insulating substrate 21 are arranged in the Y direction in plan view. For example, in the semiconductor device 1A, the conductive plate 24, conductive plate 23, and conductive plate 22 are arranged in this order in the Y direction from the conductive plate 24. For example, the conductive plate 22, conductive plate 23, and conductive plate 24 are arranged such that the area of the conductive plate 23 is larger than that of the conductive plate 22 and the area of the conductive plate 22 is larger than that of the conductive plate 24. On the conductive plate 22, the plurality (in this case, four as an example) of semiconductor elements 30A forming the upper arm of the semiconductor device 1A are disposed. The group of semiconductor elements 30A in the upper arm on the conductive plate 22 is aligned in the X direction in plan view. On the conductive plate 23, the plurality (in this case, four as an example) of semiconductor elements 30B forming the lower arm of the semiconductor device 1A are disposed. The group of semiconductor elements 30B in the lower arm on the conductive plate 23 is aligned in the X direction in plan view.

Each of the group of semiconductor elements 30A and group of semiconductor elements 30B has a collector electrode 31 on one surface (principal surface) thereof and also has an emitter electrode 32 on the other surface (principal surface) thereof opposite to the one surface. In addition, each semiconductor element has a gate electrode and a sense emitter electrode on the surface where the emitter electrode 32 is provided.

Each collector electrode 31 of the group of semiconductor elements 30A in the upper arm is connected to the conductive plate 22 using a bonding material such as a solder or a sintered material, and each emitter electrode 32 thereof is connected to the conductive plate 23 using a wire 33. In each semiconductor element 30A in the upper arm, the collector electrode 31 is electrically connected to the conductive plate 22, and the emitter electrode 32 is electrically connected to the conductive plate 23. Each gate electrode of the semiconductor elements 30A in the upper arm is connected to an external gate terminal 14 provided on the side wall 12 at the side 11a of the case 10, using a gate wire 34. Each sense emitter electrode of the semiconductor elements 30A in the upper arm is connected to an external sense emitter terminal 15 provided on the side wall 12 at the side 11a of the case 10, using a sense emitter wire 35. Furthermore, the conductive plate 22 to which the collector electrodes 31 of the semiconductor elements 30A in the upper arm are connected is connected to an external SP terminal 19 provided on the side wall 12 at the side 11a of the case 10, using an SP wire 39. In the following description, the external SP terminal 19 and SP wire 39 are collectively referred to as an SP part 90.

Each collector electrode 31 of the group of semiconductor elements 30B in the lower arm is connected to the conductive plate 23 using a bonding material such as a solder or a sintered material, and each emitter electrode 32 thereof is connected to the conductive plate 24 using a wire 36. In each semiconductor element 30B in the lower arm, the collector electrode 31 is electrically connected to the conductive plate 23, and the emitter electrode 32 is electrically connected to the conductive plate 24. Each gate electrode of the semiconductor elements 30B in the lower arm is connected to an external gate terminal 17 provided on the side wall 12 at the side 11c of the case 10, using a gate wire 37. Each sense emitter electrode of the semiconductor elements 30B in the lower arm is connected to an external sense emitter terminal

18 provided on the side wall 12 at the side 11c of the case 10, using a sense emitter wire 38.

On the conductive plate 22 to which the collector electrodes 31 of the group of semiconductor elements 30A in the upper arm are connected, a conductive block 22a (lead-out part) to which the P terminal 50 (main current wiring member) is connected is disposed. The conductive block 22a is made of a conductive material such as copper. The conductive block 22a is disposed in the middle of the group of semiconductor elements 30A in the upper arm, i.e., disposed at a position sandwiched between the second and third semiconductor elements 30A among the four semiconductor elements 30A aligned in the X direction. The P terminal 50 is connected to the conductive block 22a, and is thus electrically connected to the conductive plate 22 via the conductive block 22a.

On the conductive plate 23 to which the emitter electrodes 32 of the group of semiconductor elements 30A in the upper arm and the collector electrodes 31 of the group of semiconductor elements 30B in the lower arm are connected, two conductive blocks 23a (lead-out parts) to which the OUT terminal 40 (main current wiring member) is connected are disposed. The conductive blocks 23a are made of a conductive material such as copper. The two conductive blocks 23a are disposed outside a group of joints of the wires 33 respectively extending from the emitter electrodes 32 of the group of semiconductor elements 30A in the upper arm and the group of semiconductor elements 30B in the lower arm, i.e., disposed at positions sandwiching the four semiconductor elements 30B aligned in the X direction. The OUT terminal 40 is connected to the conductive blocks 23a and is thus electrically connected to the conductive plate 23 via the conductive blocks 23a.

On the conductive plate 24 to which the emitter electrodes 32 of the group of semiconductor elements 30B in the lower arm are connected, a conductive block 24a (lead-out part) to which the N terminal 60 (main current wiring member) is connected is disposed. The conductive block 24a is made of a conductive material such as copper. The conductive block 24a is disposed in the middle of a group of joints of the wires 36 respectively extending from the emitter electrodes 32 of the group of semiconductor elements 30B in the lower arm, i.e., disposed at a position sandwiched between the second and third joints among the group of joints aligned in the X direction. The N terminal 60 is connected to the conductive block 24a and is thus electrically connected to the conductive plate 24 via the conductive block 24a.

The conductive block 22a sandwiched in the group of semiconductor elements 30A in the upper arm and the two conductive blocks 23a sandwiching the group of semiconductor elements 30B in the lower arm are each shaped to be longer in the Y direction than in the X direction in plan view. The conductive block 24a sandwiched in the group of joints of the wires 36 extending from the group of semiconductor elements 30B in the lower arm is set to be longer in the X direction than in the Y direction in plan view. This shape setting prevents an increase in the size in the X and Y directions of the semiconductor device 1A (the insulated circuit board 20A and case 10 thereof) due to the arrangement of the conductive block 22a and conductive blocks 23a.

The two conductive blocks 23a to which the OUT terminal 40 is connected are shaped such that their total plan size (area) is larger than the plan size (area) of the conductive block 22a to which the P terminal 50 is connected, for example, is 2 times or more as large as the plan size (area) of the conductive block 22a. In addition, the two conductive blocks 23a to which the OUT terminal 40 is connected are shaped such that their total plan size (area) is larger than the plan size (area) of the conductive block 24a to which the N terminal 60 is connected, for example, is √2 times or more as large as the plan size (area) of the conductive block 24a. This is because, theoretically, a main current flowing through the OUT terminal 40 is √2 times as large as a main current flowing through the P terminal 50 and a main current flowing through the N terminal 60. If the total plan size of the two conductive blocks 23a to which the OUT terminal 40 is connected is the same as or smaller than the plan size of the conductive block 22a to which the P terminal 50 is connected and the plan size of the conductive block 24a to which the N terminal 60 is connected, there arises a concern about high current density that leads to heating and migration at the junctions between the OUT terminal 40 and each conductive block 23a.

The insulated circuit board 20A that includes the conductive plate 22, conductive plate 23, and conductive plate 24 which the group of semiconductor elements 30A in the upper arm and the group of semiconductor elements 30B in the lower arm are mounted on and/or connected to as described above is housed in the case 10. The OUT terminal 40, P terminal 50, and N terminal 60 are connected to the insulated circuit board 20A housed in the case 10.

As illustrated in FIGS. 3A and 5A, the OUT terminal 40 includes an external terminal portion 41 arranged outside the case 10 and an extension portion 42 arranged inside the case 10. The external terminal portion 41 is provided on the side of the case 10 where one side 11a is located. The extension portion 42 is continuous with the external terminal portion 41 and extends therefrom across the one side 11a of the case 10 toward the inside of the case 10. The OUT terminal 40 is arranged to pass through an opening 12a formed in the side wall 12 at the one side 11a of the case 10. The extension portion 42 includes a branch base portion 42a extending across the one side 11a of the case 10 toward the inside of the case 10, and a branch portion 42b and branch portion 42c branching off from the branch base portion 42a in plan view. The branch portions 42b and 42c are respectively connected at connection portions 42ba and 42ca thereof to the two conductive blocks 23a disposed on the conductive plate 23, to which the collector electrodes 31 of the group of semiconductor elements 30B in the lower arm are connected. The extension portion 42 connects the external terminal portion 41 to the connection portions 42ba and 42ca of the branch portions 42b and 42c respectively connected to the two conductive blocks 23a. The OUT terminal 40 is therefore electrically connected to the conductive plate 23 via the connection portions 42ba and 42ca and the two conductive blocks 23a connected thereto.

As illustrated in FIG. 3A and FIG. 5B, the P terminal 50 includes an external terminal portion 51 arranged outside the case 10 and an extension portion 52 arranged inside the case 10. The external terminal portion 51 is provided on the side of the case 10 where another side 11c is located. The extension portion 52 is continuous with the external terminal portion 51 and extends therefrom across the other side 11c of the case 10 toward the inside of the case 10. The P terminal 50 is arranged to pass through an opening 12c formed in the side wall 12 at the other side 11c of the case 10. The extension portion 52 is connected at a connection portion 52a thereof to the conductive block 22a disposed on the conductive plate 22, to which the collector electrodes 31 of the group of semiconductor elements 30A in the upper arm are connected. The extension portion 52 connects the external terminal portion 51 to the connection portion 52a connected to the conductive block 22a. The P terminal 50 is therefore electrically connected to the conductive plate 22 via the connection portion 52a and the conductive block 22a.

As illustrated in FIG. 3A and FIG. 5C, the N terminal 60 includes an external terminal portion 61 arranged outside the case 10 and an extension portion 62 arranged inside the case 10. The external terminal portion 61 is provided on the side of the case 10 where the other side 11c is located. The extension portion 62 is continuous with the external terminal portion 61 and extends therefrom across the other side 11c of the case 10 toward the inside of the case 10. The N terminal 60 is arranged to pass through the opening 12c formed in the side wall 12 at the other side 11c of the case 10 together with the P terminal 50. The extension portion 62 is connected at a connection portion 62a thereof to the conductive block 24a disposed on the conductive plate 24, to which the emitter electrodes 32 of the group of semiconductor elements 30B in the lower arm are connected. The extension portion 62 connects the external terminal portion 61 to the connection portion 62a connected to the conductive block 24a. The N terminal 60 is therefore electrically connected to the conductive plate 24 via the connection portion 62a and the conductive block 24a.

The P terminal 50 and N terminal 60 are stacked via an insulating member 70, at least inside the case 10. An insulating sheet, an insulating paper, or the like is used as the insulating member 70. For example, a resin material such as an aramid resin, a polyamide resin, a fluororesin, or a polyimide resin is used for the insulating member 70. In the semiconductor device 1A, the N terminal 60, insulating member 70, and P terminal 50 are arranged in this order in a direction away from the insulated circuit board 20A. That is, out of the P terminal 50 and N terminal 60, the N terminal 60 is located closer to the insulated circuit board 20A. The P terminal 50 and N terminal 60 are shaped to partially overlap each other in plan view. The N terminal 60 does not exist under the connection portion 52a of the P terminal 50. Openings 50a and 70a are formed in the P terminal 50 and insulating member 70, respectively. The connection portion 62a of the N terminal 60 is exposed through the opening 50a of the P terminal 50 and the opening 70a of the insulating member 70. The connection portion 62a of the N terminal 60 is located under the opening 50a of the P terminal 50 and the opening 70a of the insulating member 70. The connection portion 62a of the N terminal 60 is joined to the conductive block 24a by laser welding or another through the opening 50a of the P terminal 50 and the opening 70a of the insulating member 70.

As illustrated in FIG. 3A, in plan view, the extension portion 52 of the P terminal 50 and the extension portion 62 of the N terminal 60 extend across the side 11c of the case 10 to the space between the branch portion 42b and branch portion 42c of the extension portion 42 of the OUT terminal 40. In plan view, the connection portions 42ba and 42ca of the branch portions 42b and 42c of the OUT terminal 40, which are connected to the two conductive blocks 23a, are arranged to sandwich the extension portion 52 of the P terminal 50 and the extension portion 62 of the N terminal 60. In plan view, the group of semiconductor elements 30B in the lower arm are arranged between the branch portion 42b and branch portion 42c of the OUT terminal 40.

In the semiconductor device 1A, the external terminal portion 61 of the N terminal 60, the conductive plate 24 to which the N terminal 60 is connected, the conductive plate 23 to which the OUT terminal 40 is connected, and the external terminal portion 41 of the OUT terminal 40 are arranged in this order in the Y direction.

As illustrated in FIG. 3B, the inside of the case 10 may be filled with a sealing resin 110 to seal the insulated circuit board 20A, and the group of semiconductor elements 30A and the group of semiconductor elements 30B mounted on the insulated circuit board 20A. Note that the illustration of the sealing resin 110 is omitted for convenience in FIG. 3A. For example, the sealing resin 110 may be made of a resin material such as an epoxy resin or a phenolic resin, or a gel material such as silicone. The sealing resin 110 may contain an insulating filler such as silica. Plural types of materials may be used for the sealing resin 110. For example, the sealing resin 110 may be formed in a layered structure, in which a gel material such as silicone is used as a buffer coat material for a lower layer and a resin material such as an epoxy resin is used for its upper layer.

The operation of the semiconductor device 1A configured as above will now be described.

Figure 6:
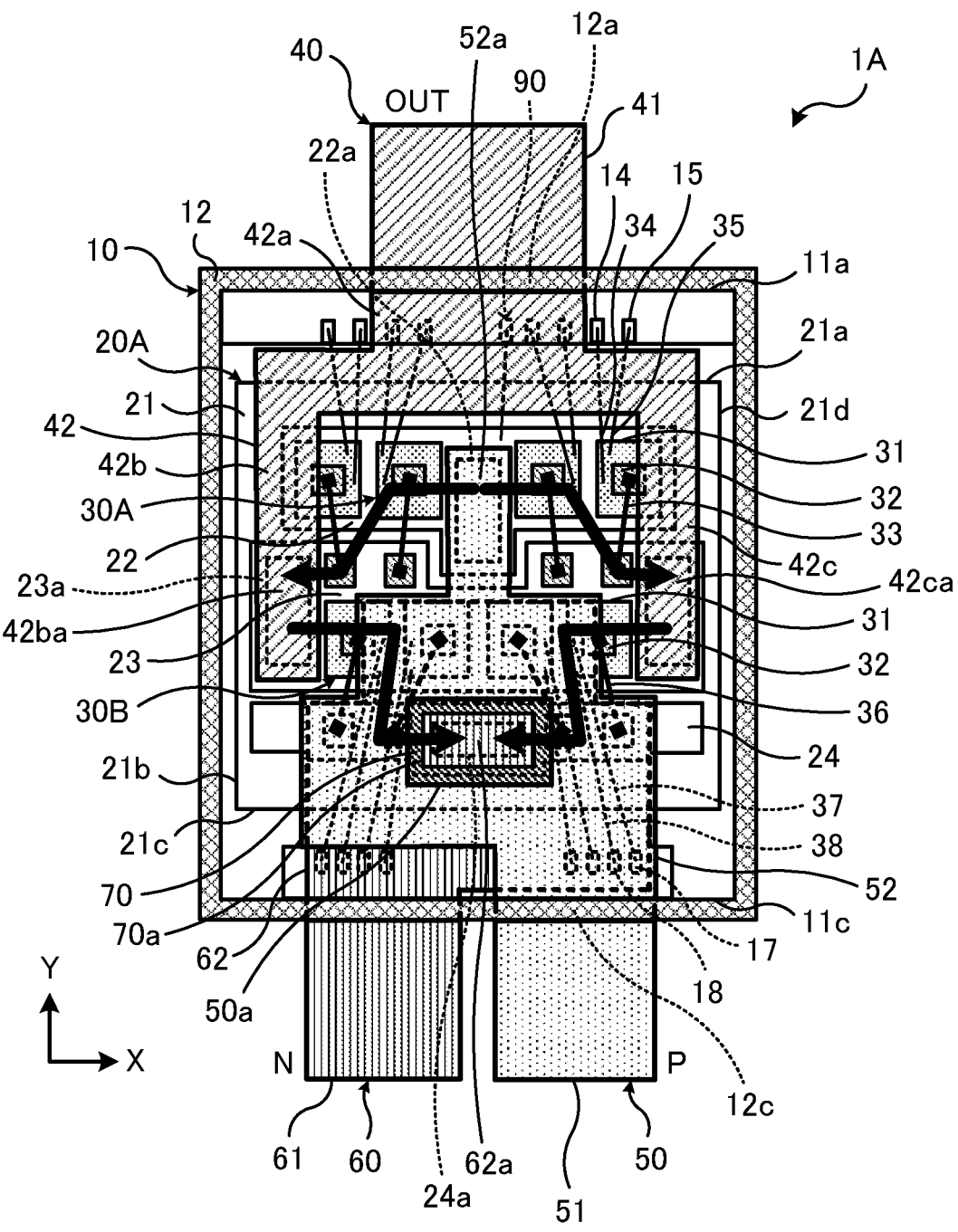
FIG. 6 is a view for describing the flow of a main current flowing during operation of the semiconductor device according to the first embodiment (part 1)
Figures 7A, 7B:
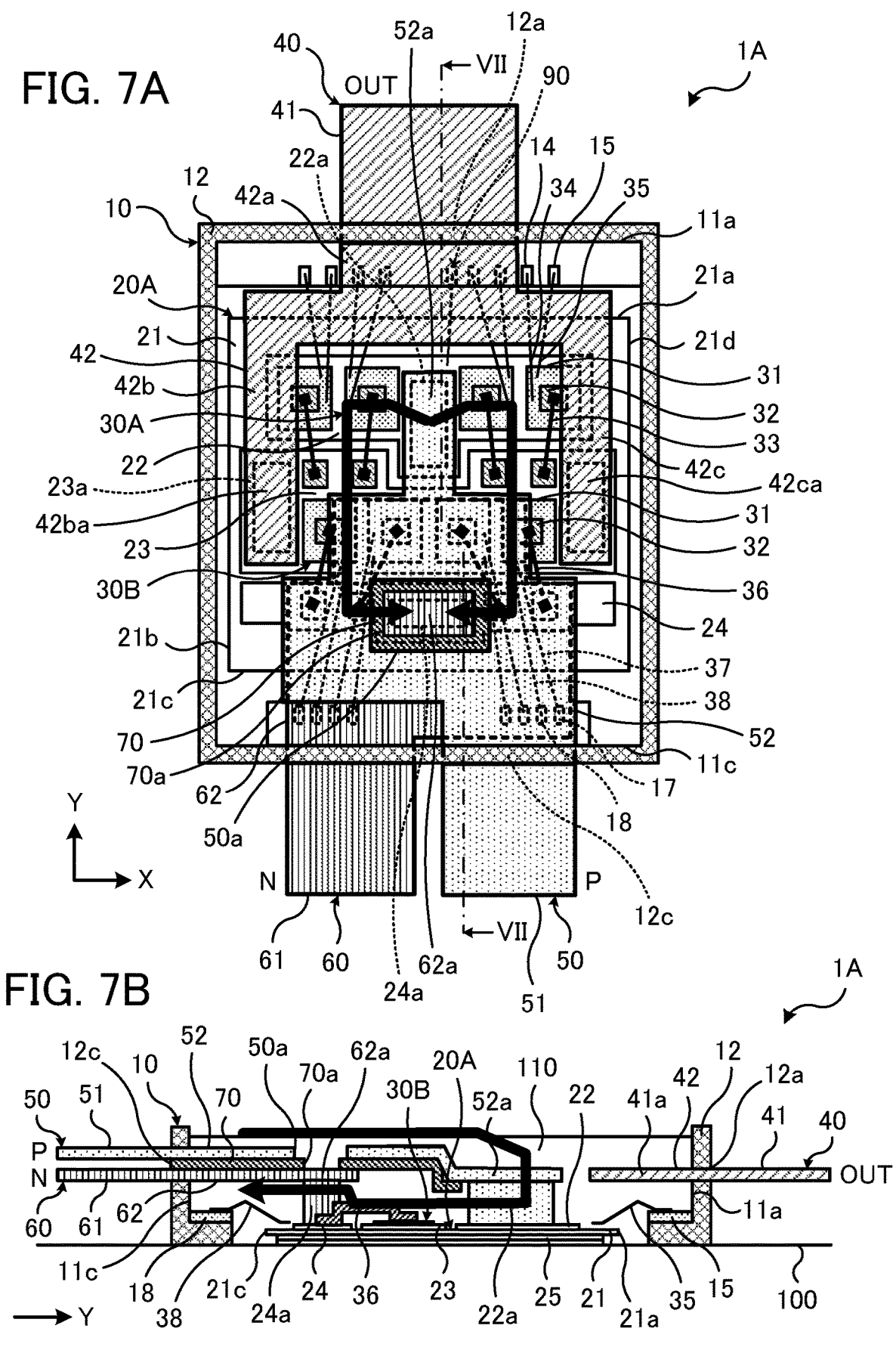
FIGS. 7A and 7B include views for describing the flow of a main current flowing during operation of the semiconductor device according to the first embodiment (part 2)

FIGS. 6 and 7 are views for describing the flow of a main current during the operation of the semiconductor device of the first embodiment. FIG. 6 is a main-part plan view schematically illustrating the example of the semiconductor device. FIG. 7A is a main-part plan view schematically illustrating the example of the semiconductor device. FIG. 7B is a schematic sectional view taken along a line VII-VII of FIG. 7A. FIGS. 6, 7A, and 7B each schematically illustrate the flow of a main current during operation in thick arrows.

During the operation of the semiconductor device 1A, a high-potential power supply voltage is applied to the P terminal 50, and a low-potential power supply voltage is applied to the N terminal 60.

A main current entering from the P terminal 50 flows to the OUT terminal through a path illustrated in FIG. 6. More specifically, the main current entering from the external terminal portion 51 of the P terminal 50 flows through the extension portion 52, and after passing through the conductive block 22a via the connection portion 52a of the extension portion 52, it flows to the conductive plate 22 of the insulated circuit board 20A and is then supplied to the collector electrodes 31 of the group of semiconductor elements 30A in the upper arm. The main current supplied to the collector electrodes 31 passes through the group of semiconductor elements 30A in the upper arm, which are controlled via the gate wires 34, and then flows to the conductive plate 23 of the insulated circuit board 20A through the emitter electrodes 32 and the wires 33 connected to the emitter electrodes 32. The main current having flowed to the conductive plate 23 passes through the two conductive blocks 23a, and then flows through the OUT terminal 40, from the connection portions 42ba and 42ca through the branch portions 42b and 42c and then branch base portion 42a of the extension portion 42 to the external terminal portion 41 (output current).

On the other hand, a main current entering from the OUT terminal 40 flows to the N terminal 60 through a path illustrated in FIG. 6. More specifically, the main current entering from the external terminal portion 41 of the OUT terminal 40 flows through the branch base portion 42a and branch portions 42b and 42c of the extension portion 42, and after passing through the two conductive blocks 23a via the connection portions 42ba and 42ca, it flows to the conductive plate 23 of the insulated circuit board 20A and is then supplied to the collector electrodes 31 of the group of semiconductor elements 30B in the lower arm. The main current supplied to the collector electrodes 31 passes through the group of semiconductor elements 30B in the lower arm, which are controlled via the gate wires 37, and then flows to the conductive plate 24 of the insulated circuit board 20A through the emitter electrodes 32 and the wires 36 connected to the emitter electrodes 32. The main current having flowed to the conductive plate 24 passes through the conductive block 24a, and then flows through the N terminal 60, from the connection portion 62a and then extension portion 62 to the external terminal portion 61.

In the semiconductor device 1A, the two conductive blocks 23a, to which the connection portions 42ba and 42ca of the OUT terminal 40 are respectively connected, are arranged outside the group of semiconductor elements 30B in the lower arm on the conductive plate 23, i.e., arranged to sandwich the group of semiconductor elements 30B in the lower arm. In the semiconductor device 1A, the main current flowing from the P terminal 50 through the group of semiconductor elements 30A in the upper arm to the OUT terminal 40 is prevented from flowing under the group of semiconductor elements 30B in the lower arm.

In the conventional arrangements of an OUT terminal, P terminal, and N terminal as disclosed in, for example, Japanese Laid-open Patent Publication No. 2020-504459, Japanese Laid-open Patent Publication No. 2021-141219, Japanese Laid-open Patent Publication No. 2021-141221, Japanese Laid-open Patent Publication No. 2021-141222, International Publication Pamphlet No. WO 2018/193929, both a main current flowing from the P terminal through a group of semiconductor elements in an upper arm to the OUT terminal and a main current flowing from the OUT terminal through a group of semiconductor elements in a lower arm to the N terminal may flow under the group of semiconductor elements in the lower arm.

By contrast, in the semiconductor device 1A, both the main current flowing from the P terminal 50 through the group of semiconductor elements 30A in the upper arm to the OUT terminal 40 and the main current flowing from the OUT terminal 40 through the group of semiconductor elements 30B in the lower arm to the N terminal 60 are prevented from flowing under the group of semiconductor elements 30B in the lower arm. Therefore, it is possible to suppress a temperature increase in the group of semiconductor elements 30B in the lower arm, i.e., a temperature increase in the group of semiconductor elements 30B in the lower arm due to a combination of heating caused by the operation and heating caused in the conductive plate 23 by the main current. As a result, it is possible to prevent degradation in the performance of the group of semiconductor elements 30B in the lower arm due to overheating and thus to prevent degradation in the performance of the semiconductor device 1A including the group of semiconductor elements 30B in the lower arm.

Moreover, the semiconductor device 1A has the following configuration: the two conductive blocks 23a to which the OUT terminal 40 is connected are disposed on the conductive plate 23; and the total plan size of these two conductive blocks 23a is larger than both the plan size of the conductive block 22a to which the P terminal 50 is connected and the plan size of the conductive block 24a to which the N terminal 60 is connected. This configuration suppresses heating and migration at the junctions between the two conductive blocks 23a and their corresponding connection portions 42ba and 42ca, even when the output current increases.

In addition, in the semiconductor device 1A, the P terminal 50 (the extension portion 52 thereof) and the N terminal 60 (the extension portion 62 thereof) are stacked via the insulating member 70 such as to partially overlap each other in plan view. As illustrated in FIGS. 7A and 7B, in the semiconductor device 1A, the path of the main current flowing between the P terminal 50 and the N terminal 60 forms a closed loop with a relatively short length, and a reduction of the inductance is achieved by magnetic flux cancellation between the P terminal 50 and the N terminal 60 that face each other via the insulating member 70. This suppresses voltage surges that are caused by switching of the group of semiconductor elements 30A and the group of semiconductor elements 30B, which results in preventing degradation in the performance of the semiconductor device 1A. In addition, the semiconductor device 1A does not need another pattern (conductive plate) in the insulated circuit board 20A in order to form a closed loop for the path of the main current between the P terminal 50 and the N terminal 60. Therefore, high-density integration of the insulated circuit board 20A and high-density integration of the group of semiconductor elements 30A and the group of semiconductor elements 30B mounted on the insulated circuit board 20A are achieved, which prevents an increase in the size of the semiconductor device 1A due to an increase in the size of the insulated circuit board 20A. Since the closed loop is formed with a relatively short length for the path of the main current between the P terminal 50 and the N terminal 60, the semiconductor device 1A further enhances an effect of reducing the inductance.

In addition, in the semiconductor device 1A, out of the P terminal 50 and N terminal 60 stacked via the insulating member 70, the N terminal 60 is located closer to the insulated circuit board 20A (see FIG. 3A and FIG. 3B). The N terminal 60 (the extension portion 62 thereof) is arranged to face the gate wires 37 and sense emitter wires 38 connected to the group of semiconductor elements 30B in the lower arm on the insulated circuit board 20A. More specifically, in the semiconductor device 1A, the N terminal 60 connected to the lower potential side of the group of semiconductor elements 30B in the lower arm is arranged to face the gate wires 37 of the group of semiconductor elements 30B in the lower arm and the sense emitter wires 38 connected to the lower potential side of the group of semiconductor elements 30B in the lower arm. In this arrangement, the potential differences between the N terminal 60 and the gate wires 37 and between the N terminal 60 and the sense emitter wires 38 are relatively small. Therefore, as compared to the case where the P terminal 50 is arranged to face the gate wires 37 and sense emitter wires 38, it is possible to arrange the N terminal 60 close to the gate wires 37 and sense emitter wires 38.

Furthermore, in the semiconductor device 1A, the OUT terminal 40 (the extension portion 42 thereof) is arranged to face the gate wires 34 and sense emitter wires 35 connected to the group of semiconductor elements 30A in the upper arm on the insulated circuit board 20A (see FIG. 3A and FIG. 3B). More specifically, in the semiconductor device 1A, the OUT terminal 40 connected to the lower potential side of the group of semiconductor elements 30A in the upper arm is arranged to face the gate wires 34 of the group of semiconductor elements 30A in the upper arm and the sense emitter wires 35 connected to the lower potential side of the group of semiconductor elements 30A in the upper arm. In this arrangement, the potential differences between the OUT terminal and the gate wires 34 and between the OUT terminal 40 and the sense emitter wires 35 are relatively small. Therefore, it is possible to arrange the OUT terminal 40 close to the gate wires 34 and sense emitter wires 35.

As described above, in the semiconductor device 1A, it is possible to arrange the N terminal 60 close to the gate wires 37 and sense emitter wires 38 and arrange the OUT terminal 40 close to the gate wires 34 and sense emitter wires 35. It is therefore possible to reduce the height of the semiconductor device 1A. In addition, in the case where the SP part 90 that is electrically connected to the conductive plate 22 is arranged as in the semiconductor device 1A, an insulating member such as an insulating sheet may be provided between the external SP terminal 19 and SP wire 39 of the SP part 90 and an area of the OUT terminal 40 facing the SP part 90, for example, between the SP part 90 and the OUT terminal 40 in a region Q illustrated in FIG. 3A and FIG. 4. Alternatively, a partial area of the OUT terminal 40 facing the external SP terminal 19 and SP wire 39 of the SP part 90, for example, a partial area of the OUT terminal 40 in the region Q illustrated in FIG. 3A and FIG. 4 may be removed. This makes it possible to reduce the effect of potential across the OUT terminal 40, which is arranged close to the gate wires 34 and sense emitter wires 35, on the potential across the external SP terminal 19 and SP wire 39 of the SP part 90 and to detect overcurrent with high accuracy, which contributes to effectively preventing the semiconductor device 1A from being damaged.

In this connection, the relationship between the above-described semiconductor device 1A and the elements described in claim 1 of the present application is as follows.

The OUT terminal 40 corresponds to a "first main current wiring member," the branch base portion 42a corresponds to a "branch base portion," the branch portion 42b and branch portion 42c respectively correspond to a "first branch portion and second branch portion", and the extension portion 42 corresponds to a "first extension portion." The P terminal 50 or the N terminal 60 corresponds to a "second main current wiring member."

Here, in the case where the P terminal 50 corresponds to the "second main current wiring member," the extension portion 52 corresponds to a "second extension portion," and the conductive plate 22 electrically connected to the extension portion 52 corresponds to a "conductive plate." The group of semiconductor elements 30A in the upper arm corresponds to a "plurality of semiconductor elements," the collector electrodes 31 of the group of semiconductor elements 30A in the upper arm, which are electrically connected to the conductive plate 22, correspond to "first electrodes," and the emitter electrodes 32 of the group of semiconductor elements 30A in the upper arm correspond to "second electrodes." In the case where the P terminal 50 corresponds to the "second main current wiring member" as described above, the N terminal 60 corresponds to a "third main current wiring member" (claims 4 and 6), the insulating member 70 corresponds to an "insulating member" (claim 4), and the opening 50a corresponds to a "first opening" (claim 5). On the other hand, in the case where the N terminal 60 corresponds to the "second main current wiring member," the extension portion 62 corresponds to the "second extension portion," the conductive plate 24 electrically connected to the extension portion 62 corresponds to the "conductive plate," the group of semiconductor elements 30B in the lower arm corresponds to the "plurality of semiconductor elements," the emitter electrodes 32 of the group of semiconductor elements 30B in the lower arm electrically connected to the conductive plate 24 correspond to the "first electrodes," and the collector electrodes 31 of the group of semiconductor elements 30B in the lower arm correspond to the "second electrodes." In the case where the N terminal 60 corresponds to the "second main current wiring member" as described above, the P terminal 50 corresponds to the "third main current wiring member" (claim 4).

In addition, the relationship between the above-described semiconductor device 1A and the elements described in claim 10 of the present application is as follows.

The OUT terminal 40 corresponds to a "first main current wiring member," the external terminal portion 41 corresponds to a "first external terminal portion," the extension portion 42 corresponds to a "first extension portion," and the connection portion 42ba and connection portion 42ca respectively correspond to a "first connection portion and second connection portion." The P terminal 50 or the N terminal 60 corresponds to a "second main current wiring member."

Here, in the case where the P terminal 50 corresponds to the "second main current wiring member," the external terminal portion 51 corresponds to a "second external terminal portion," the extension portion 52 corresponds to a "second extension portion," the connection portion 52a corresponds to a "third connection portion," the conductive plate 23 corresponds to a "first conductive plate," the conductive plate 22 corresponds to a "second conductive plate," the group of semiconductor elements 30B in the lower arm corresponds to a "plurality of first semiconductor elements," and the group of semiconductor elements 30A in the upper arm corresponds to a "plurality of second semiconductor elements."

In the case where the P terminal 50 corresponds to the "second main current wiring member" as described above, the N terminal 60 corresponds to a "third main current wiring member" (claim 18), the external terminal portion 61 corresponds to a "third external terminal portion," the extension portion 62 corresponds to a "third extension portion," the connection portion 62a corresponds to a "fourth connection portion," the conductive plate 24 corresponds to a "third conductive plate," the wires 36 correspond to "first wires," the wires 33 correspond to "second wires," the opening 12a corresponds to a "first opening," and the opening 12c corresponds to a "second opening" (claim 18). The insulating member 70 corresponds to an "insulating member" (claim 19), the opening 50a and opening 70a respectively correspond to a "third opening" and a "fourth opening," and the conductive block 24a corresponds to a "conductive block" (claim 20). The gate wires 37 correspond to "first gate wires," the sense emitter wires 38 correspond to "first sense emitter wires," the gate wires 34 correspond to "second gate wires," the sense emitter wires 35 correspond to "second sense emitter wires," the external gate terminals 17 correspond to "first external gate terminals," the external sense emitter terminals 18 correspond to "first external sense emitter terminals," the external gate terminals 14 correspond to "second external gate terminals," and the external sense emitter terminals 15 correspond to "second external sense emitter terminals" (claim 21).

On the other hand, in the case where the N terminal 60 corresponds to the "second main current wiring member," the external terminal portion 61 corresponds to the "second external terminal portion," the extension portion 62 corresponds to the "second extension portion," the connection portion 62a corresponds to the "third connection portion," the conductive plate 23 corresponds to the "first conductive plate," the conductive plate 24 corresponds to the "second conductive plate," the group of semiconductor elements 30A in the upper arm corresponds to the "plurality of first semiconductor elements," and the group of semiconductor elements 30B in the lower arm corresponds to the "plurality of second semiconductor elements."

In the semiconductor device 1A described in this first embodiment, the external terminal portion 51 of the P terminal 50 and the external terminal portion 61 of the N terminal 60, which are arranged outside the case 10, may be arranged to overlap each other via an insulating member in plan view. In the semiconductor device 1A, the shapes of the P terminal 50 and N terminal 60 may be modified such that their external terminal portion 51 and external terminal portion 61 are arranged to overlap each other via an insulating member in plan view.

Furthermore, three semiconductor devices 1A, each as described in the first embodiment, may be used to form a three-phase voltage inverter circuit with U-phase, V-phase, and W-phase (FIG. 2). In this embodiment, the semiconductor device 1A has been described as a two-in-one package. In the case of such a three-phase voltage inverter circuit, a six-in-one package may be formed by housing functional components for the U phase, V phase, and W phase in a single case.

Second Embodiment

Figure 8:
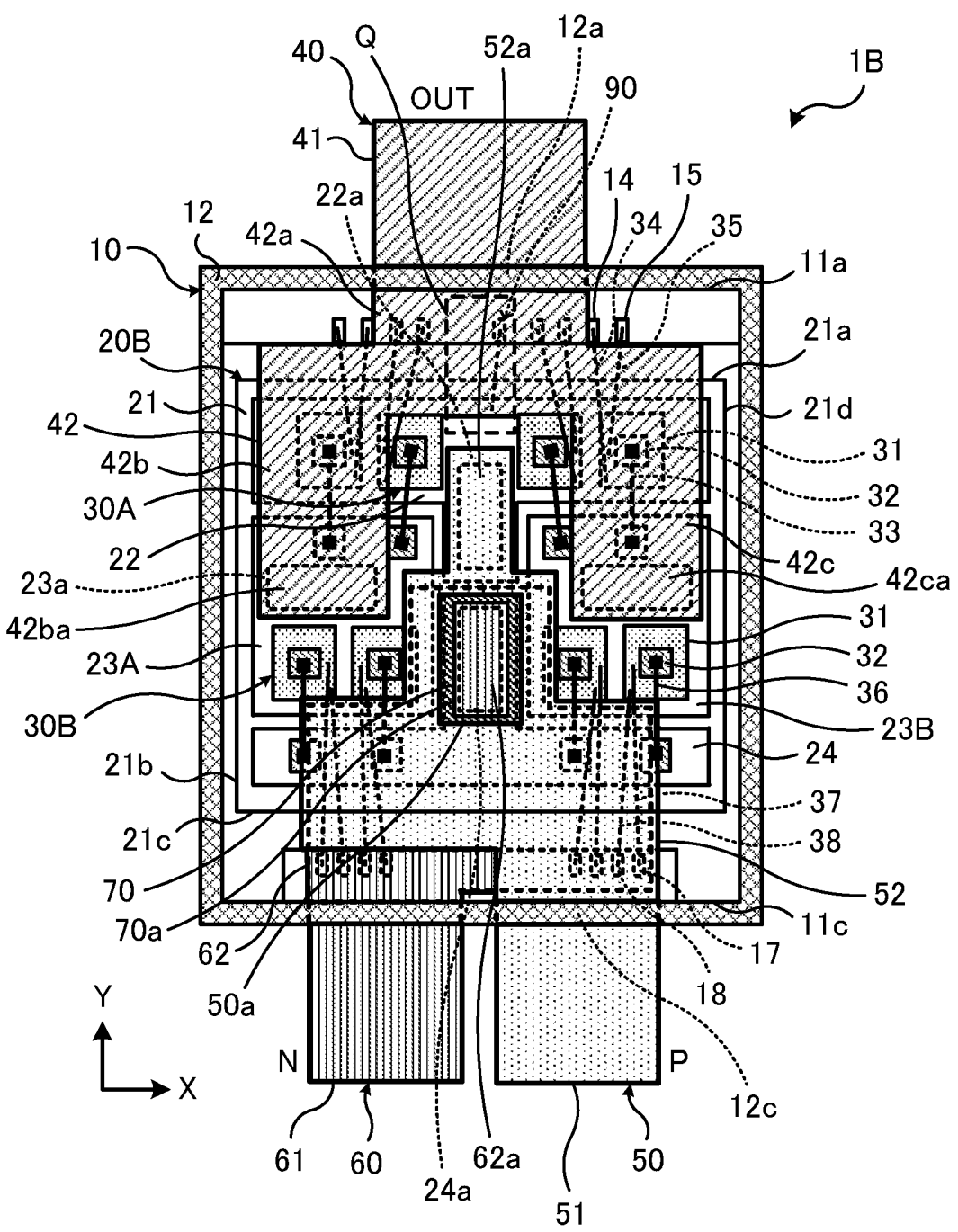
FIG. 8 is a view for describing an example of a semiconductor device according to a second embodiment (part 1)
Figure 9:
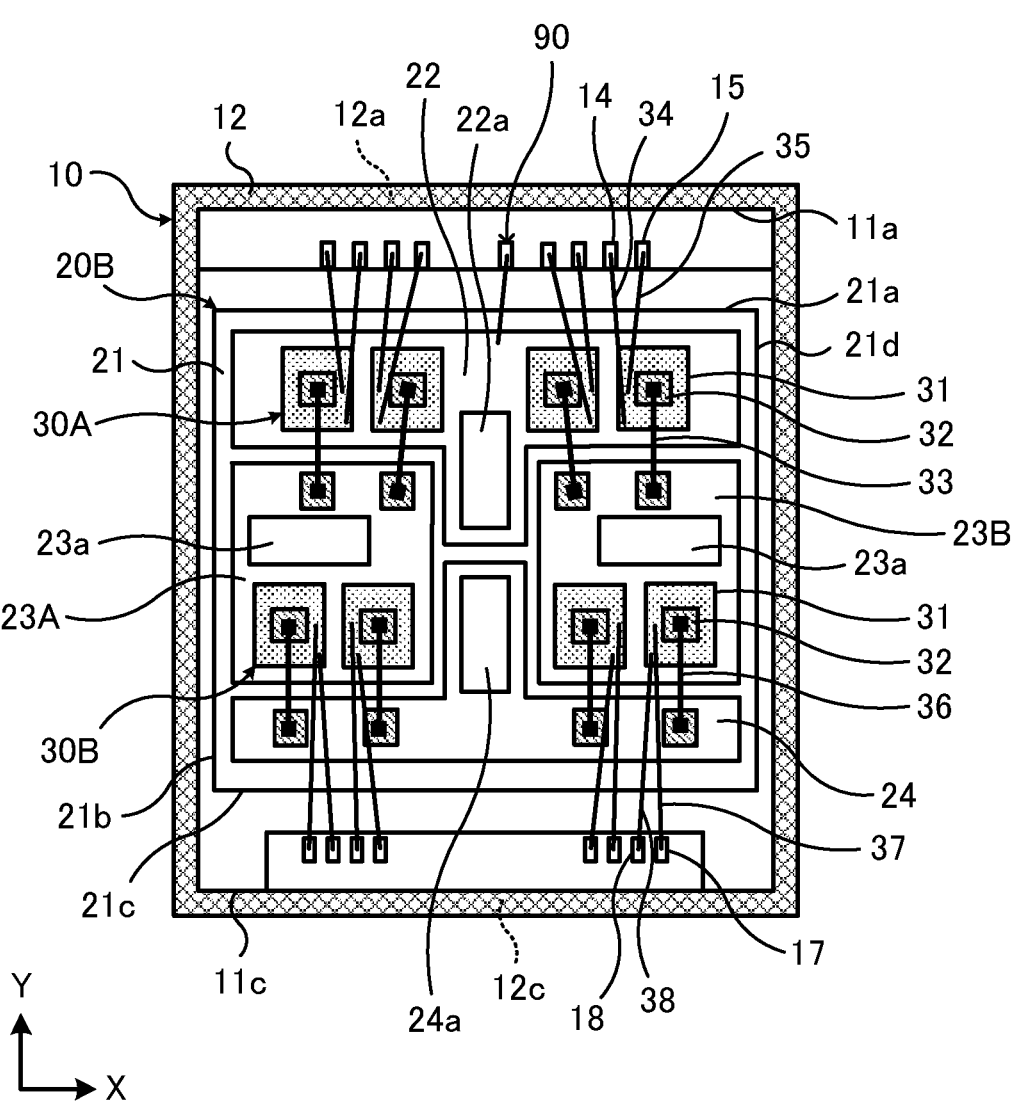
FIG. 9 is a view for describing the example of the semiconductor device according to the second embodiment (part 2)
Figures 10A, 10B, 10C:
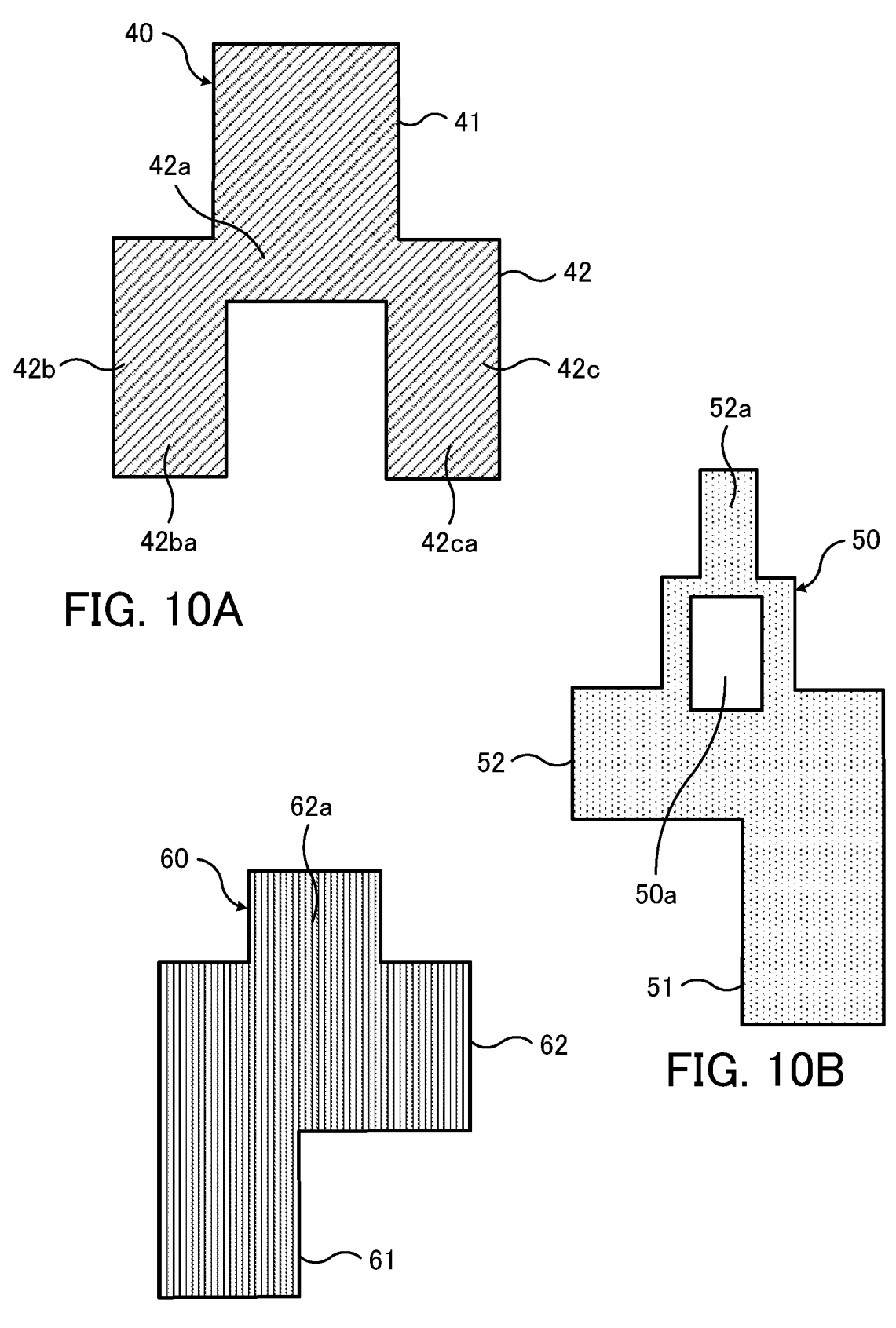
FIGS. 10A to 10C include views for describing the example of the semiconductor device according to the second embodiment (part 3)

FIGS. 8 to 10 are views for describing an example of a semiconductor device according to a second embodiment. FIG. 8 is a main-part plan view schematically illustrating the example of the semiconductor device. FIG. 9 is a main-part plan view schematically illustrating a case, an insulated circuit board, and others in the example of the semiconductor device. FIG. 10A is a main-part plan view schematically illustrating an OUT terminal in the example of the semiconductor device. FIG. 10B is a main-part plan view schematically illustrating a P terminal in the example of the semiconductor device. FIG. 10C is a main-part plan view schematically illustrating an N terminal in the example of the semiconductor device.

A semiconductor device 1B illustrated in FIG. 8 is an example of a so-called two-in-one semiconductor device that has a circuit configuration as illustrated in FIG. 1. The semiconductor device 1B includes a case 10, an insulated circuit board 20B, a plurality of semiconductor elements 30A, and a plurality of semiconductor elements 30B, as illustrated in FIGS. 8 and 9. The semiconductor device 1B further includes an OUT terminal 40, a P terminal 50, and an N terminal 60, as illustrated in FIGS. 8 and 10A to 10C. The OUT terminal 40, P terminal 50, and N terminal 60 may each be referred to as a main current wiring member.

Inside the case 10, the insulated circuit board 20B on which the group of semiconductor elements 30A in an upper arm and the group of semiconductor elements 30B in a lower arm are mounted is disposed. The insulated circuit board 20B includes two conductive plates 23A and 23B, on each of which two semiconductor elements 30B from the group of, for example, four semiconductor elements 30B in the lower arm are mounted, as illustrated in FIGS. 8 and 9. On the conductive plate 23A and conductive plate 23B, conductive blocks 23a to which a branch portion 42b and branch portion 42c of the OUT terminal 40 are joined are disposed, respectively. A part of a conductive plate 22 on which the group of semiconductor elements 30A in the upper arm is arranged and a part of a conductive plate 24 to which the group of semiconductor elements 30B in the lower arm is connected with wires extend to the space between the conductive plate 23A and the conductive plate 23B. Conductive blocks 22a and 24a are respectively disposed in the parts of the conductive plates 22 and 24 extending to the space between the conductive plate 23A and the conductive plate 23B. For example, the conductive plate 22, conductive plate 23A, conductive plate 23B, and conductive plate 24 are arranged such that the total area of the conductive plate 23A and conductive plate 23B is larger than the area of the conductive plate 22 and the area of the conductive plate 22 is larger than that of the conductive plate 24.

In order to suppress heat generation or the like at the junctions of relatively high current density between the OUT terminal 40 and each of the two conductive blocks 23a, the total plan size of the two conductive blocks 23a on the conductive plates 23A and 23B is set to be larger than both the plan size of the conductive block 22a on the conductive plate 22 and the plan size of the conductive block 24a on the conductive plate 24. Furthermore, in order not to increase the size of the semiconductor device 1B (the insulated circuit board 20B and case 10 thereof), each of the two conductive blocks 23a is provided at a position sandwiched between the semiconductor elements 30B in the lower arm and the semiconductor elements 30A in the upper arm in the Y direction, and is shaped and arranged to be longer in the X direction (first direction) than in the Y direction (second direction) in plan view. In addition, the conductive block 22a and conductive block 24a are shaped and arranged to be longer in the Y direction than in the X direction in plan view.

The insulated circuit board 20B of the semiconductor device 1B differs from the insulated circuit board 20A of the semiconductor device 1A described earlier in the first embodiment in that the insulated circuit board 20B has the above-described configuration.

The group of semiconductor elements 30A in the upper arm is disposed on the conductive plate 22, with their collector electrodes 31 connected to the conductive plate 22 and their emitter electrodes 32 each connected to the corresponding one of the conductive plates 23A and 23B via a wire 33. Gate wires 34 and sense emitter wires 35 are connected to the group of semiconductor elements 30A in the upper arm, and are also respectively connected to external gate terminals 14 and external sense emitter terminals 15. On the other hand, for example, two semiconductor elements from the group of semiconductor elements 30B in the lower arm are disposed on each of the conductive plate 23A and conductive plate 23B, with their collector electrodes 31 each connected to the corresponding one of the conductive plates 23A and 23B and their emitter electrodes 32 connected to the conductive plate 24 via wires 36. Gate wires 37 and sense emitter wires 38 are connected to the group of semiconductor elements 30B in the lower arm, and are also respectively connected to external gate terminals 17 and external sense emitter terminal 18. Furthermore, an SP part 90 (the external SP terminal 19 and SP wire 39 described earlier in the first embodiment) is connected to the conductive plate 22 to which the collector electrodes 31 of the group of semiconductor elements 30A in the upper arm are connected.

The OUT terminal 40 includes an external terminal portion 41 arranged outside the case 10 and an extension portion 42 arranged inside the case 10, and is arranged to pass through an opening 12a formed in the side wall 12 at one side 11a of the case 10, as illustrated in FIGS. 8 and 10A. The extension portion 42 of the OUT terminal 40 includes a branch base portion 42a, and a branch portion 42b and branch portion 42c branching off from the branch base portion 42a. The branch portions 42b and 42c are respectively connected at connection portions 42ba and 42ca thereof to the two conductive blocks 23a. The OUT terminal 40 is therefore electrically connected to the conductive plates 23A and 23B via the connection portions 42ba and 42ca and the two conductive blocks 23a connected thereto.

As illustrated in FIG. 8 and FIG. 10B, the P terminal 50 includes an external terminal portion 51 arranged outside the case 10 and an extension portion 52 arranged inside the case 10, and is arranged to pass through an opening 12c formed in the side wall 12 at another side 11c of the case 10. The extension portion 52 is connected at a connection portion 52a thereof to the conductive block 22a disposed on the conductive plate 22. The P terminal 50 is therefore electrically connected to the conductive plate 22 via the connection portion 52a and the conductive block 22a.

As illustrated in FIGS. 8 and 10C, the N terminal 60 includes an external terminal portion 61 arranged outside the case 10 and an extension portion 62 arranged inside the case 10, and is arranged to pass through the opening 12c formed in the side wall 12 at the other side 11c of the case 10 together with the P terminal 50. The extension portion 62 is connected at a connection portion 62a thereof to the conductive block 24a disposed on the conductive plate 24. The N terminal 60 is therefore electrically connected to the conductive plate 24 via the connection portion 62a and the conductive block 24a.

The P terminal 50 and N terminal 60 are stacked via an insulating member 70 such as an insulating sheet, at least inside the case 10. In the semiconductor device 1B, the N terminal 60, insulating member 70, and P terminal 50 are arranged in this order in a direction away from the insulated circuit board 20B. The P terminal 50 and N terminal 60 are shaped to partially overlap each other in plan view. The N terminal 60 does not exist under the connection portion 52a of the P terminal 50. The connection portion 62a of the N terminal 60 is exposed through an opening 50a of the P terminal 50 and an opening 70a of the insulating member 70. The connection portion 62a of the N terminal 60 is joined to the conductive block 24a by laser welding or another through the opening 50a of the P terminal 50 and the opening 70a of the insulating member 70. As illustrated in FIG. 8, in plan view, the extension portion 52 of the P terminal 50 and the extension portion 62 of the N terminal 60 extend across the side 11c of the case 10 to the space between the branch portion 42b and branch portion 42c of the extension portion 42 of the OUT terminal 40. In plan view, the connection portions 42ba and 42ca of the branch portions 42b and 42c of the OUT terminal 40, which are connected to the two conductive blocks 23a, are arranged to sandwich the extension portion 52 of the P terminal 50 and the extension portion 62 of the N terminal 60.

In the semiconductor device 1B, the external terminal portion 61 of the N terminal 60, the conductive plate 24 to which the N terminal 60 is connected, the conductive plates 23A and 23B to which the OUT terminal 40 is connected, and the external terminal portion 41 of the OUT terminal 40 are arranged in this order in the Y direction.

As in the example illustrated in FIG. 3B, the inside of the case 10 may be filled with a sealing resin to seal the insulated circuit board 20B, and the group of semiconductor elements 30A and the group of semiconductor elements 30B mounted on the insulated circuit board 20B. Note that the illustration of the sealing resin is omitted for convenience in FIG. 8.

During the operation of the semiconductor device 1B configured as above, a high-potential power supply voltage is applied to the P terminal 50, and a low-potential power supply voltage is applied to the N terminal 60. A main current entering from the external terminal portion 51 of the P terminal 50 flows to the extension portion 52, and after passing through the conductive block 22a via the connection portion 52a of the extension portion 52, it flows to the conductive plate 22 of the insulated circuit board 20B and is supplied to the collector electrodes 31 of the group of semiconductor elements 30A in the upper arm. The main current supplied to the collector electrodes 31 passes through the group of semiconductor elements 30A in the upper arm, which are controlled via the gate wires 34, and then flows to the conductive plate 23A and conductive plate 23B of the insulated circuit board 20B through the emitter electrodes 32 and the wires 33 connected to the emitter electrodes 32. The main current having flowed to the conductive plate 23A and conductive plate 23B passes through the two conductive blocks 23a, and then flows through the OUT terminal 40, from the connection portions 42ba and 42ca through the branch portions 42b and 42c and then branch base portion 42a of the extension portion 42 to the external terminal portion 41.

On the other hand, a main current entering from the external terminal portion 41 of the OUT terminal 40 flows through the branch base portion 42a and branch portions 42b and 42c of the extension portion 42, and after passing through the two conductive blocks 23a via the connection portions 42ba and 42ca, it flows to the conductive plates 23A and 23B of the insulated circuit board 20B and is then supplied to the collector electrodes 31 of the group of semiconductor elements 30B in the lower arm. The main current supplied to the collector electrodes 31 passes through the group of semiconductor elements 30B in the lower arm, which are controlled via the gate wires 37, and then flows to the conductive plate 24 of the insulated circuit board 20B through the emitter electrodes 32 and the wires 36 connected to the emitter electrodes 32. The main current having flowed to the conductive plate 24 passes through the conductive block 24a, and then flows through the N terminal 60, from the connection portion 62a and then extension portion 62 to the external terminal portion 61.

In the semiconductor device 1B, the two conductive blocks 23a to which the OUT terminal 40 is connected are disposed in the space between the joints of the wires 33 extending from the group of semiconductor elements 30A in the upper arm and the group of semiconductor elements 30B in the lower arm, on the conductive plates 23A and 23B. In the semiconductor device 1B, the main current flowing from the P terminal 50 through the group of semiconductor elements 30A in the upper arm to the OUT terminal 40 is prevented from flowing under the group of semiconductor elements 30B in the lower arm. Therefore, in the semiconductor device 1B, both the main current flowing from the P terminal 50 through the group of semiconductor elements 30A in the upper arm to the OUT terminal 40 and the main current flowing from the OUT terminal 40 through the group of semiconductor elements 30B in the lower arm to the N terminal 60 are prevented from flowing under the group of semiconductor elements 30B in the lower arm. As a result, it is possible to prevent degradation in the performance of the group of semiconductor elements 30B in the lower arm due to overheating and thus to prevent degradation in the performance of the semiconductor device 1B including the group of semiconductor elements 30B in the lower arm.

Moreover, in the semiconductor device 1B, the P terminal 50 (the extension portion 52 thereof) and the N terminal 60 (the extension portion 62 thereof) are stacked via the insulating member 70 such as to partially overlap each other in plan view. In the semiconductor device 1B, the path of the main current flowing between the P terminal 50 and the N terminal 60 forms a closed loop with a relatively short length, and a reduction of the inductance is achieved by magnetic flux cancellation between the P terminal 50 and the N terminal 60 that face each other via the insulating member 70. This suppresses voltage surges that are caused by switching of the group of semiconductor elements 30A and the group of semiconductor elements 30B, which results in preventing degradation in the performance of the semiconductor device 1B. In addition, the semiconductor device 1B does not need another pattern (conductive plate) in the insulated circuit board 20B in order to form a closed loop for the path of the main current between the P terminal 50 and the N terminal 60. Therefore, high-density integration is achieved, and an increase in the size of the semiconductor device 1B is therefore prevented.

Furthermore, in the semiconductor device 1B, the N terminal 60 that is connected to the low potential side of the group of semiconductor elements 30B in the lower arm faces the gate wires 37 of the group of semiconductor elements 30B in the lower arm and the sense emitter wires 38 connected to the low potential side of the group of semiconductor elements 30B in the lower arm. Therefore, it is possible to arrange the N terminal 60 relatively close to the gate wires 37 and the sense emitter wires 38. Furthermore, in the semiconductor device 1B, the OUT terminal 40 that is connected to the low potential side of the group of semiconductor elements 30A in the upper arm faces the gate wires 34 of the group of semiconductor elements 30A in the upper arm and the sense emitter wires 35 connected to the low potential side of the group of semiconductor elements 30A in the upper arm. Therefore, it is possible to arrange the OUT terminal 40 relatively close to the gate wires 34 and the sense emitter wires 35. By arranging the N terminal 60 close to the gate wires 37 and the sense emitter wires 38 and arranging the OUT terminal 40 close to the gate wires 34 and the sense emitter wires 35, it is possible to reduce the height of the semiconductor device 1B. In addition, in the case where the SP part 90 that is electrically connected to the conductive plate 22 is arranged as in the semiconductor device 1B, an insulating member such as an insulating sheet may be provided between the SP part 90 and the OUT terminal 40, for example, between the SP part 90 and the OUT terminal 40 in a region Q illustrated in FIG. 8. Alternatively, a partial area of the OUT terminal 40 facing the SP part 90, for example, a partial area of the OUT terminal 40 in the region Q illustrated in FIG. 8 may be removed. This reduces the effect of potential across the OUT terminal 40, which is arranged close to the gate wires 34 and sense emitter wires 35, on the potential across the SP part 90, which prevents the semiconductor device 1B from being damaged due to overcurrent.

In this connection, the relationship between the above-described semiconductor device 1B and the elements described in claims 1 and 10 of the present application is the same as described earlier in the first embodiment, except that the conductive plate 23 of the semiconductor device 1A described earlier in the first embodiment is replaced with the conductive plates 23A and conductive plate 23B of the semiconductor device 1B. The conductive plate 23A and conductive plate 23B of the semiconductor device 1B correspond to a "first output conductive pattern" and a "second output conductive pattern" (claim 22).

In the semiconductor device 1B described in this second embodiment, the external terminal portion 51 of the P terminal 50 and the external terminal portion 61 of the N terminal 60, which are arranged outside the case 10, may be arranged to overlap each other via an insulating member in plan view. In the semiconductor device 1B, the shapes of the P terminal 50 and N terminal 60 may be modified such that their external terminal portion 51 and external terminal portion 61 are arranged to overlap each other via an insulating member in plan view.

Furthermore, three semiconductor devices 1B, each as described in the second embodiment, may be used to form a three-phase voltage inverter circuit with U-phase, V-phase, and W-phase (FIG. 2). In this embodiment, the semiconductor device 1B has been described as a two-in-one package. In the case of such a three-phase voltage inverter circuit, a six-in-one package may be formed by housing functional components for the U-phase, V-phase, and W-phase in a single case.

Third Embodiment

Figure 11:
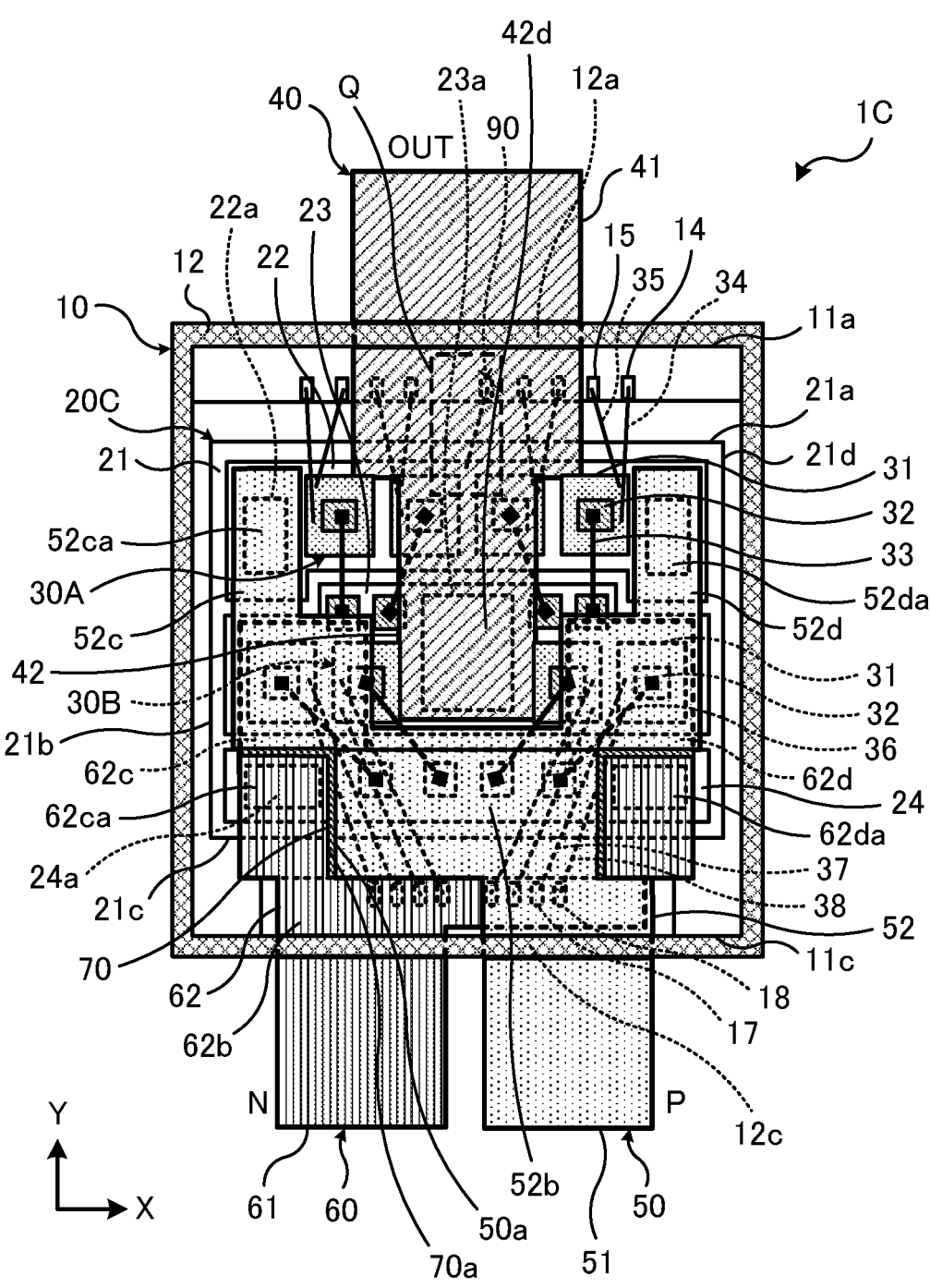
FIG. 11 is a view for describing an example of a semiconductor device according to a third embodiment (part 1)
Figure 12:
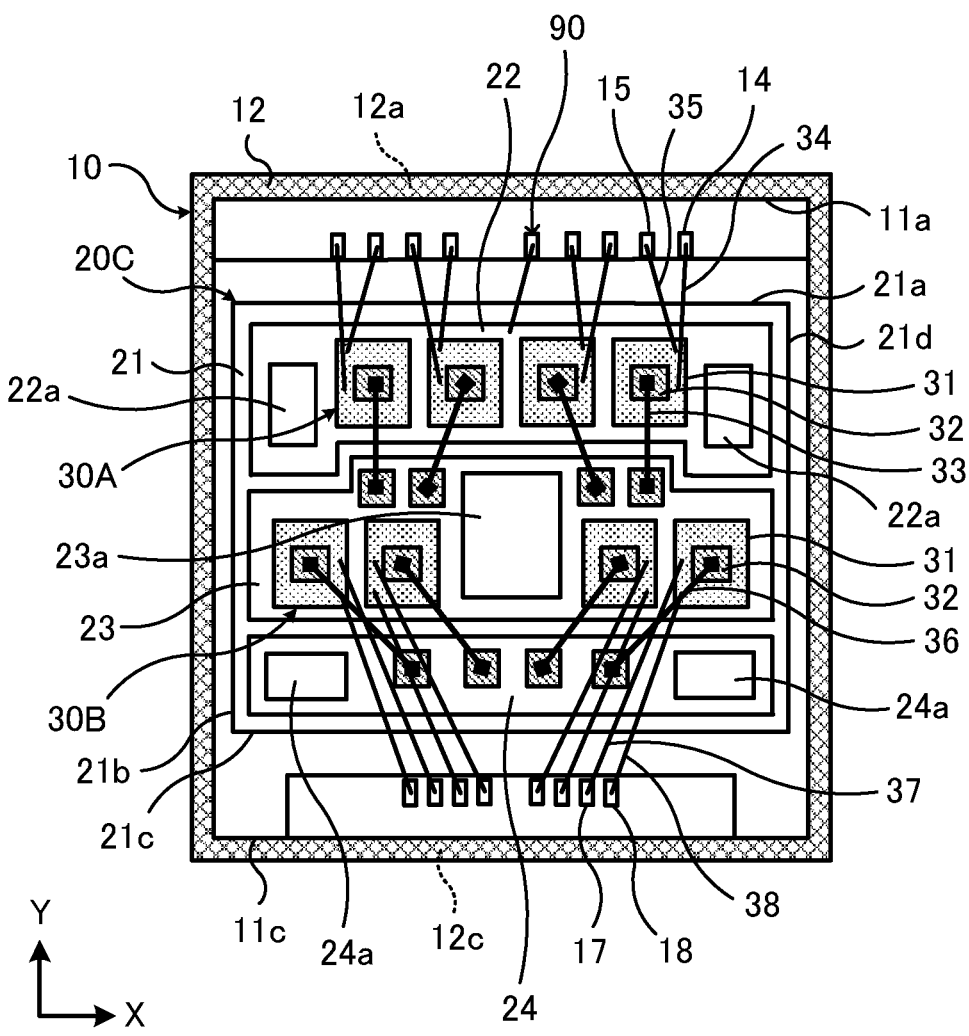
FIG. 12 is a view for describing the example of the semiconductor device according to the third embodiment (part 2)
Figures 13A, 13B, 13C:
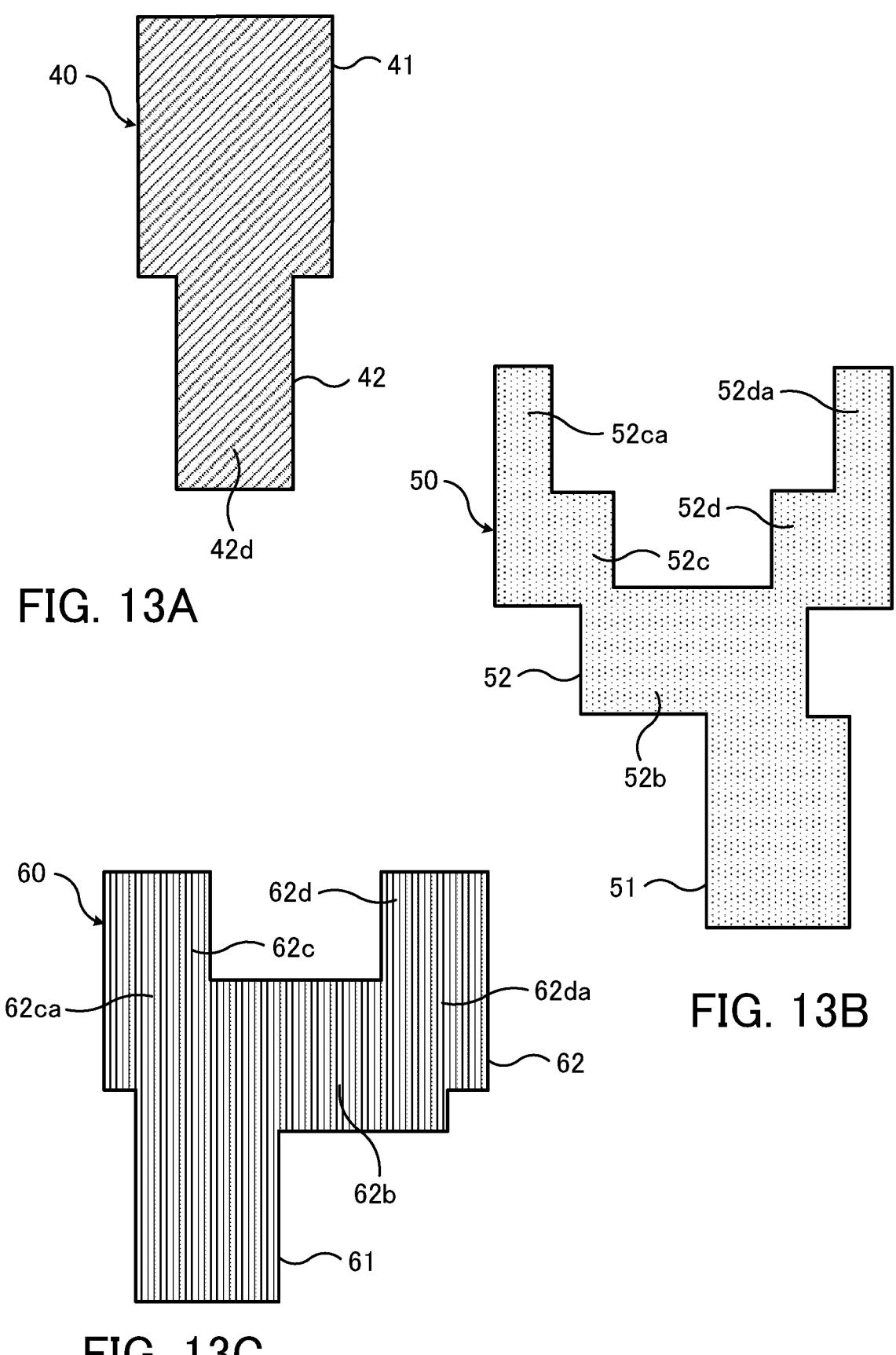
FIGS. 13A to 13C include views for describing the example of the semiconductor device according to the third embodiment (part 3)

FIGS. 11 to 13 are views for describing an example of a semiconductor device according to a third embodiment. FIG. 11 is a main-part plan view schematically illustrating the example of the semiconductor device. FIG. 12 is a main-part plan view schematically illustrating a case, an insulated circuit board, and others in the example of the semiconductor device. FIG. 13A is a main-part plan view schematically illustrating an OUT terminal in the example of the semiconductor device. FIG. 13B is a main-part plan view schematically illustrating a P terminal in the example of the semiconductor device. FIG. 13C is a main-part plan view schematically illustrating an N terminal in the example of the semiconductor device.

A semiconductor device 1C illustrated in FIG. 11 is an example of a so-called two-in-one semiconductor device that has a circuit configuration as illustrated above in FIG. 1. The semiconductor device 1C includes a case 10, an insulated circuit board 20C, a plurality of semiconductor elements 30A, and a plurality of semiconductor elements 30B, as illustrated in FIGS. 11 and 12. The semiconductor device 1C further includes an OUT terminal 40, a P terminal 50, and an N terminal 60, as illustrated in FIGS. 11 and 13A to 13C. The OUT terminal 40, P terminal 50, and N terminal 60 may each be referred to as a main current wiring member.

Inside the case 10, the insulated circuit board 20C on which the group of semiconductor elements 30A in an upper arm and the group of semiconductor elements 30B in a lower arm are mounted is disposed. The insulated circuit board 20C includes a conductive plate 22, conductive plate 23, and conductive plate 24 provided on an insulating substrate 21 (substrate), as illustrated in FIGS. 11 and 12. In the semiconductor device 1C, the conductive plate 24, conductive plate 23, and conductive plate 22 are arranged in this order in the Y direction from the conductive plate 24. For example, the conductive plate 22, conductive plate 23, and conductive plate 24 are arranged such that the area of the conductive plate 23 is larger than that of the conductive plate 22 and the area of the conductive plate 22 is larger than that of the conductive plate 24. The group of semiconductor elements 30A in the upper arm is disposed on the conductive plate 22, and the group of semiconductor elements 30B in the lower arm is disposed on the conductive plate 23. In the group of semiconductor elements 30A in the upper arm, their collector electrodes 31 are connected to the conductive plate 22, and their emitter electrodes 32 are connected to the conductive plate 23 with wires 33. Gate wires 34 and sense emitter wires 35 are connected to the group of semiconductor elements 30A in the upper arm, and are also respectively connected to external gate terminals 14 and external sense emitter terminals 15. In addition, in the group of semiconductor elements 30B in the lower arm, their collector electrodes 31 are connected to the conductive plate 23, and their emitter electrodes 32 are connected to the conductive plate 24 with wires 36. Gate wires 37 and sense emitter wires 38 are connected to the group of semiconductor elements 30B in the lower arm, and are also respectively connected to external gate terminals 17 and external sense emitter terminals 18. In addition, an SP part 90 (the external SP terminal 19 and SP wire 39 described earlier in the first embodiment) is connected to the conductive plate 22 to which the collector electrodes 31 of the group of semiconductor elements 30A in the upper arm are connected.

On the conductive plate 22 to which the collector electrodes 31 of the group of semiconductor elements 30A in the upper arm are connected, two conductive blocks 22a to which the P terminal 50 is connected are disposed. The two conductive blocks 22a are disposed outside the group of semiconductor elements 30A in the upper arm, i.e., disposed at positions sandwiching the four semiconductor elements 30A aligned in the X direction.

On the conductive plate 23 to which the emitter electrodes 32 of the group of semiconductor elements 30A in the upper arm and the collector electrodes 31 of the group of semiconductor elements 30B in the lower arm are connected, a conductive block 23a to which the OUT terminal 40 is connected is disposed. The conductive block 23a is disposed in the middle of a group of joints of the wires 33 extending from the emitter electrodes 32 of the group of semiconductor elements 30A in the upper arm and in the middle of the group of semiconductor elements 30B in the lower arm, i.e., disposed at a position sandwiched between the second and third semiconductor elements 30B among the four semiconductor elements 30B aligned in the X direction.

On the conductive plate 24 to which the emitter electrodes 32 of the group of semiconductor elements 30B in the lower arm are connected, two conductive blocks 24a to which the N terminal 60 is connected are disposed. The two conductive blocks 24a are disposed outside a group of joints of the wires 36 extending from the emitter electrodes 32 of the group of semiconductor elements 30B in the lower arm, i.e., disposed at positions sandwiching the group of joints aligned in the X direction.

In order not to increase the size of the semiconductor device 1C (the insulated circuit board 20C and case 10 thereof), the two conductive blocks 22a sandwiching the group of semiconductor elements 30A in the upper arm, the conductive block 23a sandwiched by the group of semiconductor elements 30B in the lower arm, and the two conductive blocks 24a sandwiching the group of joints of the wires 36 extending from the group of semiconductor elements 30B in the lower arm are formed in predetermined shapes. More specifically, the two conductive blocks 22a on the conductive plate 22 and the conductive block 23a on the conductive plate 23 are set to be longer in the Y direction than in the X direction in plan view. The two conductive blocks 24a on the conductive plate 24 are set to be longer in the X direction than in the Y direction in plan view. In addition, in order to suppress heat generation or the like at the junction of relatively high current density between the OUT terminal 40 and the conductive block 23a, the plan size of the conductive block 23a on the conductive plate 23 is set to be larger than both the total plan size of the two conductive blocks 22a on the conductive plate 22 and the total plan size of the two conductive blocks 24a on the conductive plate 24.

The OUT terminal 40 includes an external terminal portion 41 arranged outside the case 10 and an extension portion 42 arranged inside the case 10, as illustrated in FIGS. 11 and 13A. The external terminal portion 41 is provided on the side of the case 10 where one side 11a is located. The extension portion 42 is continuous with the external terminal portion 41 and extends therefrom across the one side 11*a* of the case 10 toward the inside of the case 10. The OUT terminal 40 is arranged to pass through an opening 12*a* formed in the side wall 12 at the one side 11*a* of the case 10. The extension portion 42 is connected at a connection portion 42*d* thereof to the conductive block 23*a* disposed on the conductive plate 23 to which the collector electrodes 31 of the group of semiconductor elements 30B in the lower arm are connected. The extension portion 42 connects the external terminal portion 41 to the connection portion 42*d*. The OUT terminal 40 is therefore electrically connected to the conductive plate 23 via the connection portion 42*d* and the conductive block 23*a*.

As illustrated in FIGS. 11 and 13B, the P terminal 50 includes an external terminal portion 51 arranged outside the case 10 and an extension portion 52 arranged inside the case 10. The external terminal portion 51 is provided on the side of the case 10 where another side 11*c* is located. The extension portion 52 is continuous with the external terminal portion 51 and extends therefrom across the other side 11*c* of the case 10 toward the inside of the case 10. The P terminal 50 is arranged to pass through an opening 12*c* formed in the side wall 12 at the other side 11*c* of the case 10. The extension portion 52 includes a branch base portion 52*b* extending across the other side 11*c* of the case 10 toward the inside of the case 10, and a branch portion 52*c* and branch portion 52*d* branching off from the branch base portion 52*b* in plan view. The branch portions 52*c* and 52*d* are respectively connected at connection portions 52*ca* and 52*da* thereof to the two conductive blocks 22*a* disposed on the conductive plate 22, to which the collector electrodes 31 of the group of semiconductor elements 30A in the upper arm are connected. The extension portion 52 connects the external terminal portion 51 to the connection portions 52*ca* and 52*da* of the branch portions 52*c* and 52*d* connected to the two conductive blocks 22*a*. The P terminal 50 is therefore electrically connected to the conductive plate 22 via the connection portions 52*ca* and 52*da* and the two conductive blocks 22*a* connected thereto.

As illustrated in FIGS. 11 and 13C, the N terminal 60 includes an external terminal portion 61 arranged outside the case 10 and an extension portion 62 arranged inside the case 10. The external terminal portion 61 is provided on the side of the case 10 where the other side 11*c* is located. The extension portion 62 is continuous with the external terminal portion 61 and extends therefrom across the other side 11*c* of the case 10 toward the inside of the case 10. The N terminal 60 is arranged to pass through the opening 12*c* formed in the side wall 12 at the other side 11*c* of the case 10 together with the P terminal 50. The extension portion 62 includes a branch base portion 62*b* extending across the other side 11*c* of the case 10 toward the inside of the case 10, and a branch portion 62*c* and branch portion 62*d* branching off from the branch base portion 62*b* in plan view. The branch portions 62*c* and 62*d* are respectively connected at connection portions 62*ca* and 62*da* thereof to the two conductive blocks 24*a* disposed on the conductive plate 24, to which the emitter electrodes 32 of the group of semiconductor elements 30B in the lower arm are connected. The extension portion 62 connects the external terminal portion 61 to the connection portions 62*ca* and 62*da* of the branch portions 62*c* and 62*d* respectively connected to the two conductive blocks 24*a*. The N terminal 60 is therefore electrically connected to the conductive plate 24 via the connection portions 62*ca* and 62*da* and the two conductive blocks 24*a* connected thereto.

The P terminal 50 and N terminal 60 are stacked via an insulating member 70 such as an insulating sheet, at least inside the case 10. In the semiconductor device 1C, the N terminal 60, insulating member 70, and P terminal 50 are arranged in this order in a direction away from the insulated circuit board 20C. The P terminal 50 and N terminal 60 are shaped to partially overlap each other in plan view. The N terminal 60 does not exist under the connection portion 52*ca* and connection portion 52*da* of the P terminal 50. Openings 50*a* and openings 70*a* (cutouts) are formed in the P terminal 50 and insulating member 70, respectively. The connection portions 62*ca* and 62*da* of the N terminal 60 are exposed in the openings 50*a* of the P terminal 50 and the openings 70*a* of the insulating member 70. The connection portions 62*ca* and 62*da* of the N terminal 60 are located under the openings 50*a* of the P terminal 50 and the openings 70*a* of the insulating member 70. The connection portions 62*ca* and 62*da* of the N terminal 60 are joined to the two conductive blocks 24*a* by laser welding or another through the openings 50*a* of the P terminal 50 and the openings 70*a* of the insulating member 70.

As illustrated in FIG. 11, in plan view, the extension portion 42 of the OUT terminal 40 extends to the space between the branch portion 52*c* and branch portion 52*d* of the extension portion 52 of the P terminal 50 and the space between the branch portion 62*c* and branch portion 62*d* of the extension portion 62 of the N terminal 60. In plan view, the connection portions 52*ca* and 52*da* of the branch portions 52*c* and 52*d* of the P terminal 50, which are connected to the two conductive blocks 22*a*, are arranged to sandwich the extension portion 42 of the OUT terminal 40. In plan view, the connection portions 62*ca* and 62*da* of the branch portions 62*c* and 62*d* of the N terminal 60, which are connected to the two conductive blocks 24*a*, are arranged to sandwich the extension portion 42 of the OUT terminal 40. In plan view, the group of semiconductor elements 30A in the upper arm is disposed between the branch portion 52*c* and branch portion 52*d* of the P terminal 50.

In the semiconductor device 1C, the external terminal portion 61 of the N terminal 60, the conductive plate 24 to which the N terminal 60 is connected, the conductive plate 22 to which the P terminal 50 is connected, and the external terminal portion 41 of the OUT terminal 40 are arranged in this order in the Y direction.

As in the example illustrated in FIG. 3B, the inside of the case 10 may be filled with a sealing resin to seal the insulated circuit board 20C, and the group of semiconductor elements 30A and the group of semiconductor elements 30B mounted on the insulated circuit board 20C. Note that the illustration of the sealing resin is omitted for convenience in FIG. 11.

During the operation of the semiconductor device 1C configured as above, a high-potential power supply voltage is applied to the P terminal 50, and a low-potential power supply voltage is applied to the N terminal 60.

A main current entering from the external terminal portion 51 of the P terminal 50 flows to the branch base portion 52*b* and branch portions 52*c* and 52*d* of the extension portion 52, and after passing through the two conductive blocks 22*a* via the connection portions 52*ca* and 52*da*, it flows to the conductive plate 22 of the insulated circuit board 20C and is then supplied to the collector electrodes 31 of the group of semiconductor elements 30A in the upper arm. The main current supplied to the collector electrodes 31 passes through the group of semiconductor elements 30A in the upper arm, which are controlled via the gate wires 34, and then flows to the conductive plate 23 of the insulated circuit board 20C through the emitter electrodes 32 and the wires 33 connected to the emitter electrodes 32. The main current having flowed to the conductive plate 23 passes through the conductive block 23*a*, and then flows through the OUT terminal 40, from the connection portion 42*d* through the extension portion 42 to the external terminal portion 41.

On the other hand, a main current entering from the external terminal portion 41 of the OUT terminal 40 flows through the extension portion 42, and after passing through the conductive block 23*a* via the connection portion 42*d* of the extension portion 42, it flows to the conductive plate 23 of the insulated circuit board 20C and is then supplied to the collector electrodes 31 of the group of semiconductor elements 30B in the lower arm. The main current supplied to the collector electrodes 31 passes through the group of semiconductor elements 30B in the lower arm, which are controlled via the gate wires 37, and then flows to the conductive plate 24 of the insulated circuit board 20C through the emitter electrodes 32 and the wires 36 connected to the emitter electrodes 32. The main current having flowed to the conductive plate 24 passes through the two conductive blocks 24*a*, and then flows through the N terminal 60, from the connection portions 62*ca* and 62*da* through the branch portions 62*c* and 62*d* and then branch base portion 62*b* of the extension portion 62 to the external terminal portion 61.

In the semiconductor device 1C, the main current flowing from the P terminal 50 through the group of semiconductor elements 30A in the upper arm to the OUT terminal 40 is prevented from flowing under the group of semiconductor elements 30B in the lower arm. Therefore, in the semiconductor device 1C, both the main current flowing from the P terminal 50 through the group of semiconductor elements 30A in the upper arm to the OUT terminal 40 and the main current flowing from the OUT terminal 40 through the group of semiconductor elements 30B in the lower arm to the N terminal 60 are prevented from flowing under the group of semiconductor elements 30B in the lower arm. As a result, it is possible to prevent degradation in the performance of the group of semiconductor elements 30B in the lower arm due to overheating and thus to prevent degradation in the performance of the semiconductor device 1C including the group of semiconductor elements 30B in the lower arm.

Moreover, in the semiconductor device 1C, the P terminal 50 (the extension portion 52 thereof) and the N terminal 60 (the extension portion 62 thereof) are stacked via the insulating member 70 such as to partially overlap each other in plan view. In the semiconductor device 1C, the path of the main current flowing between the P terminal 50 and the N terminal 60 forms a closed loop with a relatively short length, and a reduction of the inductance is achieved by magnetic flux cancellation between the P terminal 50 and the N terminal 60 that face each other via the insulating member 70. This suppresses voltage surges that are caused by switching of the group of semiconductor elements 30A and the group of semiconductor elements 30B, which results in preventing degradation in the performance of the semiconductor device 1C. In addition, the semiconductor device 1C does not need another pattern (conductive plate) in the insulated circuit board 20C in order to form a closed loop for the path of the main current between the P terminal 50 and the N terminal 60. Therefore, high-density integration is achieved, and an increase in the size of the semiconductor device 1C is therefore prevented.

Furthermore, in the semiconductor device 1C, the N terminal 60 that is connected to the low potential side of the group of semiconductor elements 30B in the lower arm faces the gate wires 37 of the group of semiconductor elements 30B in the lower arm and the sense emitter wires 38 connected to the low potential side of the group of semiconductor elements 30B in the lower arm. In addition, in the semiconductor device 1C, the OUT terminal 40 that is connected to the low potential side of the group of semiconductor elements 30A in the upper arm faces the gate wires 34 of the group of semiconductor elements 30A in the upper arm and the sense emitter wires 35 connected to the low potential side of the group of semiconductor elements 30A in the upper arm. Therefore, it is possible to arrange the N terminal 60 relatively close to the gate wires 37 and the sense emitter wires 38 and arrange the OUT terminal 40 relatively close to the gate wires 34 and the sense emitter wires 35, which makes it possible to reduce the height of the semiconductor device 1C. In addition, in the case where an SP part 90 that is electrically connected to the conductive plate 22 is arranged as in the semiconductor device 1C, an insulating member such as an insulating sheet may be provided between the SP part 90 and the OUT terminal 40, for example, between the SP part 90 and the OUT terminal 40 in a region Q illustrated in FIG. 11. Alternatively, a partial area of the OUT terminal 40 facing the SP part 90, for example, a partial area of the OUT terminal 40 in the region Q illustrated in FIG. 11 may be removed. This reduces the effect of potential across the OUT terminal 40, which is arranged close to the gate wires 34 and sense emitter wires 35, on the potential across the SP part 90, which prevents the semiconductor device 1C from being damaged due to overcurrent.

In this connection, the relationship between the above-described semiconductor device 1C and the elements described in claim 1 of the present application is as follows.

The OUT terminal 40 corresponds to the "second main current wiring member," the extension portion 42 corresponds to the "second extension portion," and the conductive plate 23 corresponds to the "conductive plate." The P terminal 50 or the N terminal 60 corresponds to the "first main current wiring member."

Here, in the case where the P terminal 50 corresponds to the "first main current wiring member," the branch base portion 52*b* corresponds to the "branch base portion," the branch portion 52*c* and branch portion 52*d* correspond to the "first branch portion and second branch portion," and the extension portion 52 corresponds to the "first extension portion," the group of semiconductor elements 30A in the upper arm corresponds to the "plurality of semiconductor elements," the emitter electrodes 32 of the group of semiconductor elements 30A in the upper arm correspond to the "first electrodes," and the collector electrodes 31 of the group of semiconductor elements 30A in the upper arm correspond to the "second electrodes." In the case where the P terminal 50 corresponds to the "first main current wiring member" as described above, the N terminal 60 corresponds to a "third main current wiring member" (claims 7 and 9), the insulating member 70 corresponds to an "insulating member" (claim 7), and the openings 50*a* correspond to a "second opening" (claim 8).

On the other hand, in the case where the N terminal 60 corresponds to the "first main current wiring member," the branch base portion 62*b* corresponds to the "branch base portion," the branch portion 62*c* and branch portion 62*d* correspond to the "first branch portion and second branch portion," the extension portion 62 corresponds to the "first extension portion," the group of semiconductor elements 30B in the lower arm corresponds to the "plurality of semiconductor elements," the collector electrodes 31 of the group of semiconductor elements 30B in the lower arm correspond to the "first electrodes," and the emitter electrodes 32 of the group of semiconductor elements 30B in the lower arm correspond to the "second electrodes." In the case where the N terminal 60 corresponds to the "first main current wiring member" as described above, the P terminal 50 corresponds to the "third main current wiring member" (claim 7).

In this connection, the relationship between the above-described semiconductor device 1C and the elements described in claim 10 of the present application is as follows.

The OUT terminal 40 corresponds to the "second main current wiring member," the external terminal portion 41 corresponds to the "second external terminal portion," the extension portion 42 corresponds to the "second extension portion," and the connection portion 42*d* corresponds to the "third connection portion." The P terminal 50 or the N terminal 60 corresponds to the "first main current wiring member."

Here, in the case where the P terminal 50 corresponds to the "first main current wiring member," the external terminal portion 51 corresponds to the "first external terminal portion," the extension portion 52 corresponds to the "first extension portion," the connection portion 52*ca* and connection portion 52*da* correspond to the "first connection portion and second connection portion," the conductive plate 22 corresponds to the "first conductive plate," the conductive plate 23 corresponds to the "second conductive plate," the group of semiconductor elements 30A in the upper arm corresponds to the "plurality of first semiconductor elements," and the group of semiconductor elements 30B in the lower arm corresponds to the "plurality of second semiconductor elements."

In the case where the P terminal 50 corresponds to the "first main current wiring member" as described above, the N terminal 60 corresponds to a "third main current wiring member" (claim 13), the external terminal portion 61 corresponds to a "third external terminal portion," the extension portion 62 corresponds to a "third extension portion," the connection portion 62*ca* and connection portion 62*da* correspond to a "fourth connection portion and fifth connection portion," the conductive plate 24 corresponds to a "third conductive plate," the wires 33 correspond to "first wires," the wires 36 correspond to "second wires," the opening 12*c* corresponds to a "first opening," and the opening 12*a* corresponds to a "second opening" (claim 13). The insulating member 70 corresponds to an "insulating member" (claim 14), the openings 50*a* correspond to a "third opening and fourth opening," the openings 70*a* correspond to a "fifth opening and sixth opening," and the conductive blocks 24*a* correspond to "conductive blocks" (claim 15). The gate wires 34 correspond to "first gate wires," the sense emitter wires 35 correspond to "first sense emitter wires," the gate wires 37 correspond to "second gate wires," the sense emitter wires 38 correspond to "second sense emitter wires," the external gate terminals 14 correspond to "first external gate terminals," the external sense emitter terminals 15 correspond to "first external sense emitter terminals," the external gate terminals 17 correspond to "second external gate terminals," and the external sense emitter terminals 18 correspond to "second external sense emitter terminals" (claim 16).

On the other hand, in the case where the N terminal 60 corresponds to the "first main current wiring member," the external terminal portion 61 corresponds to the "first external terminal portion," the extension portion 62 corresponds to the "first extension portion," the connection portion 62*ca* and connection portion 62*da* correspond to the "first connection portion and second connection portion," the conductive plate 24 corresponds to the "first conductive plate," the conductive plate 23 corresponds to the "second conductive plate," the group of semiconductor elements 30B in the lower arm corresponds to the "plurality of first semiconductor elements," and the group of semiconductor elements 30A in the upper arm corresponds to the "plurality of second semiconductor elements."

In the semiconductor device 1C described in this third embodiment, the external terminal portion 51 of the P terminal 50 and the external terminal portion 61 of the N terminal 60, which are arranged outside the case 10, may be arranged to overlap each other via an insulating member in plan view. In the semiconductor device 1C, the shapes of the P terminal 50 and N terminal 60 may be modified such that their external terminal portion 51 and external terminal portion 61 are arranged to overlap each other via an insulating member in plan view.

Furthermore, three semiconductor devices 1C, each as described in the third embodiment, may be used to form a three-phase voltage inverter circuit with U-phase, V-phase, and W-phase (FIG. 2). In this embodiment, the semiconductor device 1C has been described as a two-in-one package. In the case of such a three-phase voltage inverter circuit, a six-in-one package may be formed by housing functional components for the U-phase, V-phase, and W-phase in a single case.

Fourth Embodiment

Figure 14:
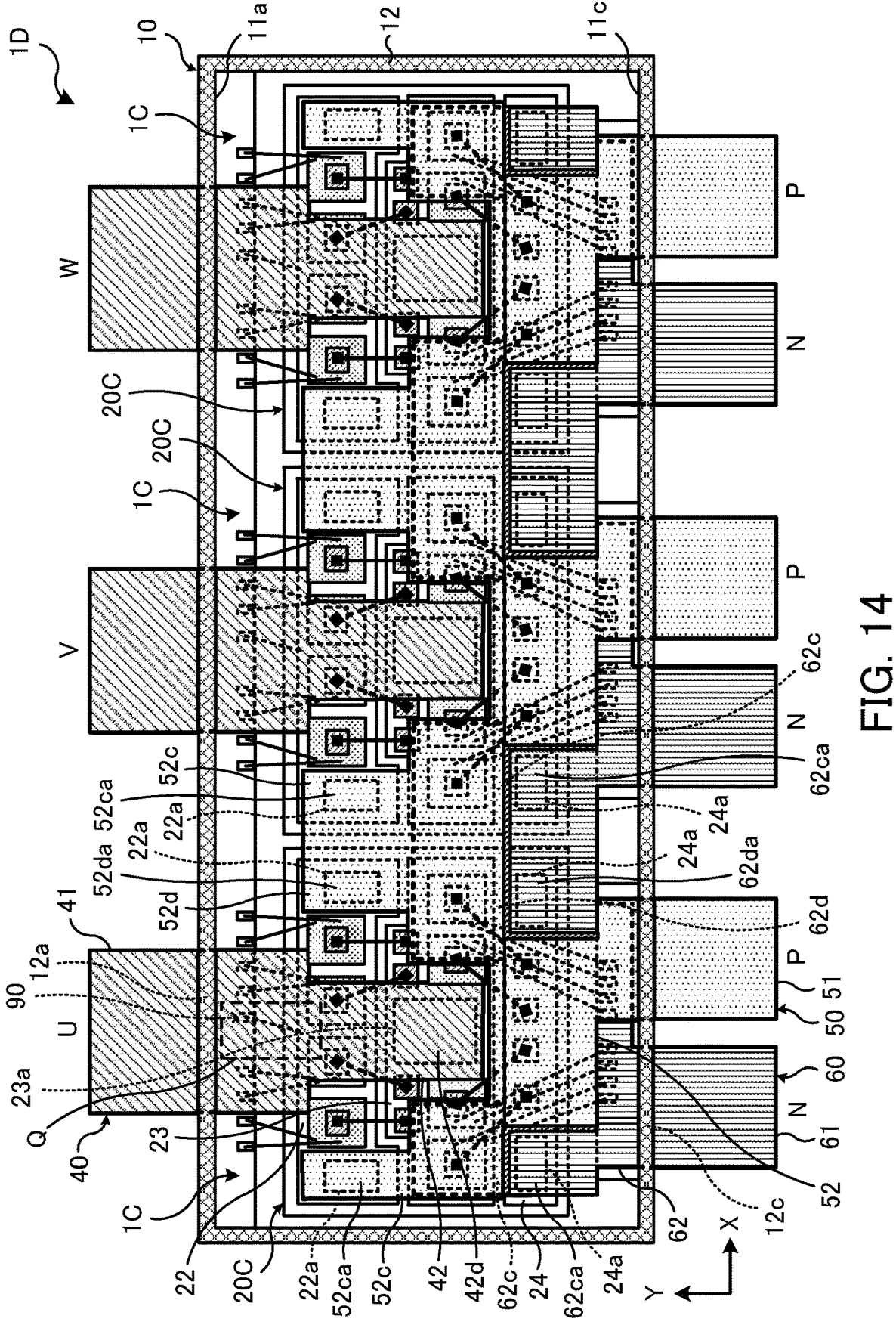
FIG. 14 is a view for describing an example of a semiconductor device according to a fourth embodiment.

FIG. 14 is a view for describing an example of a semiconductor device according to a fourth embodiment. FIG. 14 is a main-part plan view schematically illustrating the example of the semiconductor device.

A semiconductor device 1D illustrated in FIG. 14 is an example of a so-called six-in-one semiconductor device that has a circuit configuration as illustrated in FIG. 2. For example, in the semiconductor device 1D, three insulated circuit boards 20C (FIG. 12), on each of which a group of semiconductor elements 30A and a group of semiconductor elements 30B are mounted as described earlier in the third embodiment, are aligned in the X direction and disposed inside a case 10.

In the semiconductor device 1D, an OUT terminal 40 is connected to a conductive block 23*a* disposed on a conductive plate 23 of each insulated circuit board 20C. Each OUT terminal 40 passes through an opening 12*a* provided at a side 11*a* of the case 10, and includes an external terminal portion 41 arranged outside the case 10 and an extension portion 42 extending from the external terminal portion 41 toward the inside of the case 10 and being connected at a connection portion 42*d* thereof to the conductive block 23*a*. The OUT terminal 40 is therefore electrically connected to the conductive plate 23 via the connection portion 42*d* and the conductive block 23*a*. The OUT terminals 40 connected to the insulated circuit boards 200 respectively correspond to U-phase, V-phase, and W-phase output nodes.

In the semiconductor device 1D, a P terminal 50 is connected to two conductive blocks 22*a* disposed on a conductive plate 22 of each insulated circuit board 20C. Each P terminal 50 passes through an opening 12*c* provided at a side 11*c* of the case 10, and includes an external terminal portion 51 arranged outside the case 10 and an extension portion 52 extending from the external terminal portion 51 toward the inside the case 10. The extension portion 52 includes branch portions 52*c* and 52*d* respectively connected at connection portions 52*ca* and 52*da* thereof to the two conductive blocks 22*a*. The P terminal 50 is therefore electrically connected to the conductive plate 22 via the connection portions 52*ca* and 52*da* and the two conductive blocks 22*a* connected thereto. The P terminals 50 are arranged in a continuous form in which adjacent P terminals 50 are continuous with each other at their branch portions 52*d* and 52*c* connected to conductive blocks 22*a* facing each other in the X direction on the adjacent insulated circuit boards 20C. That is, the P terminals 50 of the semiconductor device 1D have a shape in which the three P terminals 50, each as described earlier in the third embodiment, are continuously arranged or integrally formed.

In the semiconductor device 1D, an N terminal 60 is connected to two conductive blocks 24*a* disposed on a conductive plate 24 of each insulated circuit board 20C. Each N terminal 60 passes through the opening 12*c* provided at the side 11*c* of the case 10, and includes an external terminal portion 61 arranged outside the case 10 and an extension portion 62 extending from the external terminal portion 61 toward the inside of the case 10. The extension portion 62 includes branch portions 62*c* and 62*d* respectively connected at connection portions 62*ca* and 62*da* thereof to the two conductive blocks 24*a*. The N terminal 60 is therefore electrically connected to the conductive plate 24 via the connection portions 62*ca* and 62*da* and the two conductive blocks 24*a* connected thereto. The N terminals 60 are arranged in a continuous form in which adjacent N terminals 60 are continuous with each other at their branch portions 62*d* and 62*c* connected to conductive blocks 24*a* facing each other in the X direction on the adjacent insulated circuit boards 20C. That is, the N terminals 60 of the semiconductor device 1D have a shape in which the three N terminals 60, each as described earlier in the third embodiment, are continuously arranged or integrally formed.

As illustrated in FIG. 14, it is possible to achieve the semiconductor device 1D that incorporates the functions of three semiconductor devices 1C that are respectively used for the outputs of three phases that are U-phase, V-phase, and W-phase, i.e., that has functional components for the U-phase, V-phase, and W-phase. In this semiconductor device 1D, it is possible to arrange the P terminals 50 in a continuous form and the N terminals 60 in a continuous form among the functional components of the different phases.

Without adopting such continuous forms, it is also possible to achieve a semiconductor device that is provided with three independent P terminals 50 and three independent N terminals 60 in order to provide the outputs of the three phases, i.e., U-phase, V-phase, and W-phase.

Furthermore, in the present embodiment, as an example, three insulating substrates 21 are each provided with the conductive plates 22 to 24 for one of the U-phase, V-phase, and W-phase. Alternatively, it is also possible to form all the conductive plates 22 to 24 for the U-phase, V-phase, and W-phase on a single insulating substrate.

Figure 15:
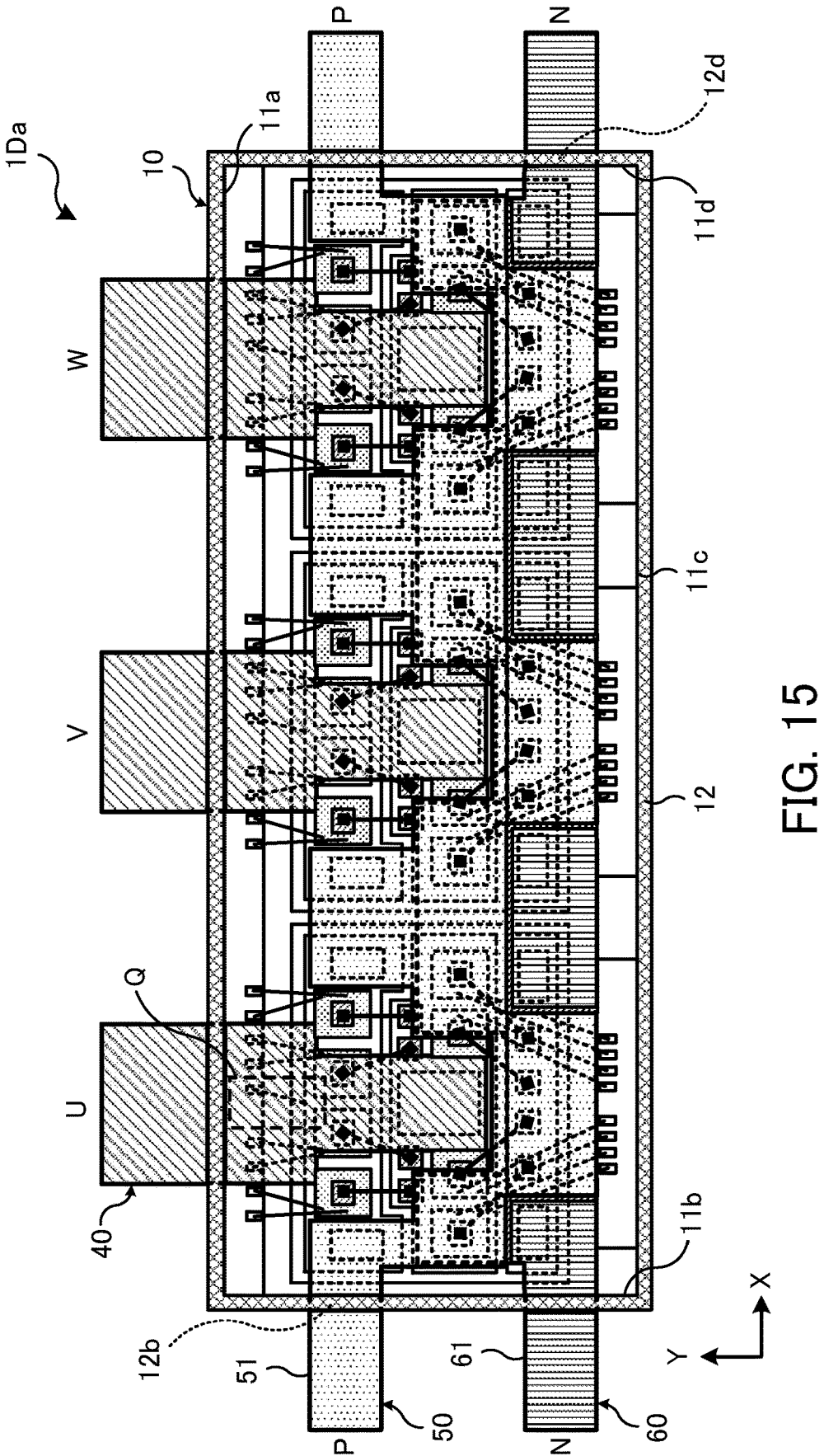
FIG. 15 is a view for describing another example of a semiconductor device according to the fourth embodiment.

FIG. 15 is a view for describing another example of a semiconductor device according to the fourth embodiment. FIG. 15 is a main-part plan view schematically illustrating the example of the semiconductor device.

A semiconductor device 1Da illustrated in FIG. 15 has a configuration in which external terminal portions 51 of a P terminal 50 in a continuous form and external terminal portions 61 of an N terminal 60 in a continuous form are drawn out both from an opening 12*b* formed in a side wall 12 at a side 11*b* of a case 10 perpendicular to a side 11*c* of the case 10 and from an opening 12*d* formed in the side wall 12 at a side 11*d* of the case 10 perpendicular to the side 11*c*. The semiconductor device 1Da differs from the semiconductor device 1D (FIG. 14) in that the semiconductor device 1Da has such a configuration.

The positions at which the P terminal 50 and N terminal 60 are drawn out from the case 10 may appropriately be changed according to the usage of the semiconductor device 1Da (such as an installation position within a device or positional relationship with other components such as capacitors).

The relationship between the functional components of the U-phase, V-phase, and W-phase in each of the semiconductor device 1D and semiconductor device 1Da and the elements described in the claims 1 and 10 of the present application is similar to that described earlier for the semiconductor device 1C.

In this connection, it may be considered that the relationship among the functional components of the different phases is as follows.

With regard to the functional components of one phase (claim 13), the OUT terminal 40 corresponds to the "second main current wiring member," the external terminal portion 41 corresponds to the "second external terminal portion," the extension portion 42 corresponds to the "second extension portion," and the connection portion 42*d* corresponds to the "third connection portion." For example, the P terminal 50 corresponds to the "first main current wiring member," the external terminal portion 51 corresponds to the "first external terminal portion," the extension portion 52 corresponds to the "first extension portion," the connection portion 52*ca* and connection portion 52*da* correspond to the "first connection portion and second connection portion," the conductive plate 22 corresponds to the "first conductive plate," the conductive plate 23 corresponds to the "second conductive plate," the group of semiconductor elements 30A in the upper arm corresponds to the "plurality of first semiconductor elements," and the group of semiconductor elements 30B in the lower arm corresponds to the "plurality of second semiconductor elements." In the case where the P terminal 50 corresponds to the "first main current wiring member," the N terminal 60 corresponds to the "third main current wiring member," the external terminal portion 61 corresponds to the "third external terminal portion," the extension portion 62 corresponds to the "third extension portion," the connection portion 62*ca* and connection portion 62*da* correspond to the "fourth connection portion and fifth connection portion," and the conductive plate 24 corresponds to the "third conductive plate."

Furthermore, with regard to the functional components of another phase (claim 17), the OUT terminal 40 corresponds to a "fifth main current wiring member," the external terminal portion 41 corresponds to a "fifth external terminal portion," the extension portion 42 corresponds to a "fifth extension portion," and the connection portion 42*d* corresponds to an "eighth connection portion." For example, the P terminal 50 corresponds to a "fourth main current wiring member," the external terminal portion 51 corresponds to a "fourth external terminal portion," the extension portion 52 corresponds to a "fourth extension portion," and the connection portion 52*ca* and connection portion 52*da* correspond to a "sixth connection portion and seventh connection portion," the conductive plate 22 corresponds to a "fourth conductive plate," the conductive plate 23 corresponds to a "fifth conductive plate," the group of semiconductor elements 30A in the upper arm corresponds to a "plurality of third semiconductor elements," and the group of semiconductor elements 30B in the lower arm corresponds to a "plurality of fourth semiconductor elements." In the case where the P terminal 50 corresponds to the "fourth main current wiring member," the N terminal 60 corresponds to a "sixth main current wiring member," the external terminal portion 61 corresponds to a "sixth external terminal portion," the extension portion 62 corresponds to a "sixth extension portion," the connection portion 62ca and connection portion 62da correspond to a "ninth connection portion and tenth connection portion," and the conductive plate 24 corresponds to a "sixth conductive plate." The wires 33 correspond to "third wires," the wires 36 correspond to "fourth wires," the opening 12c or the openings 12b and 12d correspond to a "seventh opening," and the opening 12a corresponds to an "eighth opening."

In this connection, in each of the semiconductor device 1D and semiconductor device 1Da described in this fourth embodiment, the external terminal portion 51 of the P terminal 50 and the external terminal portion 61 of the N terminal 60, which are arranged outside the case 10, may be arranged to overlap each other via an insulating member in plan view. In each of the semiconductor device 1D and semiconductor device 1Da, the shapes of the P terminal 50 and N terminal 60 may be modified such that their external terminal portion 51 and external terminal portion 61 are arranged to overlap each other via an insulating member in plan view.

Fifth Embodiment

Figure 16:
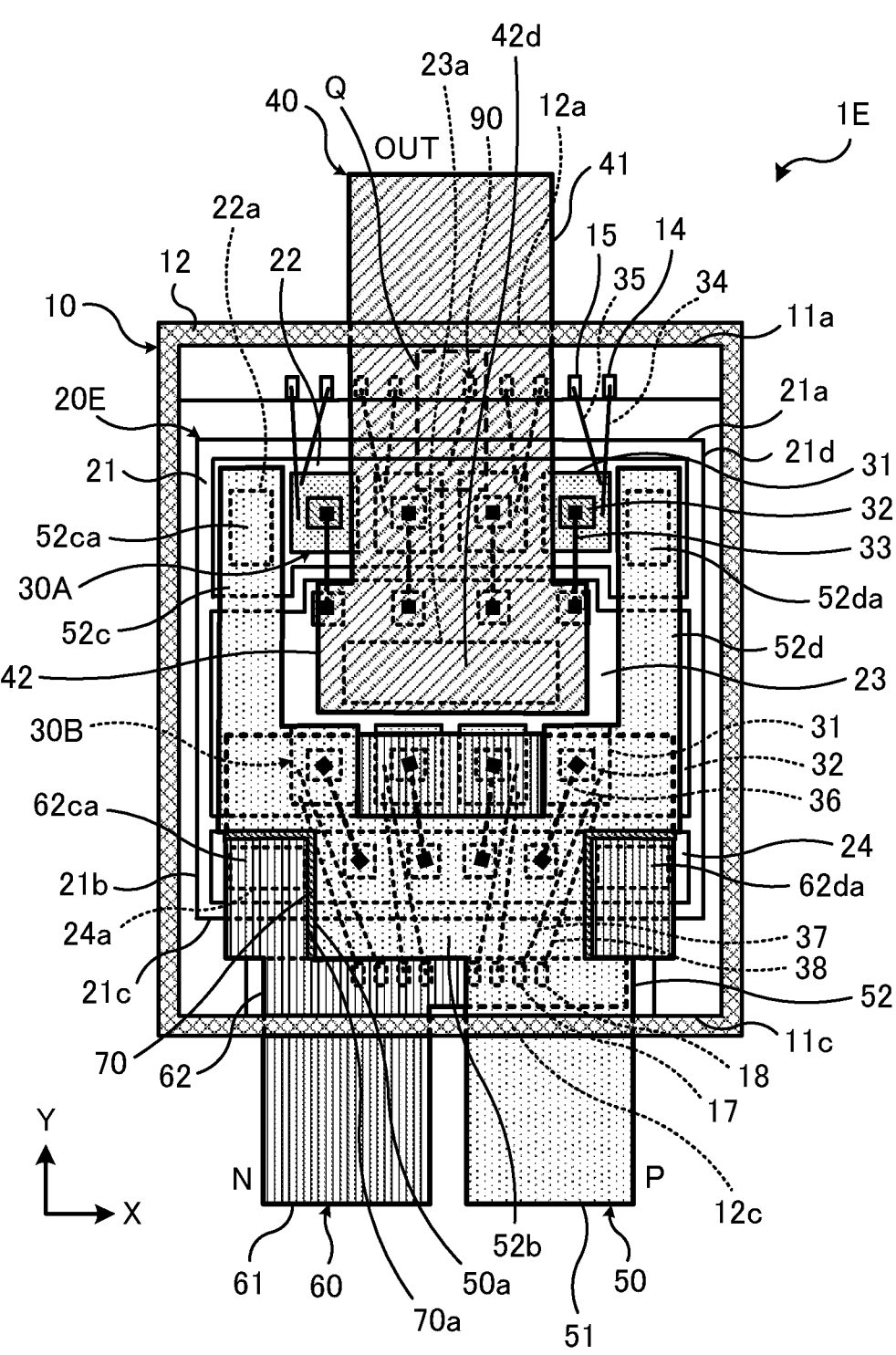
FIG. 16 is a view for describing an example of a semiconductor device according to a fifth embodiment (part 1)
Figure 17:
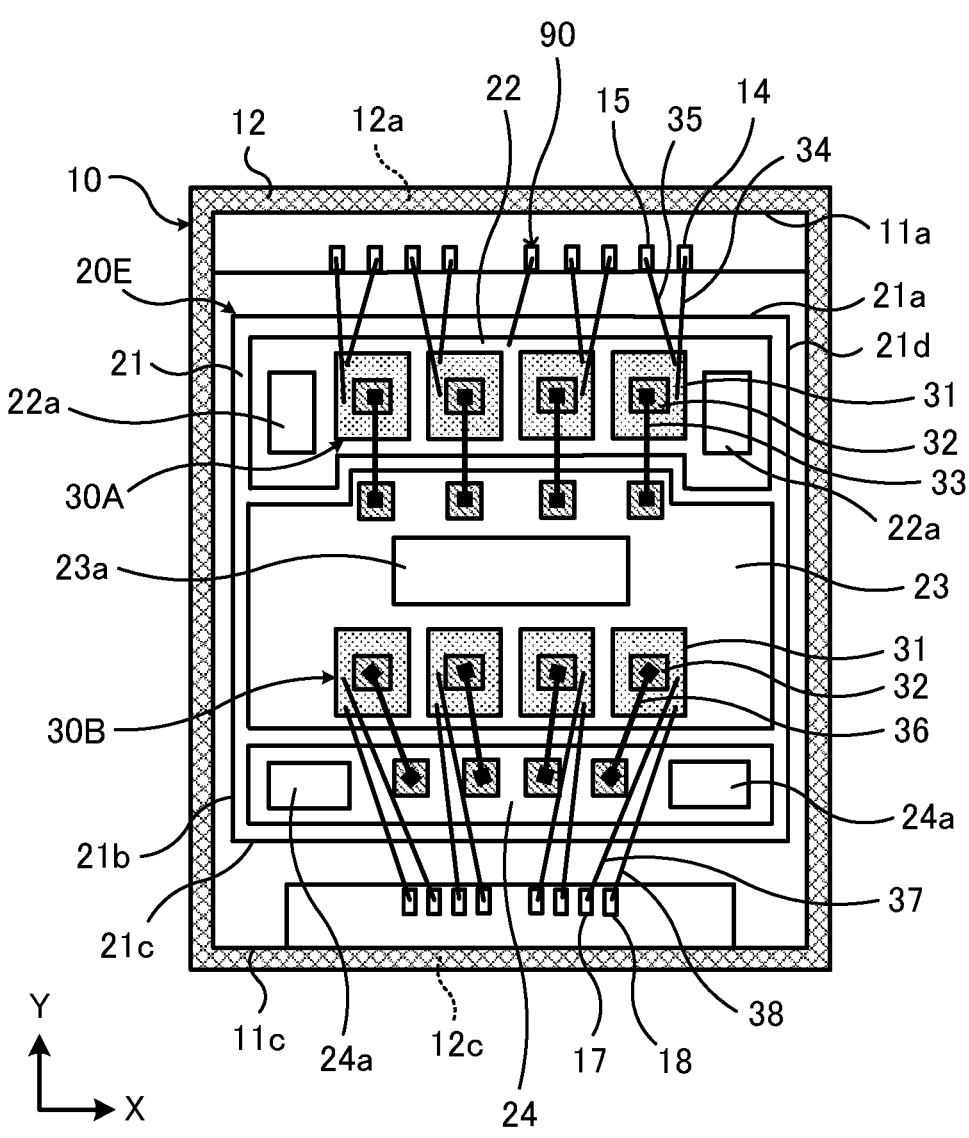
FIG. 17 is a view for describing the example of the semiconductor device according to the fifth embodiment (part 2)
Figures 18A, 18B, 18C:
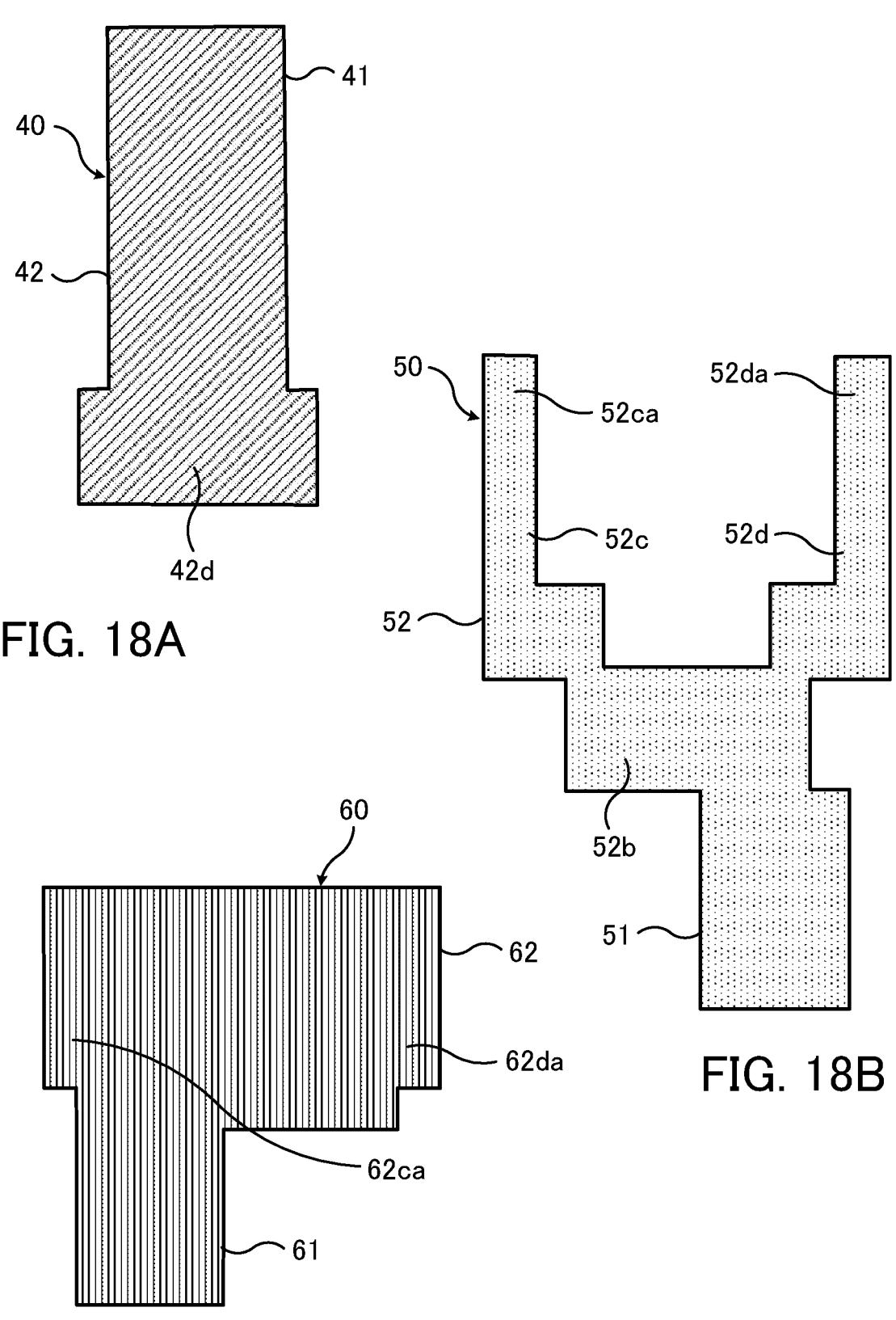
FIGS. 18A to 18C include views for describing the example of the semiconductor device according to the fifth embodiment (part 3)

FIGS. 16 to 18 are views for describing an example of a semiconductor device according to a fifth embodiment. FIG. 16 is a main-part plan view schematically illustrating the example of the semiconductor device. FIG. 17 is a main-part plan view schematically illustrating a case, an insulated circuit board, and others in the example of the semiconductor device. FIG. 18A is a main-part plan view schematically illustrating an OUT terminal in the example of the semiconductor device. FIG. 18B is a main-part plan view schematically illustrating a P terminal in the example of the semiconductor device. FIG. 18C is a main-part plan view schematically illustrating an N terminal in the example of the semiconductor device.

A semiconductor device 1E illustrated in FIG. 16 is an example of a so-called two-in-one semiconductor device that has a circuit configuration as illustrated in FIG. 1. The semiconductor device 1E is a modification of the semiconductor device 1C (FIG. 11) described earlier in the third embodiment.

As illustrated in FIGS. 16 and 17, an insulated circuit board 20E of the semiconductor device 1E includes a conductive plate 22 on which a group of semiconductor elements 30A in an upper arm is disposed, a conductive plate 23 to which wires 33 extending from the group of semiconductor elements 30A in the upper arm are joined and on which a group of semiconductor elements 30B in a lower arm is disposed, and a conductive plate 24 to which wires 36 extending from the group of semiconductor elements 30B in the lower arm are joined. In the semiconductor device 1E, the conductive plate 24, conductive plate 23, and conductive plate 22 are arranged in this order in the Y direction from the conductive plate 24. For example, the conductive plate 22, conductive plate 23, and conductive plate 24 are arranged such that the area of conductive plate 23 is larger than that of conductive plate 22 and the area of conductive plate 22 is larger than that of conductive plate 24. As illustrated in FIGS. 16 and 17, the insulated circuit board 20E has a configuration in which a conductive block 23a disposed on the conductive plate 23 is provided between a group of joints of the wires 33 extending from the group of semiconductor elements 30A in the upper arm and the group of semiconductor elements 30B in the lower arm. The conductive block 23a is shaped to be longer in the X direction than in the Y direction, and the plan size of the conductive block 23a is larger than both the total plan size of two conductive blocks 22a and the total plan size of two conductive blocks 24a.

As illustrated in FIG. 16, in plan view, an extension portion 42 of an OUT terminal 40 extends to the space between a branch portion 52c and branch portion 52d of an extension portion 52 of a P terminal 50. In plan view, connection portions 52ca and 52da of the branch portions 52c and 52d of the P terminal 50, which are connected to the two conductive blocks 22a, are arranged to sandwich the extension portion 42 of the OUT terminal 40.

As illustrated in FIGS. 16 and 18A, the OUT terminal 40 of the semiconductor device 1E is shaped such that the width in the X direction of the extension portion 42 is relatively wide, compared to the above-described semiconductor device 1C. As illustrated in FIGS. 16, 18B, and 18C, the extension portions 52 and 62 of the P terminal 50 and N terminal 60 of the semiconductor device 1E are shaped according to the shape of the extension portion 42 of the OUT terminal 40 so as not to overlap the extension portion 42. The extension portion 62 of the N terminal 60 does not need to have a cutout (see FIG. 13C) in a portion facing the extension portion 42 of the OUT terminal 40, as illustrated in FIGS. 16 and 18C.

As in the example illustrated in FIG. 3B, the inside of the case 10 may be filled with a sealing resin to seal the insulated circuit board 20E, and the group of semiconductor elements 30A and the group of semiconductor elements 30B mounted on the insulated circuit board 20E. Note that the illustration of the sealing resin is omitted for convenience in FIG. 16.

The other configuration of the semiconductor device 1E may be the same as that of the semiconductor device 1C described earlier in the third embodiment. This semiconductor device 1E having the above configuration is able to provide the same effects as described earlier for the semiconductor device 1C.

In this connection, the relationship between this semiconductor device 1E and the elements described in claims 1 and 10 of the present application is the same as described earlier for the semiconductor device 1C.

In addition, in the semiconductor device 1E described in this fifth embodiment, the external terminal portion 51 of the P terminal 50 and the external terminal portion 61 of the N terminal 60, which are arranged outside the case 10, may be arranged to overlap each other via an insulating member in plan view. In the semiconductor device 1E, the shapes of the P terminal 50 and N terminal 60 may be modified such that their external terminal portion 51 and external terminal portion 61 are arranged to overlap each other via an insulating member in plan view.

Furthermore, three semiconductor devices 1E, each as described in the fifth embodiment, may be used to form a three-phase voltage inverter circuit with U-phase, V-phase, and W-phase (FIG. 2). In this embodiment, the semiconductor device 1E has been described as a two-in-one package. In the case of such a three-phase voltage inverter circuit, a six-in-one package may be formed by housing functional components for the U-phase, V-phase, and W-phase in a single case. In the case of the six-in-one package, as in the example of the semiconductor device 1D described earlier in the fourth embodiment (FIG. 14), the functions of the three semiconductor devices 1E, i.e., the P terminals 50 in the functional components of the U-phase, V-phase, and W-phase may be formed in a continuous form, and the N terminals 60 in the functional components of the U-phase, V-phase, and W-phase may be formed in a continuous form. The external terminal portion 51 of the P terminals 50 in the continuous form and the external terminal portion 61 of the N terminals 60 in the continuous form each may be drawn out at a side 11c of the case 10 from the case 10. Alternatively, as in the example of the semiconductor device 1Da (FIG. 15) described earlier in the fourth embodiment, the external terminal portion 51 and external terminal portion 61 each may be drawn out at both a side 11b and side 11d of the case 10 perpendicular to the side 11c from the case 10.

Sixth Embodiment

Figure 19:
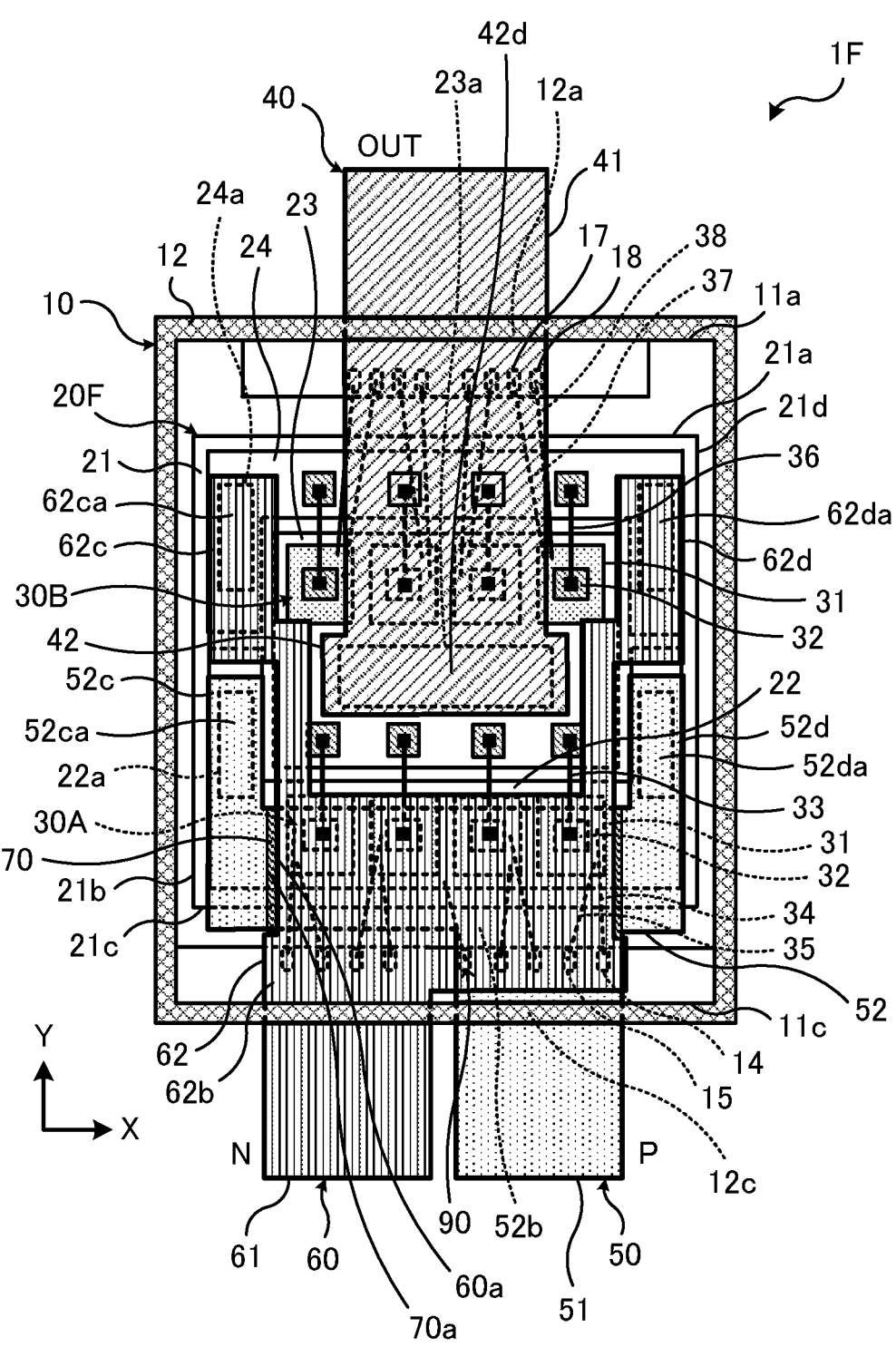
FIG. 19 is a view for describing an example of a semiconductor device according to a sixth embodiment (part 1)
Figure 20:
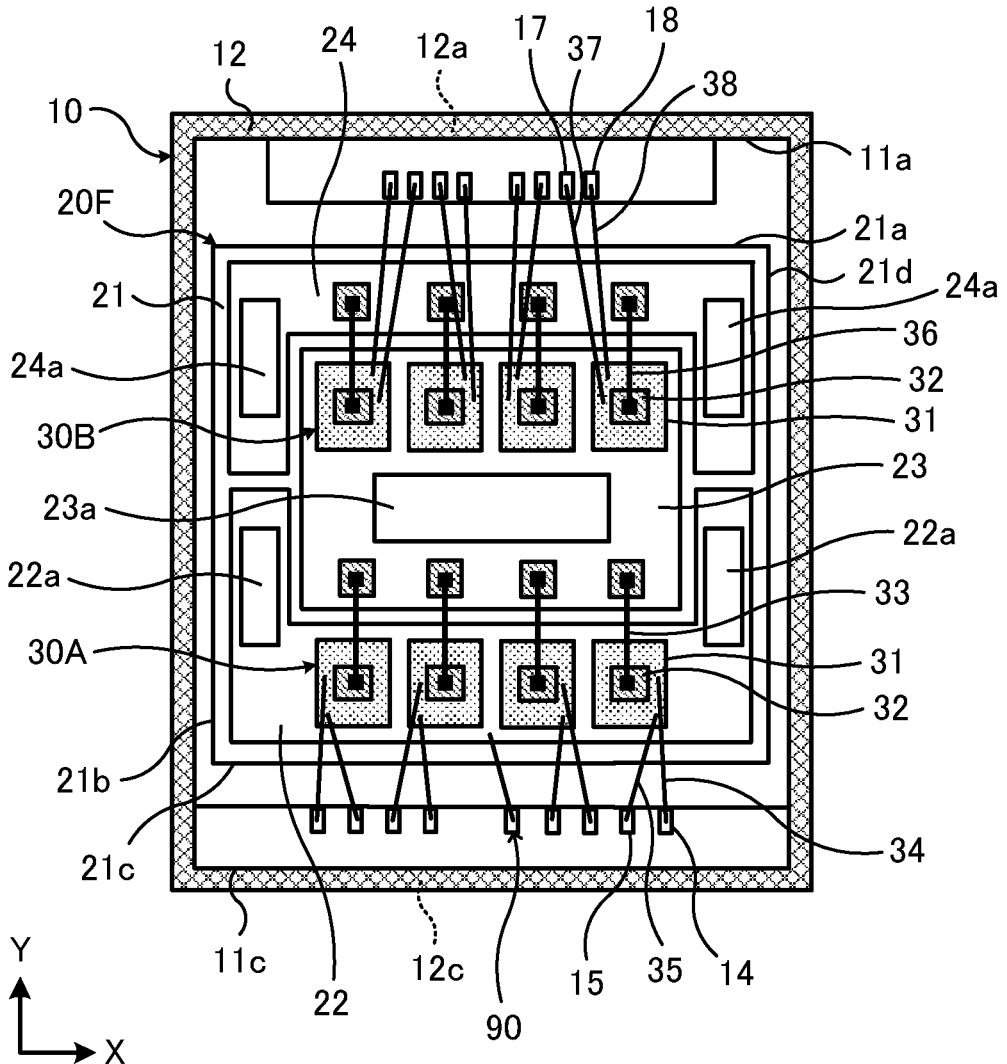
FIG. 20 is a view for describing the example of the semiconductor device according to the sixth embodiment (part 2)
Figures 21A, 21B, 21C:
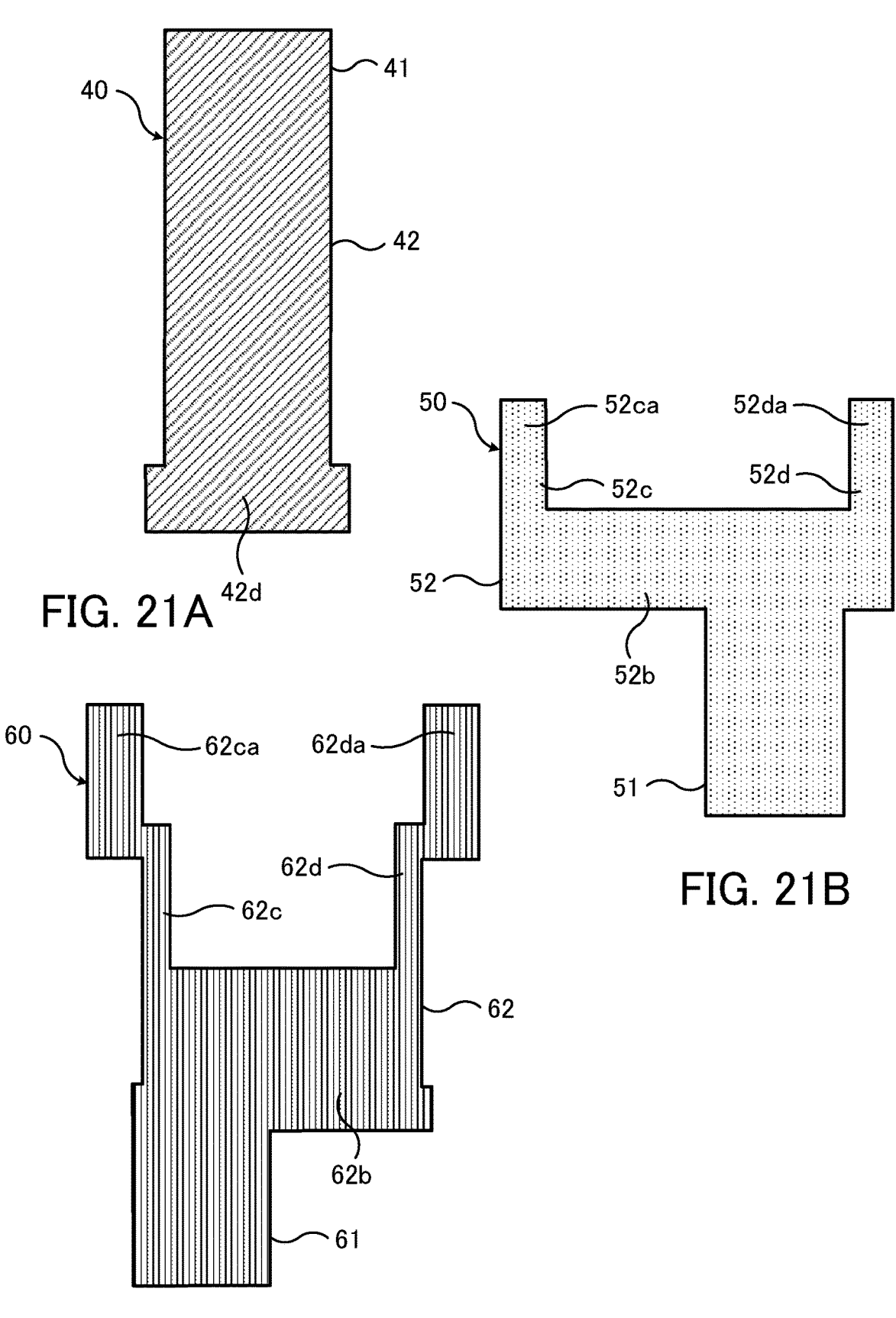
FIGS. 21A to 21C include views for describing the example of the semiconductor device according to the sixth embodiment (part 3)
Figure 22:
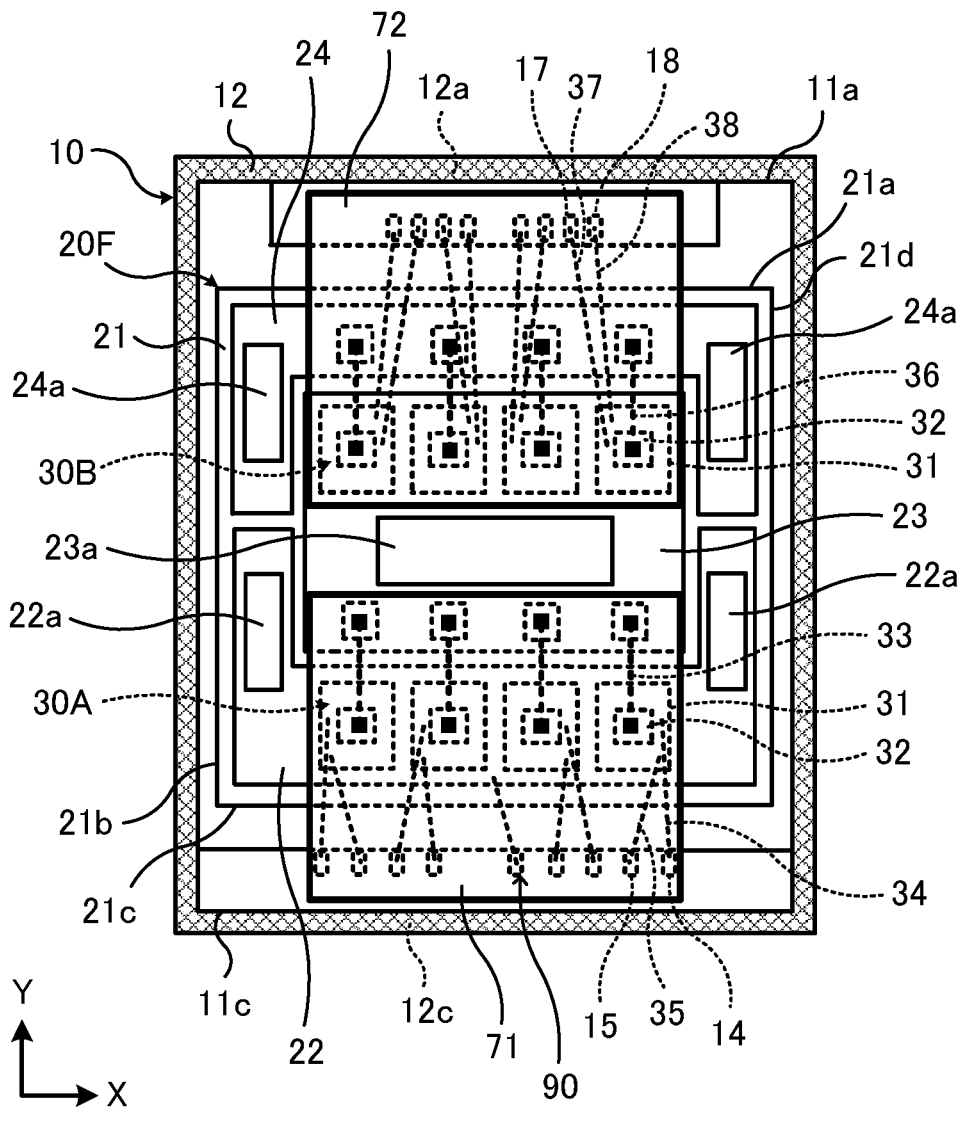
FIG. 22 is a view for describing the example of the semiconductor device according to the sixth embodiment (part 4)

FIGS. 19 to 22 are views for describing an example of a semiconductor device according to a sixth embodiment. FIG. 19 is a main-part plan view schematically illustrating the example of the semiconductor device. FIG. 20 is a main-part plan view schematically illustrating a case, an insulated circuit board, and others in the example of the semiconductor device. FIG. 21A is a main-part plan view schematically illustrating an OUT terminal in the example of the semiconductor device. FIG. 21B is a main-part plan view schematically illustrating a P terminal in the example of the semiconductor device. FIG. 21C is a main-part plan view schematically illustrating an N terminal in the example of the semiconductor device. FIG. 22 is a main-part plan view schematically illustrating an example arrangement of insulating members.

A semiconductor device 1F illustrated in FIG. 19 is an example of a so-called two-in-one semiconductor device that has a circuit configuration as illustrated in FIG. 1. The semiconductor device 1F is an example in which a P terminal 50 and N terminal 60 stacked to partially overlap each other via an insulating member 70 are arranged in order of the P terminal 50, insulating member 70, and N terminal 60 in a direction away from an insulated circuit board 20F. That is, out of the P terminal 50 and N terminal 60 of the semiconductor device 1F, the P terminal 50 is located closer to the insulated circuit board 20F.

As illustrated in FIGS. 19 and 20, the insulated circuit board 20F of the semiconductor device 1F includes a conductive plate 22 on which a group of semiconductor elements 30A in an upper arm are disposed, a conductive plate 23 to which wires 33 extending from the group of semiconductor elements 30A in the upper arm are joined and on which a group of semiconductor elements 30B in a lower arm are disposed, and a conductive plate 24 to which wires 36 extending from the group of semiconductor elements 30B in the lower arm are joined. In the semiconductor device 1F, the conductive plate 22, conductive plate 23, and conductive plate 24 are arranged in this order in the Y direction from the conductive plate 22. For example, the conductive plate 22, conductive plate 23, and conductive plate 24 are arranged such that the area of the conductive plate 23 is larger than that of the conductive plate 22, and the area of the conductive plate 22 is larger than that of the conductive plate 24. As illustrated in FIGS. 19 and 20, the insulated circuit board 20F has a configuration in which a conductive block 23a disposed on the conductive plate 23 is arranged between a group of joints of the wires 33 extending from the group of semiconductor elements 30A in the upper arm and the group of semiconductor elements 30B in the lower arm. The conductive block 23a is shaped to be longer in the X direction than in the Y direction, and the plan size of the conductive block 23a is larger than both the total plan size of two conductive blocks 22a and the total plan size of two conductive blocks 24a.

As illustrated in FIGS. 19 and 21A, the OUT terminal 40 of the semiconductor device 1F is shaped such that the width in the X direction of an extension portion 42 thereof is relatively wide. As illustrated in FIGS. 19, 21B, and 21C, extension portions 52 and 62 of the P terminal 50 and N terminal 60 of the semiconductor device 1F are shaped according to the shape of the extension portion 42 of the OUT terminal 40 so as not to overlap the extension portion 42.

The OUT terminal 40 passes through an opening 12a provided at a side 11a of the case 10, and includes an external terminal portion 41 and the extension portion 42 respectively arranged outside and inside the case 10, and the extension portion 42 is connected at a connection portion 42d thereof to the conductive block 23a. The OUT terminal 40 is therefore electrically connected to the conductive plate 23 via the connection portion 42d and the conductive block 23a. The P terminal 50 passes through an opening 12c provided at a side 11c of the case 10, and includes an external terminal portion 51 and an extension portion 52 respectively arranged outside and inside the case 10. The extension portion 52 includes a branch base portion 52b, and a branch portion 52c and branch portion 52d branching off from the branch base portion 52b. The branch portions 52c and 52d are respectively connected at connection portions 52ca and 52da thereof to the two conductive blocks 22a. The P terminal 50 is therefore electrically connected to the conductive plate 22 via the connection portions 52ca and 52da and the two conductive blocks 22a connected thereto. The N terminal 60 passes through the opening 12c provided at the side 11c of the case 10, and includes an external terminal portion 61 and extension portion 62 respectively arranged outside and inside the case 10. The extension portion 62 includes a branch base portion 62b, and a branch portion 62c and branch portion 62d branching off from the branch base portion 62b. The branch portions 62c and 62d are respectively connected at connection portions 62ca and 62da thereof to the two conductive blocks 24a. The N terminal 60 is therefore electrically connected to the conductive plate 24 via the connection portions 62ca and 62da and the two conductive blocks 24a connected thereto.

The P terminal 50 and N terminal 60 are stacked via an insulating member 70 such as an insulating sheet, at least inside the case 10. In the semiconductor device 1F, the P terminal 50, insulating member 70, and N terminal 60 are arranged in this order in a direction away from the insulated circuit board 20F. The P terminal 50 and N terminal 60 are shaped to partially overlap each other in plan view. The P terminal 50 does not exist under the connection portions 62ca and connection portion 62da of the N terminal 60. Openings 60a and openings 70a (cutouts) are respectively formed in the N terminal 60 and insulating member 70. The connection portion 52ca and connection portion 52da of the P terminal 50 are exposed in the openings 60a of the N terminal 60 and the openings 70a of the insulating member 70. The connection portions 52ca and 52da of the P terminal 50 are located under the openings 60a of the N terminal 60 and the openings 70a of the insulating member 70. The connection portions 52ca and 52da of the P terminal 50 are joined to the two conductive blocks 22a by laser welding or another through the openings 60a of the N terminal 60 and the openings 70a of the insulating member 70.

As illustrated in FIG. 19, in plan view, the extension portion 42 of the OUT terminal 40 extends to the space between the branch portion 52*c* and branch portion 52*d* of the extension portion 52 of the P terminal 50 and the space between the branch portion 62*c* and branch portion 62*d* of the extension portion 62 of the N terminal 60. In plan view, the connection portions 52*ca* and 52*da* of the branch portions 52*c* and 52*d* of the P terminal 50, which are connected to the two conductive blocks 22*a*, are arranged to sandwich the extension portion 42 of the OUT terminal 40. In plan view, the connection portions 62*ca* and 62*da* of the branch portions 62*c* and 62*d* of the N terminal 60, which are connected to the two conductive blocks 24*a*, are arranged to sandwich the extension portion 42 of the OUT terminal 40. In plan view, the group of semiconductor elements 30A in the upper arm is disposed between the branch portion 52*c* and branch portion 52*d* of the P terminal 50. In plan view, the group of semiconductor elements 30B in the lower arm is disposed between the branch portion 62*c* and branch portion 62*d* of the N terminal 60.

In the semiconductor device 1F, the external terminal portion 51 of the P terminal 50, the conductive plate 22 to which the P terminal 50 is connected, the conductive plate 24 to which the N terminal 60 is connected, and the external terminal portion 41 of the OUT terminal 40 are arranged in this order in the Y direction.

As in the example illustrated in FIG. 3B, the inside of the case 10 may be filled with a sealing resin to seal the insulated circuit board 20F, and the group of semiconductor elements 30A and the group of semiconductor elements 30B mounted on the insulated circuit board 20F. Note that the illustration of the sealing resin is omitted for convenience in FIG. 19.

In the semiconductor device 1F, out of the P terminal 50 and N terminal 60 stacked via the insulating member 70, the P terminal 50 is located closer to the insulated circuit board 20F. As in this semiconductor device 1F, the arrangement of the P terminal 50 and N terminal 60 in a vertical direction to the insulated circuit board 20F (a direction perpendicular to the X and Y directions) may be reversed from the arrangement of the semiconductor device 1C (FIG. 11) and the arrangement of the semiconductor device 1E (FIG. 16), for example.

However, in the semiconductor device 1F, the relatively high-potential P terminal 50 located closer to the insulated circuit board 20F faces gate wires 34 and relatively low-potential sense emitter wires 35 connected to the group of semiconductor elements 30A in the upper arm. Moreover, the relatively high-potential P terminal 50 faces an SP part 90 (the external SP terminal 19 and SP wire 39 described earlier in the first embodiment) connected to the conductive plate 22. Furthermore, in the semiconductor device 1F, the relatively high-potential OUT terminal 40 faces gate wires 37 and relatively low-potential sense emitter wires 38 connected to the group of semiconductor elements 30B in the lower arm.

Therefore, as illustrated in FIG. 22, an insulating member 71 is provided in an area overlapping the gate wires 34, sense emitter wires 35, and SP part 90 in plan view. For example, the insulating member 71 is provided on a surface of the P terminal 50 facing the gate wires 34, sense emitter wires 35, and SP part 90. The presence of this insulating member 71 reduces the effect of potential across the P terminal 50 on the potentials across the gate wires 34 and sense emitter wires 35. Additionally, as illustrated in FIG. 22, an insulating member 72 is provided in an area overlapping the gate wires 37 and sense emitter wires 38 in plan view. For example, the insulating member 72 is provided on a surface of the OUT terminal 40 facing the gate wires 37 and sense emitter wires 38. The presence of this insulating member 72 reduces the effect of potential across the OUT terminal 40 on the potentials across the gate wires 37 and sense emitter wires 38.

In this connection, for example, in each of the above-described semiconductor device 1C (FIG. 11) and semiconductor device 1E (FIG. 16), it is also possible to arrange the P terminal 50, out of the P terminal 50 and N terminal 60, closer to the corresponding one of the insulated circuit board 20C and insulated circuit board 20E. In this case as well, to reduce the effect of potential across the P terminal 50, it is desirable, as in the example of the semiconductor device 1F, to arrange an insulating member between the P terminal 50 and each of the insulated circuit board 20C and insulated circuit board 20E. However, in the case of arranging the P terminal 50 closer to each of the insulated circuit board 20C and insulated circuit board 20E in this way, the P terminal 50 faces the gate wires 37 and sense emitter wires 38 connected to the group of semiconductor elements 30B in the lower arm, which increases the potential differences from the P terminal 50. Therefore, from the perspective of reducing the potential differences from the P terminal 50, it is preferable to adopt a layout similar to that of the semiconductor device 1F, in which the P terminal 50 faces the gate wires 34 and sense emitter wires 35 connected to the group of semiconductor elements 30A in the upper arm, as well as the SP part 90.

In this connection, the relationship between the above-described semiconductor device 1F and the elements described in claim 1 of the present application is as follows.

The OUT terminal 40 corresponds to the "second main current wiring member," the extension portion 42 corresponds to the "second extension portion," and the conductive plate 23 corresponds to the "conductive plate." The P terminal 50 or the N terminal 60 corresponds to the "first main current wiring member."

Here, in the case where the P terminal 50 corresponds to the "first main current wiring member," the branch base portion 52*b* corresponds to the "branch base portion," the branch portion 52*c* and branch portion 52*d* correspond to the "first branch portion and second branch portion," the extension portion 52 corresponds to the "first extension portion," the group of semiconductor elements 30A in the upper arm corresponds to the "plurality of semiconductor elements," the emitter electrodes 32 of the group of semiconductor elements 30A in the upper arm correspond to the "first electrodes," and the collector electrodes 31 of the group of semiconductor elements 30A in the upper arm correspond to the "second electrode."

In addition, in the case where the N terminal 60 corresponds to the "first main current wiring member," the branch base portion 62*b* corresponds to the "branch base portion," the branch portion 62*c* and branch portion 62*d* correspond to the "first branch portion and second branch portion," the extension portion 62 corresponds to the "first extension portion," the group of semiconductor elements 30B in the lower arm corresponds to the "plurality of semiconductor elements," the collector electrodes 31 of the group of semiconductor elements 30B in the lower arm correspond to the "first electrodes," and the emitter electrodes 32 of the group of semiconductor elements 30B in the lower arm correspond to the "second electrode." In the case where the N terminal 60 corresponds to the "first main current wiring member" as described above, the P terminal 50 corresponds to the "third main current wiring member" (claim 7), the insulating member 70 corresponds to the "insulating member" (claim 7), and the openings 60*a* correspond to the "second opening" (claim 8).

In the relationship between the above-described semiconductor device 1F and the elements described in claim 10 of the present application is as follows.

The OUT terminal 40 corresponds to the "second main current wiring member," the external terminal portion 41 corresponds to the "second external terminal portion," the extension portion 42 corresponds to the "second extension portion," and the connection portion 42d corresponds to the "third connection portion." The P terminal 50 or the N terminal 60 corresponds to the "first main current wiring member."

Here, in the case where the P terminal 50 corresponds to the "first main current wiring member," the external terminal portion 51 corresponds to the "first external terminal portion," the extension portion 52 corresponds to the "first extension portion," the connection portion 52ca and connection portion 52da correspond to the "first connection portion and second connection portion," the conductive plate 22 corresponds to the "first conductive plate," the conductive plate 23 corresponds to the "second conductive plate," the group of semiconductor elements 30A in the upper arm corresponds to the "plurality of first semiconductor elements," and the group of semiconductor elements 30B in the lower arm corresponds to the "plurality of second semiconductor elements."

On the other hand, in the case where the N terminal 60 corresponds to the "first main current wiring member," the external terminal portion 61 corresponds to the "first external terminal portion," the extension portion 62 corresponds to the "first extension portion," the connection portion 62ca and connection portion 62da correspond to the "first connection portion and second connection portion," the conductive plate 24 corresponds to the "first conductive plate," the conductive plate 23 corresponds to the "second conductive plate," the group of semiconductor elements 30B in the lower arm corresponds to the "plurality of first semiconductor elements," and the group of semiconductor elements 30A in the upper arm corresponds to the "plurality of second semiconductor elements."

In the case where the N terminal 60 corresponds to the "first main current wiring member" as described above, the P terminal 50 corresponds to a "third main current wiring member" (claim 23), the external terminal portion 51 corresponds to a "third external terminal portion," the extension portion 52 corresponds to a "third extension portion," the connection portion 52ca and/or connection portion 52da correspond to a "fourth connection portion," the conductive plate 22 corresponds to a "third conductive plate," the wires 36 correspond to "first wires," the wires 33 correspond to "second wires," the opening 12c corresponds to a "first opening," and the opening 12a corresponds to a "second opening" (claim 23). The insulating member 70 corresponds to a "first insulating member," the insulating member 71 corresponds to a "second insulating member," the insulating member 72 corresponds to a "third insulating member" (claim 24), the openings 60a correspond to a "third opening," the openings 70a correspond to a "fourth opening," and the conductive block 22a corresponds to a "conductive block" (claim 25). The gate wires 37 correspond to "first gate wires," the sense emitter wires 38 correspond to "first sense emitter wires," the gate wires 34 correspond to "second gate wires," the sense emitter wires 35 correspond to "second sense emitter wires," the external gate terminals 17 correspond to "first external gate terminals," the external sense emitter terminals 18 correspond to "first external sense emitter terminals," the external gate terminals 14 correspond to "second external gate terminals", and the external sense emitter terminals 15 correspond to "second external sense emitter terminals" (claim 26).

In this connection, in the semiconductor device 1F described in this sixth embodiment, the external terminal portion 51 of the P terminal 50 and the external terminal portion 61 of the N terminal 60, which are arranged outside the case 10, may be arranged to overlap each other via an insulating member in plan view. In the semiconductor device 1F, the shapes of the P terminal 50 and N terminal 60 may be modified such that their external terminal portion 51 and external terminal portion 61 are arranged to overlap each other via an insulating member in plan view.

Furthermore, three semiconductor devices 1F, each as described in the sixth embodiment, may be used to form a three-phase voltage inverter circuit with U-phase, V-phase, and W-phase (FIG. 2). In this embodiment, the semiconductor device 1F has been described as a two-in-one package. In the case of such a three-phase voltage inverter circuit, a six-in-one package may be formed by housing functional components for the U-phase, V-phase, and W-phase in a single case. In the case of the six-in-one package, as in the example of the semiconductor device 1D described earlier in the fourth embodiment (FIG. 14), the functions of the three semiconductor devices 1F, i.e., the P terminals 50 in the functional components of the U-phase, V-phase, and W-phase may be formed in a continuous form, and the N terminals 60 in the functional components of the U-phase, V-phase, and W-phase may be formed in a continuous form. The external terminal portion 51 of the P terminals 50 in the continuous form and the external terminal portion 61 of the N terminals 60 in the continuous form each may be drawn out at the side 11c from the case 10. Alternatively, as in the example of the semiconductor device 1Da (FIG. 15) described earlier in the fourth embodiment, the external terminal portion 51 and external terminal portion 61 each may be drawn out at both a side 11b and side 11d of the case 10 perpendicular to the side 11c from the case 10.

Seventh Embodiment

Figure 23:
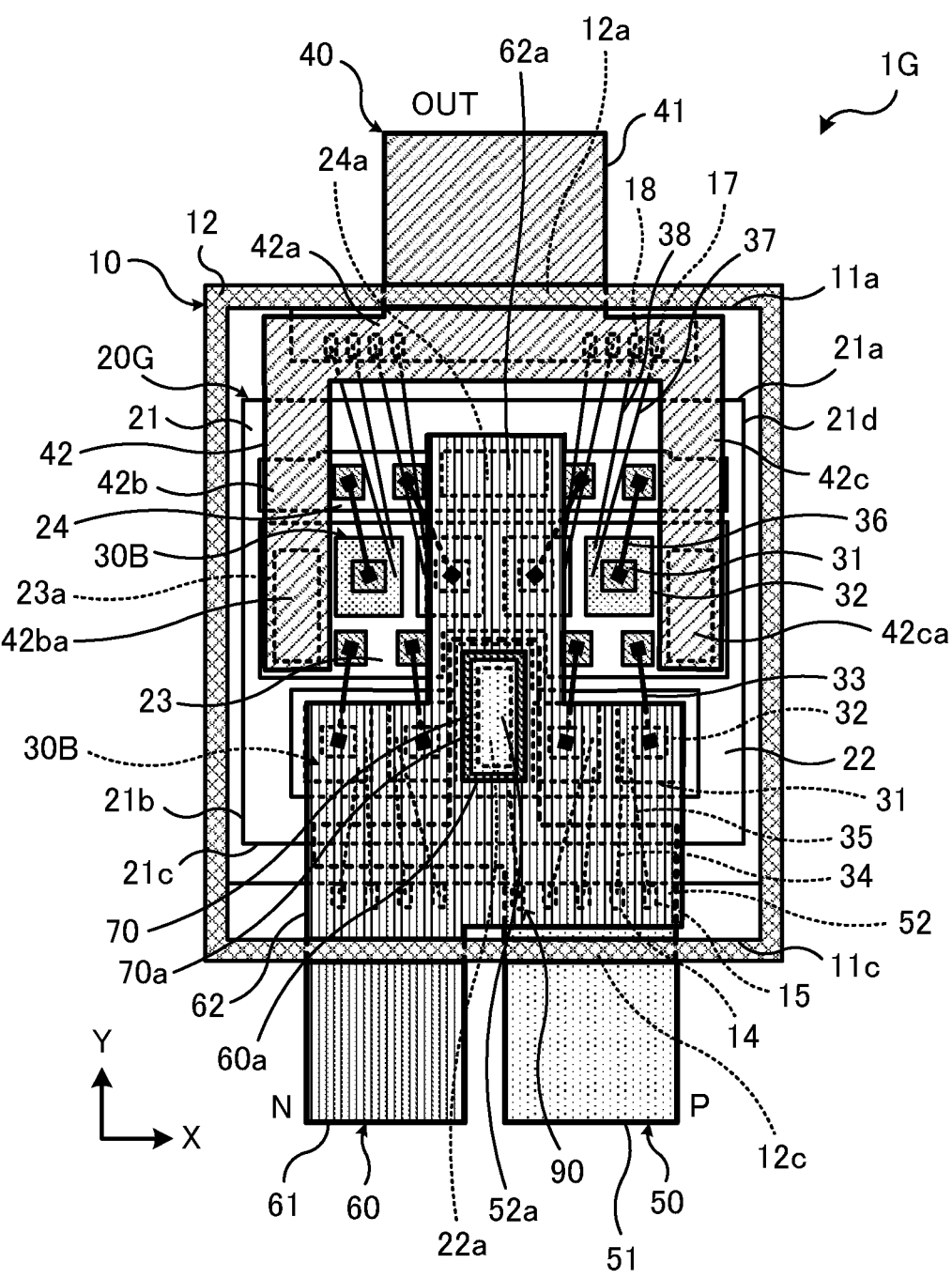
FIG. 23 is a view for describing an example of a semiconductor device according to a seventh embodiment (part 1)
Figure 24:
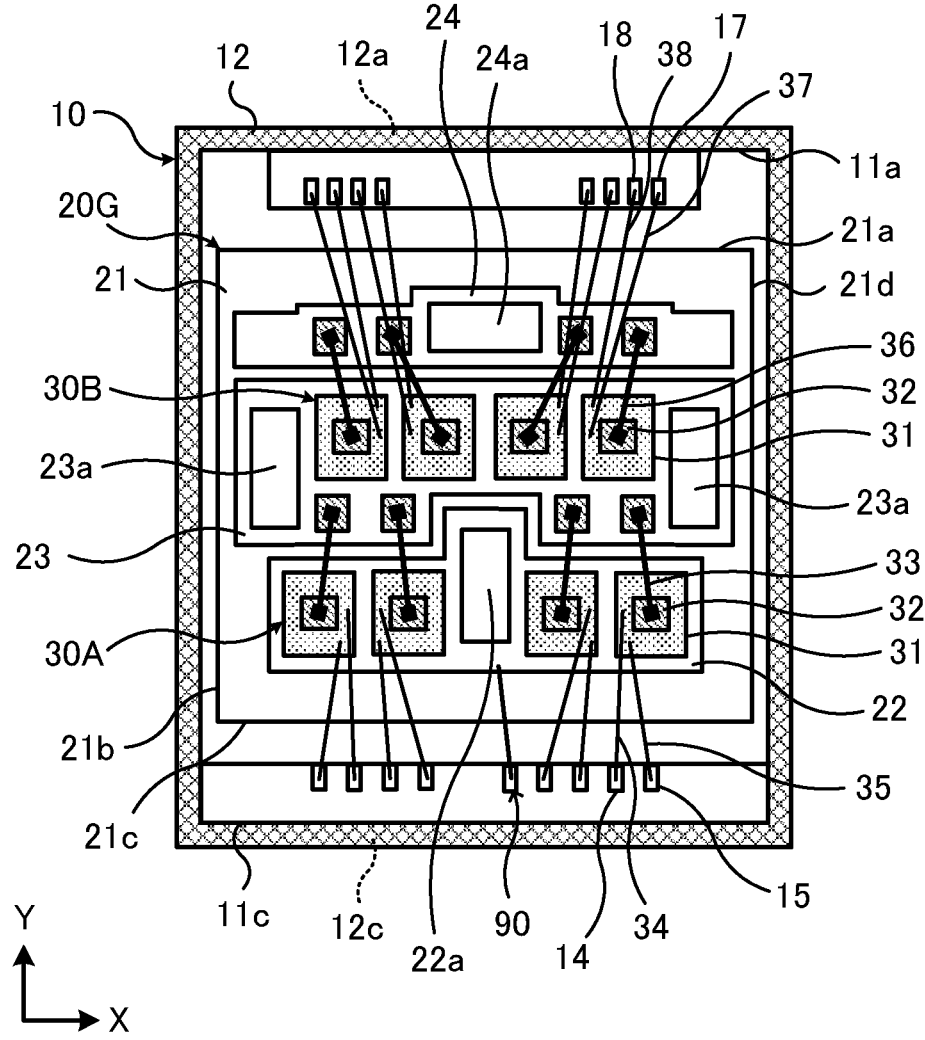
FIG. 24 is a view for describing the example of the semiconductor device according to the seventh embodiment (part 2)
Figures 25A, 25B, 25C:
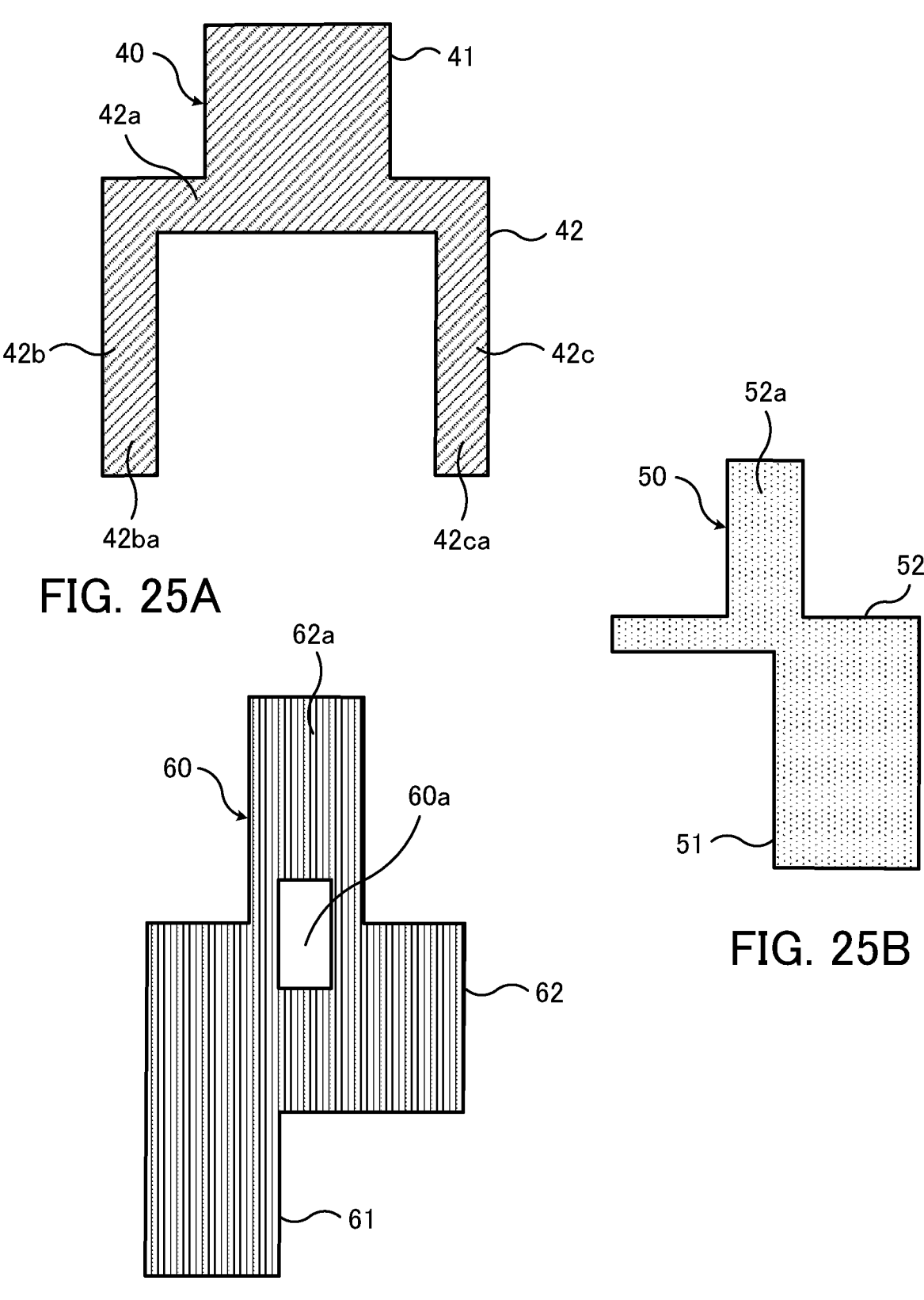
FIGS. 25A to 25C include views for describing the example of the semiconductor device according to the seventh embodiment (part 3)
Figure 26:
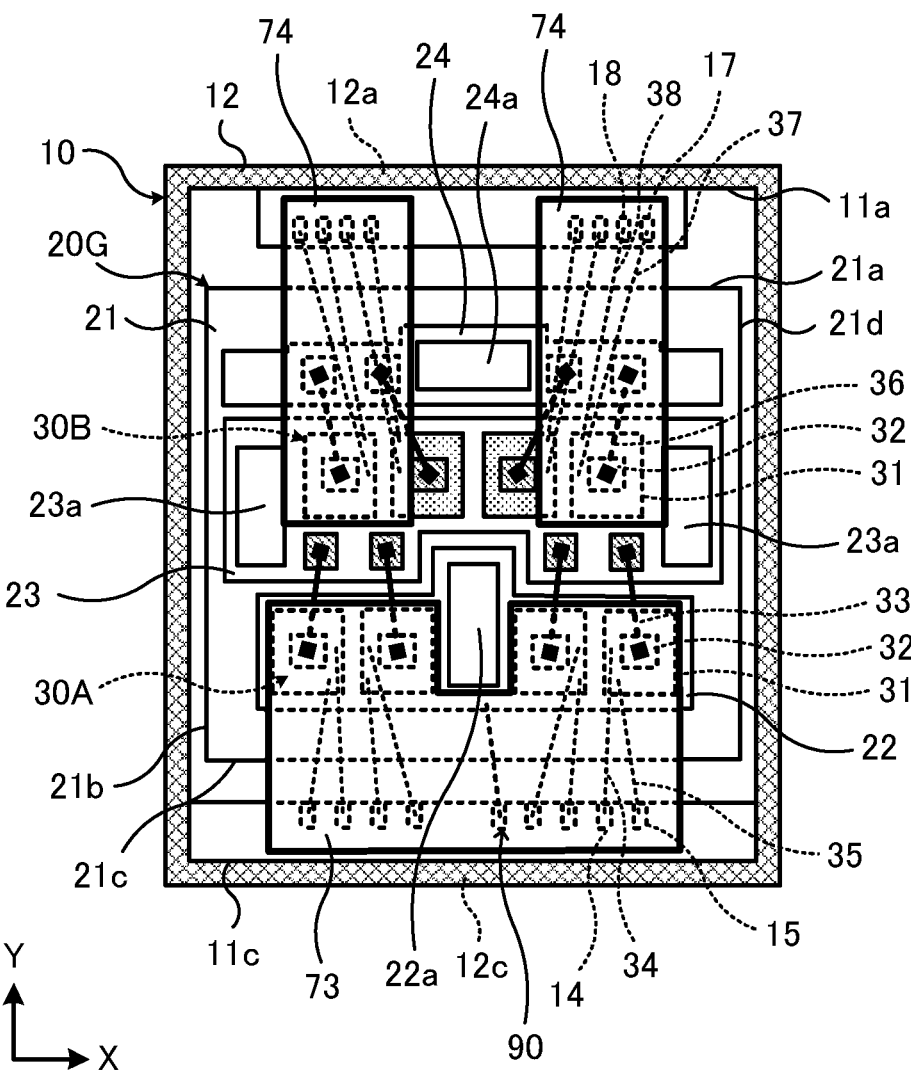
FIG. 26 is a view for describing the example of the semiconductor device according to the seventh embodiment (part 4)

FIGS. 23 to 26 are views for describing an example of a semiconductor device according to a seventh embodiment. FIG. 23 is a main-part plan view schematically illustrating the example of the semiconductor device. FIG. 24 is a main-part plan view schematically illustrating a case, an insulated circuit board, and others in the example of the semiconductor device. FIG. 25A is a main-part plan view schematically illustrating an OUT terminal in the example of the semiconductor device. FIG. 25B is a main-part plan view schematically illustrating a P terminal in the example of the semiconductor device. FIG. 25C is a main-part plan view schematically illustrating an N terminal in the example of the semiconductor device. FIG. 26 is a main-part plan view schematically illustrating an example arrangement of insulating members.

A semiconductor device 1G illustrated in FIG. 23 is an example of a so-called two-in-one semiconductor device that has a circuit configuration as illustrated in FIG. 1. The semiconductor device 1G is an example in which the semiconductor device 1A (FIGS. 3A and 3B) described earlier in the first embodiment is modified such that the vertical arrangement (an arrangement in a direction away from the insulated circuit board 20G) of the P terminal 50 and N terminal 60 is reversed, i.e., the P terminal 50 is located closer to the insulated circuit board 20G.

As illustrated in FIGS. 23 and 24, the insulated circuit board 20G of the semiconductor device 1G includes a conductive plate 22 on which a group of semiconductor elements 30A in an upper arm is disposed, a conductive plate 23 to which wires 33 extending from the group of semiconductor elements 30A in the upper arm is joined and on which a group of semiconductor elements 30B in a lower arm is disposed, and a conductive plate 24 to which wires 36 extending from the group of semiconductor elements 30B in the lower arm is joined. In the semiconductor device 1G, the conductive plate 22, conductive plate 23, and conductive plate 24 are arranged in this order in the Y direction from the conductive plate 22. For example, the conductive plate 22, conductive plate 23, and conductive plate 24 are arranged such that the area of the conductive plate 23 is larger than that of the conductive plate 22, and the area of the conductive plate 22 is larger than that of the conductive plate 24. Two conductive blocks 23a disposed on the conductive plate 23 are shaped such that their total plan size is larger than both the plan size of a conductive block 22a disposed on the conductive plate 22 and the plan size of a conductive block 24a disposed on the conductive plate 24.

An OUT terminal 40 of the semiconductor device 1G has a shape as illustrated in FIGS. 23 and 25A, passes through an opening 12a provided at a side 11a of the case 10, and includes an external terminal portion 41 and extension portion 42 respectively arranged outside and inside the case 10. The extension portion 42 includes a branch base portion 42a, and a branch portion 42b and branch portion 42c branching off from the branch base portion 42a. The branch portions 42b and 42c are respectively connected at connection portions 42ba and 42ca thereof to the two conductive blocks 23a. The OUT terminal 40 is therefore electrically connected to the conductive plate 23 via the connection portions 42ba and 42ca and the two conductive blocks 23a connected thereto. The P terminal 50 has a shape as illustrated in FIGS. 23 and 25B, passes through an opening 12c provided at a side 11c of the case 10, and includes an external terminal portion 51 and extension portion 52 respectively arranged outside and inside the case 10. The extension portion 52 is connected at a connection portion 52a thereof to the conductive block 22a. The P terminal 50 is therefore electrically connected to the conductive plate 22 via the connection portion 52a and the conductive block 22a. The N terminal 60 has a shape as illustrated in FIGS. 23 and 25C, passes through the opening 12c provided at the side 11c of the case 10, and includes an external terminal portion 61 and extension portion 62 respectively arranged outside and inside the case 10. The extension portion 62 is connected at a connection portion 62a thereof to the conductive block 24a. The N terminal 60 is therefore electrically connected to the conductive plate 24 via the connection portion 62a and the conductive block 24a.

The P terminal 50 and N terminal 60 are stacked via an insulating member 70 such as an insulating sheet, at least inside the case 10. In the semiconductor device 1G, the P terminal 50, insulating member 70, and N terminal 60 are arranged in this order in a direction away from the insulated circuit board 20G. The P terminal 50 and N terminal 60 are shaped to partially overlap each other in plan view. The P terminal 50 does not exist under the connection portion 62a of the N terminal 60. An opening 60a and opening 70a are formed in the N terminal 60 and insulating member 70, respectively. The connection portion 52a of the P terminal 50 is exposed through the opening 60a of the N terminal 60 and the opening 70a of the insulating member 70. The connection portion 52a of the P terminal 50 is located under the opening 60a of the N terminal 60 and the opening 70a of the insulating member 70. The connection portion 52a of the P terminal 50 is joined to the conductive block 22a by laser welding or another through the opening 60a of the N terminal 60 and the opening 70a of the insulating member 70.

As illustrated in FIG. 23, in plan view, the extension portion 52 of the P terminal 50 and the extension portion 62 of the N terminal 60 extend to the space between the branch portion 42b and branch portion 42c of the extension portion 42 of the OUT terminal 40. In plan view, the connection portions 42ba and 42ca of the branch portions 42b and 42c of the OUT terminal 40, which are connected to the two conductive blocks 23a, are arranged to sandwich the extension portion 52 of the P terminal 50 and the extension portion 62 of the N terminal 60. In plan view, the group of semiconductor elements 30B in the lower arm is arranged between the branch portion 42b and branch portion 42c of the OUT terminal 40.

In the semiconductor device 1G, the external terminal portion 51 of the P terminal 50, the conductive plate 22 to which the P terminal 50 is connected, the conductive plate 24 to which the N terminal 60 is connected, and the external terminal portion 41 of the OUT terminal 40 are arranged in this order in the Y direction.

As in the example illustrated in FIG. 3B, the inside of the case 10 may be filled with a sealing resin to seal the insulated circuit board 20G, and the group of semiconductor elements 30A and the group of semiconductor elements 30B mounted on the insulated circuit board 20G. Note that the illustration of the sealing resin is omitted for convenience in FIG. 23.

In the semiconductor device 1G, out of the P terminal 50 and N terminal 60 stacked via the insulating member 70, the P terminal 50 is located closer to the insulated circuit board 20G. As in this semiconductor device 1G, the arrangement of the P terminal 50 and N terminal 60 in a vertical direction to the insulated circuit board 20G (a direction perpendicular to the X and Y directions) may be reversed from the arrangement of the above-described semiconductor device 1A (FIGS. 3A and 3B) or another.

In the semiconductor device 1G, the relatively high-potential P terminal 50 located closer to the insulated circuit board 20G faces gate wires 34 and relatively low-potential sense emitter wires 35 connected to the group of semiconductor elements 30A in the upper arm. Moreover, in the semiconductor device 1G, the P terminal 50 faces an SP part 90 (the external SP terminal 19 and SP wire 39 described earlier in the first embodiment) connected to the conductive plate 22. Furthermore, in the semiconductor device 1G, the relatively high-potential OUT terminal 40 faces gate wires 37 and relatively low-potential sense emitter wires 38 connected to the group of semiconductor elements 30B in the lower arm.

Therefore, as illustrated in FIG. 26, an insulating member 73 is provided in an area overlapping the gate wires 34, sense emitter wires 35, and SP part 90 in plan view. For example, the insulating member 73 is provided on a surface of the P terminal 50 facing the gate wires 34, sense emitter wires 35, and SP part 90. The presence of this insulating member 73 reduces the effect of potential across the P terminal 50 on the potentials across the gate wires 34 and sense emitter wires 35. In addition, as illustrated in FIG. 26, insulating members 74 are provided in areas overlapping the gate wires 37 and sense emitter wires 38 in plan view. For example, the insulating members 74 are provided on a surface of the OUT terminal 40 facing the gate wires 37 and sense emitter wires 38. The presence of these insulating members 74 reduces the effect of potential across the OUT terminal 40 on the potentials across the gate wires 37 and sense emitter wires 38.

FIG. 26 illustrates an example where the two insulating members 74 are provided. However, an insulating member like a joined form of the two insulating members 74, i.e., a single insulating member 74 may be provided, as long as the insulating member 74 does not overlap the conductive block 24a and others in plan view.

Here, the relationship between the above-described semiconductor device 1G and the elements described in claim 1 of the present application is as follows.

The OUT terminal 40 corresponds to the "first main current wiring member," the branch base portion 42a corresponds to the "branch base portion," the branch portion 42b and branch portion 42c correspond to the "first branch portion and second branch portion", and the extension portion 42 corresponds to the "first extension portion." The P terminal 50 or the N terminal 60 corresponds to the "second main current wiring member."

Here, in the case where the P terminal 50 corresponds to the "second main current wiring member," the extension portion 52 corresponds to the "second extension portion," the conductive plate 22 corresponds to the "conductive plate," the group of semiconductor elements 30A in the upper arm corresponds to the "plurality of semiconductor elements," the collector electrodes 31 of the group of semiconductor elements 30A in the upper arm, which are electrically connected to the conductive plate 22, correspond to the "first electrodes," and the emitter electrodes 32 of the group of semiconductor elements 30A in the upper arm correspond to the "second electrodes." In the case where the P terminal 50 corresponds to the "second main current wiring member" as described above, the N terminal 60 corresponds to the "third main current wiring member" (claim 4).

On the other hand, in the case where the N terminal 60 corresponds to the "second main current wiring member," the extension portion 62 corresponds to the "second extension portion," and the conductive plate 24 corresponds to the "conductive plate." The group of semiconductor elements 30B in the lower arm corresponds to the "plurality of semiconductor elements," the emitter electrodes 32 of the group of semiconductor elements 30B in the lower arm, which are electrically connected to the conductive plate 24, correspond to the "first electrodes," and the collector electrodes 31 of the group of semiconductor elements 30B in the lower arm correspond to the "second electrodes." In the case where the N terminal 60 corresponds to the "second main current wiring member" as described above, the P terminal 50 corresponds to the "third main current wiring member" (claim 4), the insulating member 70 corresponds to the "insulating member" (claim 4), and the opening 60a corresponds to the "first opening" (claim 5).

In addition, the relationship between the above-described semiconductor device 1G and the elements described in claim 10 of the present application is as follows.

The OUT terminal 40 corresponds to the "first main current wiring member," the external terminal portion 41 corresponds to the "first external terminal portion," the extension portion 42 corresponds to the "first extension portion," and the connection portion 42ba and connection portion 42ca respectively correspond to the "first connection portion and second connection portion." The P terminal 50 or the N terminal 60 corresponds to the "second main current wiring member."

Here, in the case where the P terminal 50 corresponds to the "second main current wiring member," the external terminal portion 51 corresponds to the "second external terminal portion," the extension portion 52 corresponds to the "second extension portion," the connection portion 52a corresponds to the "third connection portion," the conductive plate 23 corresponds to the "first conductive plate," the conductive plate 22 corresponds to the "second conductive plate," and the group of semiconductor elements 30B in the lower arm corresponds to the "plurality of first semiconductor elements," and the group of semiconductor elements 30A in the upper arm corresponds to the "plurality of second semiconductor elements."

On the other hand, in the case where the N terminal 60 corresponds to the "second main current wiring member," the external terminal portion 61 corresponds to the "second external terminal portion," the extension portion 62 corresponds to the "second extension portion," the connection portion 62a corresponds to the "third connection portion," the conductive plate 23 corresponds to the "first conductive plate," the conductive plate 24 corresponds to the "second conductive plate," the group of semiconductor elements 30A in the upper arm corresponds to the "plurality of first semiconductor elements," and the group of semiconductor elements 30B in the lower arm corresponds to the "plurality of second semiconductor elements."

In this connection, in the semiconductor device 1G described in this seventh embodiment, the external terminal portion 51 of the P terminal 50 and the external terminal portion 61 of the N terminal 60, which are arranged outside the case 10, may be arranged to overlap each other via an insulating member in plan view. In the semiconductor device 1G, the shapes of the P terminal 50 and N terminal 60 may be modified such that their external terminal portion 51 and external terminal portion 61 are arranged to overlap each other via an insulating member in plan view.

Furthermore, three semiconductor devices 1G, each as described in the seventh embodiment, may be used to form a three-phase voltage inverter circuit with U-phase, V-phase, and W-phase (FIG. 2). In this embodiment, the semiconductor device 1G has been described as a two-in-one package. In the case of such a three-phase voltage inverter circuit, a six-in-one package may be formed by housing functional components for the U-phase, V-phase, and W-phase in a single case.

Eighth Embodiment

Figures 27A, 27B, 27C, 27D:
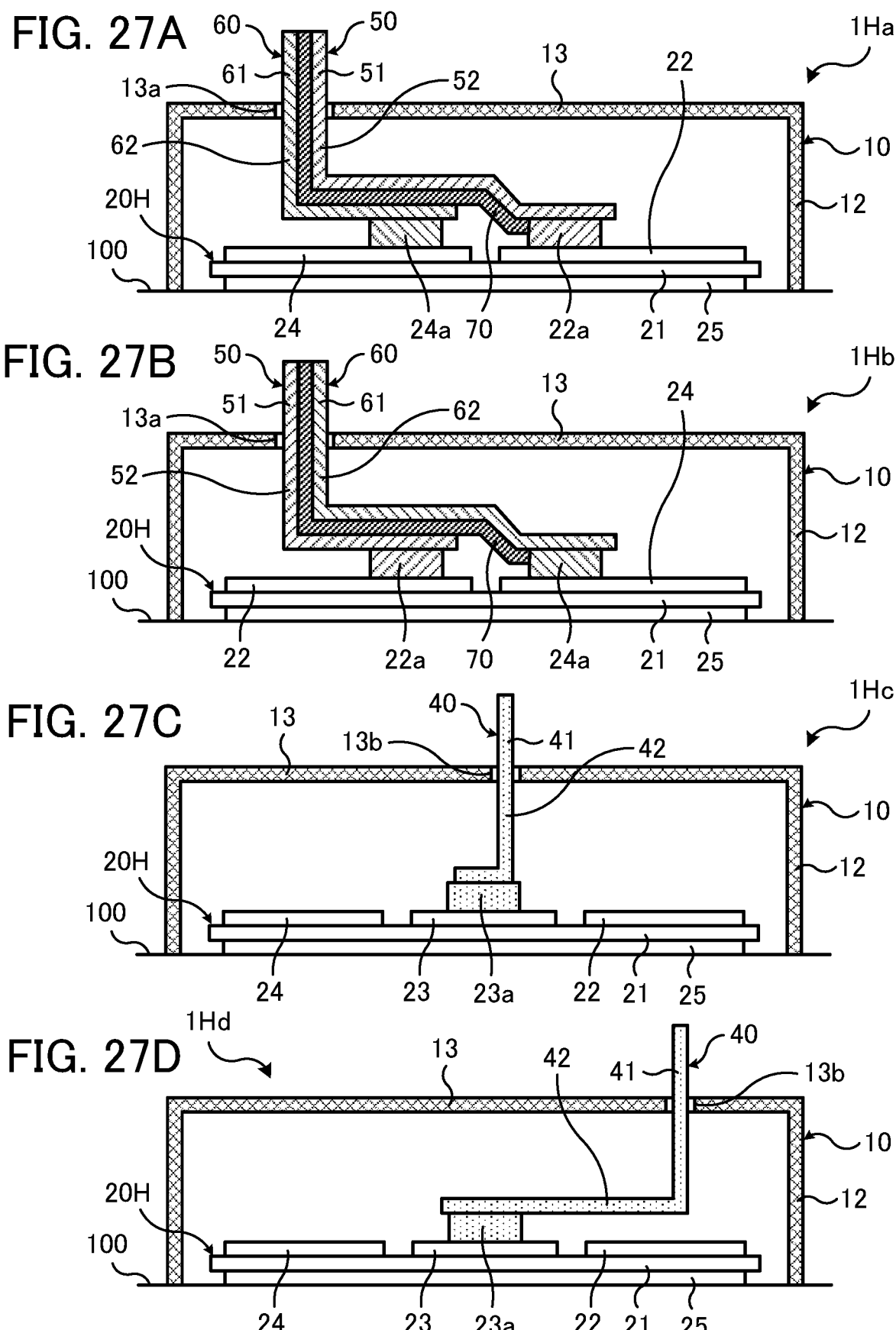
FIGS. 27A to 27D include views for describing example arrangements of main current wiring members provided in a semiconductor device according to an eighth embodiment.

FIGS. 27A to 27D illustrate example arrangements of main current wiring members provided in a semiconductor device according to an eighth embodiment. FIG. 27A is a first example of a schematic main-part sectional view taken along a line passing through a P terminal and N terminal of a semiconductor device. FIG. 27B is a second example of a schematic main-part sectional view taken along a line passing through a P terminal and N terminal of a semiconductor device. FIG. 27C is a first example of a schematic main-part sectional view taken along a line passing through an OUT terminal of a semiconductor device. FIG. 27D is a second example of a schematic main-part sectional view taken along a line passing through an OUT terminal of a semiconductor device.

A semiconductor device 1Ha illustrated in FIG. 27A has a configuration in which a P terminal 50 and an N terminal 60 are drawn out from an opening 13a formed in a lid 13 covering the inside of a case 10 surrounded by a side wall 12 of the case 10. The P terminal 50 includes an external terminal portion 51 arranged outside the case 10 and an extension portion 52 arranged inside the case 10, and is joined to a conductive block 22a disposed on a conductive plate 22 formed on an insulating substrate 21 of an insulated circuit board 20H. The N terminal 60 includes an external terminal portion 61 arranged outside the case 10 and an extension portion 62 arranged inside the case 10, and is joined to a conductive block 24a disposed on a conductive plate 24 formed on the insulating substrate 21 of the insulated circuit board 20H. An insulating member 70 is provided between the P terminal 50 and the N terminal 60. Inside the case 10, the P terminal 50 and N terminal 60 are routed in a state of facing each other via the insulating member 70 so as to form a closed loop for inductance reduction.

In a semiconductor device 1Hb illustrated in FIG. 27B, the arrangement of a P terminal 50 and N terminal 60 is reversed from that of the semiconductor device 1Ha illustrated in FIG. 27A. The P terminal 50 and N terminal 60 are drawn out from an opening 13a formed in a lid 13 covering the inside of a case surrounded by a side wall 12 of the case 10. The P terminal 50 includes an external terminal portion 51 arranged outside the case 10 and an extension portion 52 arranged inside the case 10, and is joined to a conductive block 22a disposed on a conductive plate 22 formed on an insulating substrate 21 of an insulated circuit board 20H. The N terminal 60 includes an external terminal portion 61 arranged outside the case 10 and an extension portion 62 arranged inside the case 10, and is joined to a conductive block 24a disposed on a conductive plate 24 formed on the insulating substrate 21 of the insulated circuit board 20H. An insulating member 70 is provided between the P terminal 50 and the N terminal 60. Inside the case 10, the P terminal 50 and N terminal 60 are routed in a state of facing each other via the insulating member 70 so as to form a closed loop for inductance reduction.

As in each of the semiconductor device 1Ha and semiconductor device 1Hb, the P terminal 50 and N terminal 60 may be drawn out from the lid 13 of the case 10, not from the side wall 12 of the case 10. The position at which the P terminal 50 and N terminal 60 are drawn out from the case 10 may be appropriately changed according to the usage of each of the semiconductor device 1Ha and semiconductor device 1Hb (such as an installation position within a device or positional relationship with other components such as capacitors).

Furthermore, a semiconductor device 1Hc illustrated in FIG. 27C has a configuration in which an OUT terminal 40 is drawn out from an opening 13b formed in a lid 13 of a case 10. The OUT terminal 40 includes an external terminal portion 41 arranged outside the case 10 and an extension portion 42 arranged inside the case 10, and is joined to a conductive block 23a disposed on a conductive plate 23 formed on an insulating substrate 21 of an insulated circuit board 20H. As with the above-described P terminal 50 and N terminal 60, the OUT terminal 40 may be configured to be drawn out from the lid 13 of the case 10, not from the side wall 12 of the case 10. As illustrated in a semiconductor device 1Hd of FIG. 27D, the OUT terminal 40 may be routed inside the case 10 to match a drawn-out position from the lid 13. The drawn-out position at which the OUT terminal 40 is drawn out from the case 10 may appropriately be changed according to the usage of each of the semiconductor device 1Hc and semiconductor device 1Hd (such as an installation position within a device or positional relationship with other components such as capacitors).

With regard to the semiconductor devices 1A, 1B, 1C, 1D, 1Da, 1E, 1F, and 1G described earlier in the first to seventh embodiments, it is also possible to adopt a configuration in which the P terminal 50 and N terminal 60 are drawn out from the lid 13 of the case 10, as in the examples illustrated in FIGS. 27A and 27B. In addition, with regard to the semiconductor devices 1A, 1B, 1C, 1D, 1Da, 1E, 1F, and 1G described earlier in the first to seventh embodiments, it is also possible to adopt a configuration in which the OUT terminal 40 is drawn out from the lid 13 of the case 10, as in the examples illustrated in FIGS. 27C and 27D.

Figure 28:
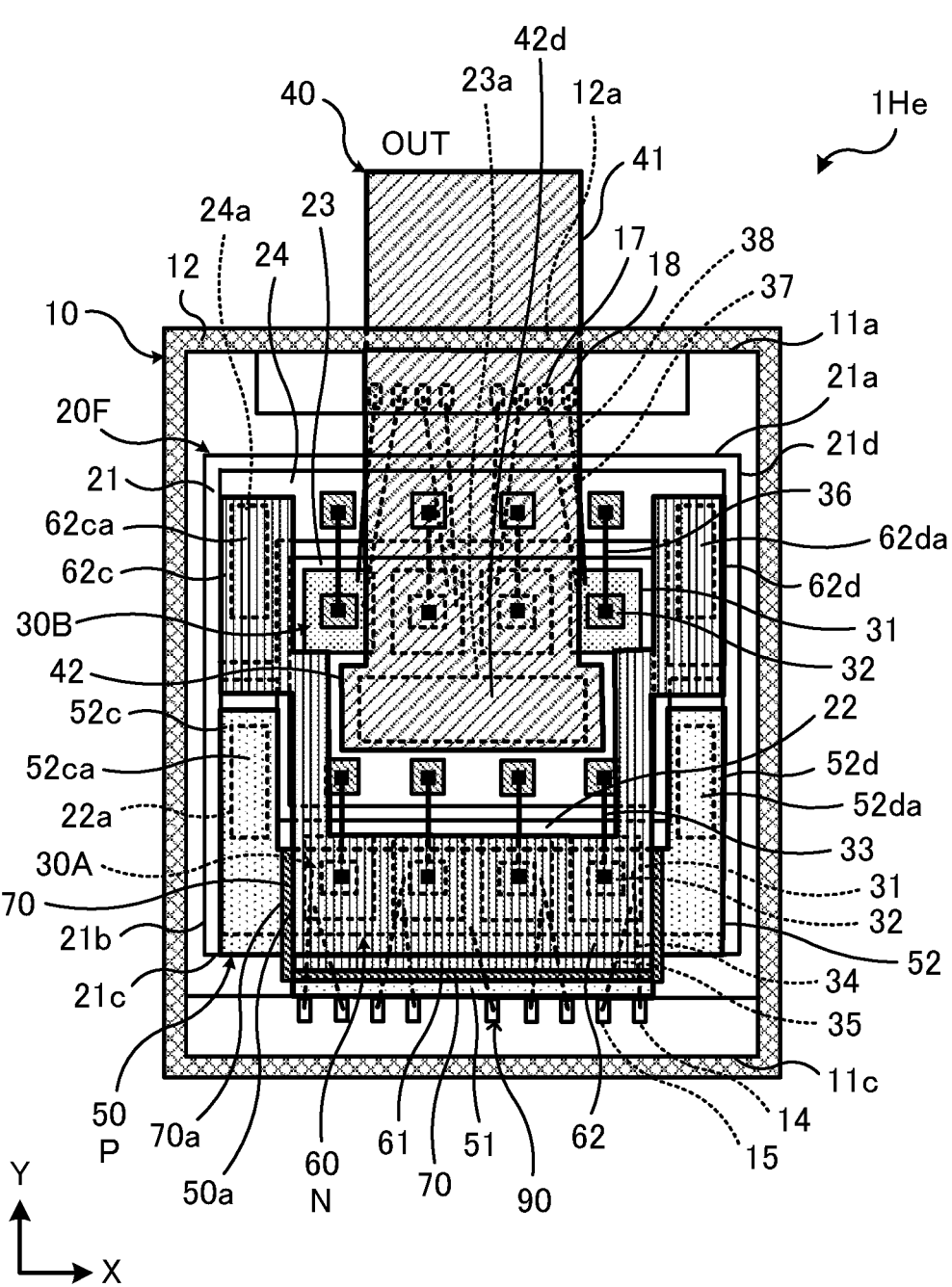
FIG. 28 is a view for describing a first example of a semiconductor device according to the eighth embodiment.

FIG. 28 is a view for describing a first example of a semiconductor device according to the eighth embodiment. FIG. 28 is a main-part plan view schematically illustrating the example of the semiconductor device.

A semiconductor device 1He illustrated in FIG. 28 is an example in which the semiconductor device 1F (FIG. 19) described earlier in the sixth embodiment is modified such that the P terminal 50 and N terminal 60 are routed inside the case 10 so that their external terminal portions 51 and 61 are drawn out to the outside of the case 10 in a direction away from an insulated circuit board 20F (an upward direction perpendicular to the drawing sheet), as in the example of FIG. 27B. Note that the illustration of a lid 13 of the case 10, which is illustrated in FIG. 27B, is omitted for convenience in FIG. 28. The P terminal 50 and N terminal 60 may be arranged as illustrated in this semiconductor device 1He.

Figures 29A, 29B:
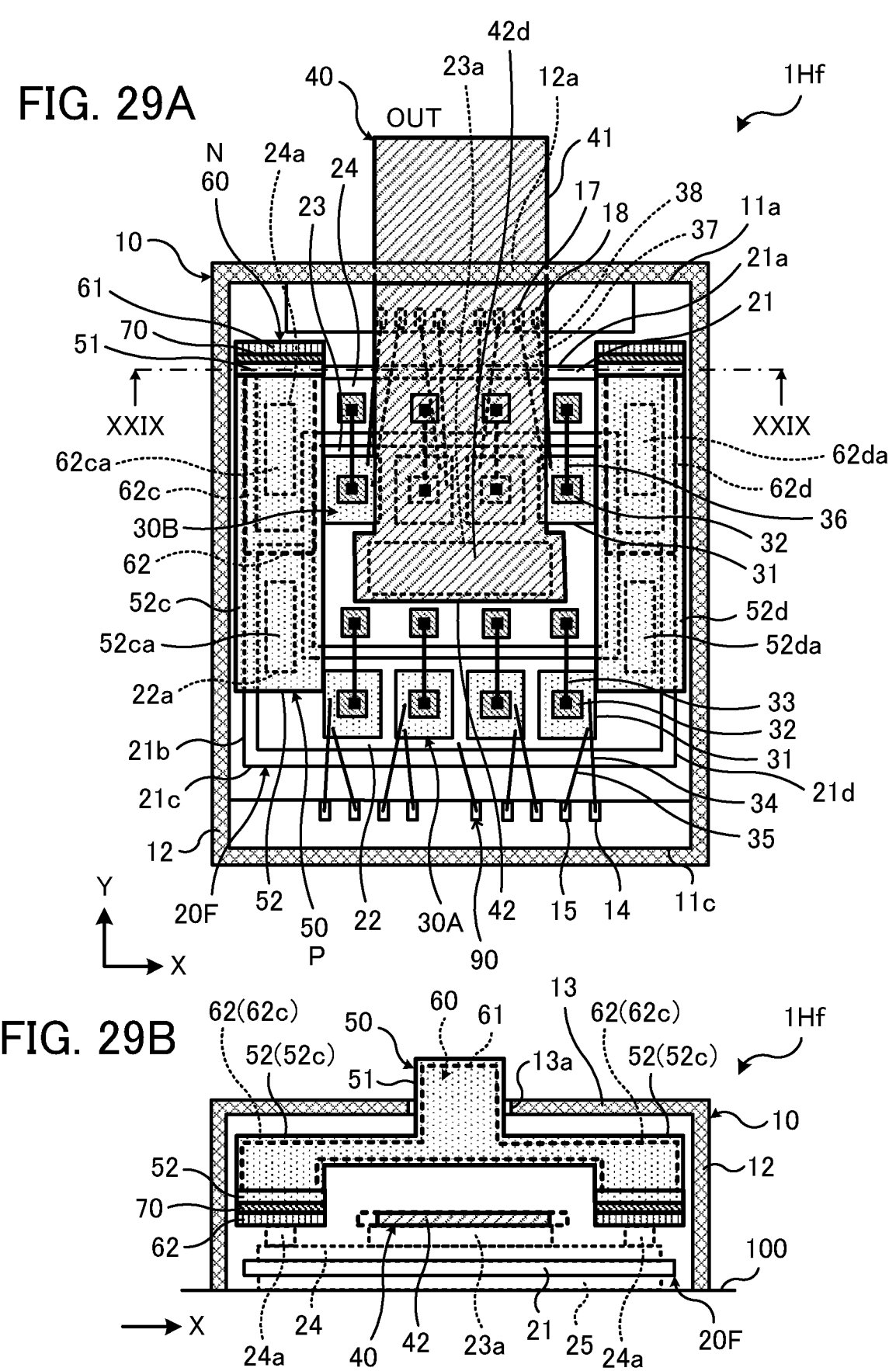
FIGS. 29A and 29B includes views for describing a second example of a semiconductor device according to the eighth embodiment.

FIGS. 29A and 29B are views for describing a second example of a semiconductor device according to the eighth embodiment. FIG. 29A is a main-part plan view schematically illustrating the example of the semiconductor device. FIG. 29B is a schematic sectional view taken along a XXIX-XXIX line of FIG. 29A.

A semiconductor device 1Hf illustrated in FIGS. 29A and 29B is an example where the semiconductor device 1F described earlier in the sixth embodiment (FIG. 19) is modified such that a linear P terminal 50 and a linear N terminal 60 are arranged on both sides of the OUT terminal 40 in plan view. As in the example of FIG. 27A, the P terminal 50 and N terminal 60 of the semiconductor device 1Hf are routed inside the case 10 so that their external terminal portions 51 and 61 are drawn out to the outside of the case 10 in a direction away from an insulated circuit board 20F (an upward direction perpendicular to the drawing sheet). Note that the illustration of a lid 13 of the case 10, which is illustrated in FIG. 27A, is omitted for convenience in FIG. 29A. As illustrated in FIG. 29A, the linear P terminal 50 and linear N terminals 60 arranged on both sides of the OUT terminal 40 have shapes as illustrated in FIG. 29B, where their extension portions 52 and 62 straddle the OUT terminal 40, and their external terminal portions 51 and 61 are drawn out from an opening 13a formed in the lid 13 of the case 10. The P terminal 50 and N terminal 60 may be arranged as illustrated in this semiconductor device 1Hf.

Furthermore, by arranging the linear P terminal 50 and the linear N terminal 60 on both sides of the OUT terminal 40 and appropriately setting their drawn-out positions as in the semiconductor device 1Hf, it is possible to reduce the sizes of the P terminal 50 and N terminal 60. In addition, since the P terminal 50 and N terminal 60 do not face gate wires 34 or sense emitter wires 35, it is possible to eliminate the need of an insulating member.

Figure 30:
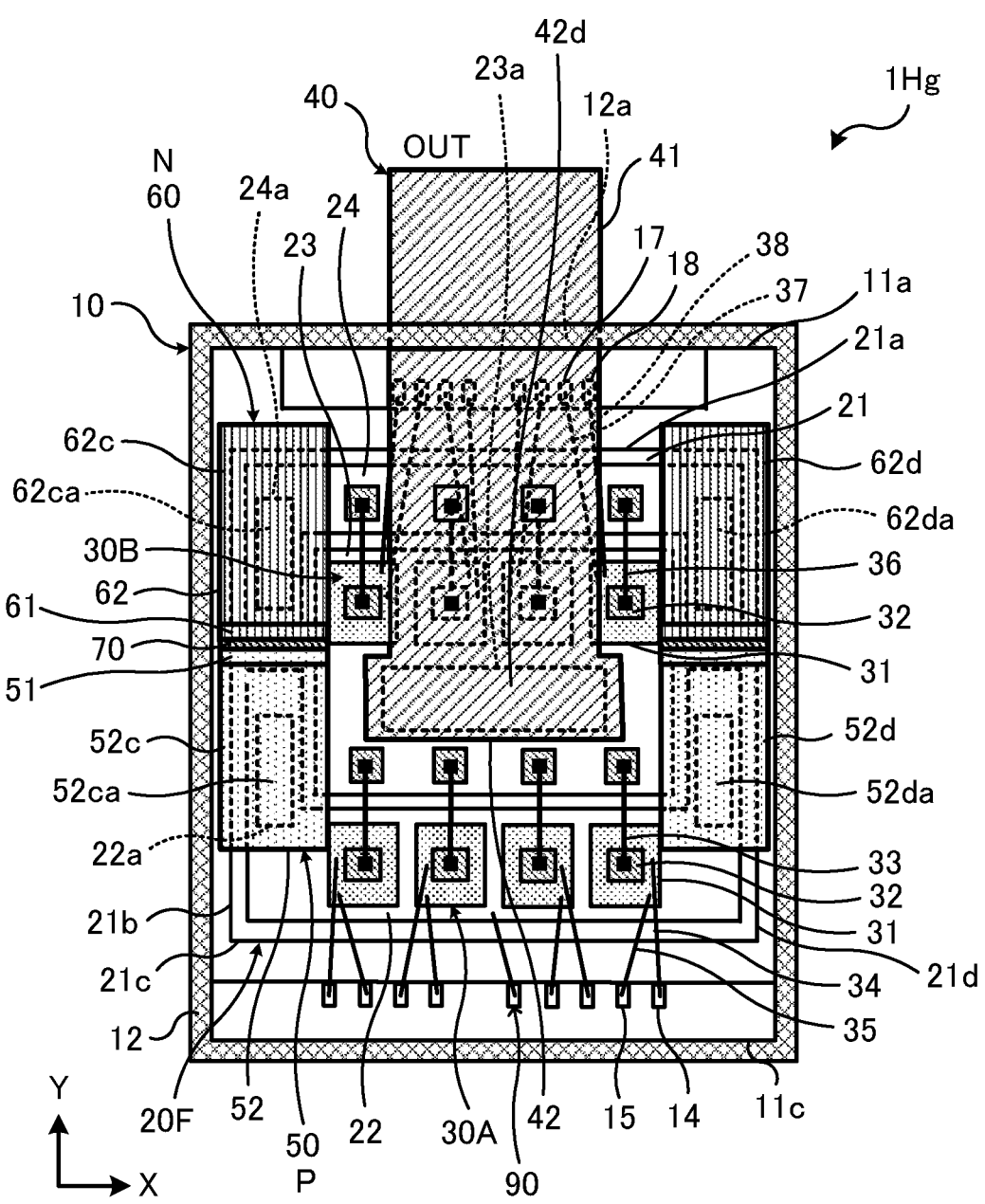
FIG. 30 is a view for describing a third example of a semiconductor device according to the eighth embodiment.

FIG. 30 is a view for describing a third example of a semiconductor device according to the eighth embodiment. FIG. 30 is a main-part plan view schematically illustrating the example of the semiconductor device.

A semiconductor device 1Hg illustrated in FIG. 30 differs from the above-described semiconductor device 1Hf (FIGS. 29A and 29B) in that the semiconductor device 1Hg has a configuration in which a P terminal 50 and an N terminal 60 are arranged so as not to overlap each other in plan view. With this arrangement of the P terminal 50 and N terminal 60, it is possible to eliminate the need to route the P terminal 50 and N terminal 60 inside a case and to reduce the sizes of the P terminal 50 and N terminal 60, as well as to eliminate the need to arrange the P terminal 50 and N terminal 60 such as to face gate wires 34 and sense emitter wires 35. The P terminal 50 and N terminal 60 have shapes as in the example of FIG. 29B, where they straddle the OUT terminal 40 and are drawn out from an opening 13a formed in a lid 13 of the case 10. The P terminal 50 and N terminal 60 may be arranged as illustrated in this semiconductor device 1Hg.

FIGS. 28 to 30 illustrate a configuration in which the P terminal 50 and N terminal 60 are drawn out from the lid 13 of the case 10. Similarly, the OUT terminal 40 may be configured to be drawn out from the lid 13 of the case 10, as in the examples of FIGS. 27C and 27D. In the case where the extension portion 42 of the OUT terminal 40 has branch portions 42b and 42c, and the extension portion 52 of the P terminal 50 and the extension portion 62 of the N terminal 60 are sandwiched between the branch portions 42b and 42c, the OUT terminal 40 may be shaped to straddle the P terminal 50 and N terminal 60 and be drawn out from the lid 13 of the case 10, as in the example of FIG. 29B, depending on the position at which the external terminal portion 41 is drawn out from the lid 13 of the case 10.

Furthermore, three semiconductor devices 1He, 1Hf, or 1Hg, each as described in the eighth embodiment, may be used to form a three-phase voltage inverter circuit with U-phase, V-phase, and W-phase (FIG. 2). In this embodiment, each semiconductor device 1He, 1Hf, and 1Hg has been described as a two-in-one package. In the case of such a three-phase voltage inverter circuit, a six-in-one package may be formed by housing functional components for the U-phase, V-phase, and W-phase in a single case.

With regard to the semiconductor devices 1A, 1B, 1C, 1D, 1Da, 1E, 1F, and 1G described earlier in the first to seventh embodiments, it is also possible to adopt a configuration in which the P terminal 50 and N terminal 60 are drawn out from the lid 13 of the case 10. It is also possible to adopt a configuration in which the OUT terminal 40 is drawn out from the lid 13 of the case 10.

According to one aspect, it is possible to achieve a high-performance semiconductor device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A semiconductor device, comprising:
  a plurality of semiconductor elements each including a first electrode on a first principal surface thereof and a second electrode on a second principal surface thereof opposite to the first principal surface;

a conductive plate electrically connected to the first electrodes of the plurality of semiconductor elements;
  a case having one side and another side opposite to the one side, and housing the plurality of semiconductor elements and the conductive plate;
  a first main current wiring member extending so as to be disposed inside and outside the case, the first main current wiring member including a first extension portion including a branch base portion extending from outside of the case across the one side of the case toward inside of the case and a first branch portion and a second branch portion branching off from the branch base portion, the first and second branch portions being electrically connected to the second electrodes of the plurality of semiconductor elements; and
  a second main current wiring member extending across the case so as to be disposed inside and outside the case, the second main wiring member including a second extension portion sandwiched between the first branch portion and the second branch portion inside the case the second main wiring member being electrically connected to the conductive plate.

2. The semiconductor device according to claim 1, wherein
  the second extension portion extends across the another side of the case toward inside the case so as to be disposed between the first branch portion and the second branch portion inside the case, and
  the plurality of semiconductor elements are located between the first branch portion and the second branch portion in a plan view of the semiconductor device.

3. The semiconductor device according to claim 2, wherein in the plan view, at least one of the plurality of semiconductor elements is located between the first branch portion and the second main current wiring member, and at least another one of the plurality of semiconductor elements is located between the second branch portion and the second main current wiring member.

4. The semiconductor device according to claim 2, further comprising a third main current wiring member facing a principal surface of the second main current wiring member via an insulating member and extending from outside of the case toward the inside of the case.

5. The semiconductor device according to claim 4, wherein the second main current wiring member includes a first opening so that the third main current wiring member is exposed through the first opening.

6. The semiconductor device according to claim 5, wherein the third main current wiring member has a potential lower than a potential of the second main current wiring member.

7. The semiconductor device according to claim 2, further comprising a third main current wiring member facing a principal surface of the first main current wiring member via an insulating member and extending from outside of the case toward the inside of the case.

8. The semiconductor device according to claim 7, wherein the first main current wiring member includes a second opening so that the third main current wiring member is exposed through the second opening.

9. The semiconductor device according to claim 8, wherein the third main current wiring member has a potential lower than a potential of the first main current wiring member.

10. A semiconductor device, comprising:
  a substrate;
  a case in which the substrate is disposed;

a plurality of first semiconductor elements disposed inside the case;

a plurality of second semiconductor elements disposed inside the case;

a first conductive plate disposed on the substrate and electrically connected to the plurality of first semiconductor elements;

a second conductive plate disposed on the substrate and electrically connected to the plurality of second semiconductor elements;

a first main current wiring member including a first external terminal portion that is disposed outside the case, and further including a first extension portion, a first connection portion, and a second connection portion that are disposed inside the case, the first extension portion connecting the first external terminal portion to the first connection portion and to the second connection portion, the first and second connection portions being electrically connected to the first conductive plate; and a second main current wiring member including a second external terminal portion that is disposed outside the case, and further including a second extension portion and a third connection portion that are disposed inside the case, the second extension portion connecting the second external terminal portion to the third connection portion, the third connection portion being electrically connected to the second conductive plate, wherein the second extension portion is disposed between the first connection portion and the second connection portion, and a power supply voltage is applied to one of the first main current wiring member and the second main current wiring member, so that an output current flows through the other one of the first main current wiring member and the second main current wiring member.

11. The semiconductor device according to claim 10, wherein the substrate has a first side, a second side, a third side, and a fourth side in a plan view of the semiconductor device, the first and third sides facing each other and the second and fourth sides facing each other, the case has two opposite sides, the two opposite sides of the case sandwiching and being parallel to the first and third sides of the substrate in the plan view, one of the two opposite sides being located adjacent to the first side of the substrate, the other one of the two opposite sides being located adjacent to the third side of the substrate, the first connection portion and the second connection portion sandwich the second extension portion in a first direction parallel to the first side, and the second conductive plate and the first conductive plate are arranged in a second direction parallel to the second side and perpendicular to the first direction.

12. The semiconductor device according to claim 11, wherein the plurality of first semiconductor elements are arranged in the first direction, sandwiched between the first connection portion and the second connection portion.

13. The semiconductor device according to claim 11, further comprising:

a third conductive plate disposed on the substrate; and a third main current wiring member including a third external terminal portion that is disposed outside the case, and further including a third extension portion, a fourth connection portion, and a fifth connection portion that are disposed inside the case, the third extension portion connecting the third external terminal portion to the fourth connection portion and to the fifth connection portion, the fourth and fifth connection portions being electrically connected to the third conductive plate, wherein the plurality of first semiconductor elements are disposed on the first conductive plate, the plurality of second semiconductor elements are disposed on the second conductive plate, the semiconductor device further includes first wires respectively electrically connecting the plurality of first semiconductor elements to the second conductive plate, and second wires respectively electrically connecting the plurality of second semiconductor elements to the third conductive plate, the case includes a first opening and a second opening facing each other, the first and third main current wiring members passing through the first opening so that the first and third external terminal portions are exposed outside the case, the second main current wiring member passing through the second opening so that the second external terminal portion is exposed outside the case, the third external terminal portion, the third conductive plate, the first conductive plate, and the second external terminal portion are arranged in this order in the second direction from the first opening to the second opening, a high-potential power supply voltage is supplied to the first external terminal portion, a low-potential power supply voltage is supplied to the third external terminal portion, and an output current is output from the second external terminal portion.

14. The semiconductor device according to claim 13, further comprising an insulating member disposed between the first main current wiring member and the third main current wiring member in a thickness direction orthogonal to the first principal surface.

15. The semiconductor device according to claim 14, further comprising conductive blocks disposed on the third conductive plate, wherein the first main current wiring member includes a third opening and a fourth opening, the insulating member includes a fifth opening and a sixth opening respectively located inside the third opening and the fourth opening so that the fourth connection portion and the fifth connection portion are respectively exposed through the fifth opening and the sixth opening, and the fourth and fifth connection portions are respectively welded to the conductive blocks so that the fourth and fifth connection portions are electrically connected to the third conductive plate via the conductive blocks.

16. The semiconductor device according to claim 14, further comprising:

a plurality of first sense emitter wires respectively electrically connected to emitters of the plurality of first semiconductor elements;

a plurality of second sense emitter wires respectively electrically connected to emitters of the plurality of second semiconductor elements;

a plurality of first gate wires respectively electrically connected to gates of the plurality of first semiconductor elements;

a plurality of second gate wires respectively electrically connected to gates of the plurality of second semiconductor elements;

first external sense emitter terminals respectively electrically connected to the plurality of first sense emitter wires;

second external sense emitter terminals respectively electrically connected to the plurality of second sense emitter wires;

first external gate terminals respectively electrically connected to the plurality of first gate wires; and second external gate terminals respectively electrically connected to the plurality of second gate wires, wherein the plurality of second sense emitter wires and the plurality of second gate wires are located directly under the third extension portion, and the plurality of first sense emitter wires and the plurality of first gate wires are located directly under the second extension portion.

17. The semiconductor device according to claim 13, further comprising:

a plurality of third semiconductor elements disposed inside the case;

a plurality of fourth semiconductor elements disposed inside the case;

a fourth conductive plate disposed on the substrate and electrically connected to the plurality of third semiconductor elements;

a fifth conductive plate disposed on the substrate and electrically connected to the plurality of fourth semiconductor elements;

a sixth conductive plate disposed on the substrate;

a fourth main current wiring member including a fourth external terminal portion that is disposed outside the case, and further including a fourth extension portion, a sixth connection portion, and a seventh connection portion that are disposed inside the case, the fourth extension portion connecting the fourth external terminal portion to the sixth connection portion and to the seventh connection portion, the sixth and seventh connection portions being electrically connected to the fourth conductive plate;

a fifth main current wiring member including a fifth external terminal portion that is disposed outside the case, and further including a fifth extension portion and an eighth connection portion that are disposed inside the case, the fifth extension portion connecting the fifth external terminal portion to the eighth connection portion, the eighth connection portion being electrically connected to the fifth conductive plate;

a sixth main current wiring member including a sixth external terminal portion that is disposed outside the case, and further including a sixth extension portion, a ninth connection portion, and a tenth connection portion that are disposed inside the case, the sixth extension portion connecting the sixth external terminal portion to the ninth connection portion and to the tenth connection portion, the ninth and tenth connection portions being electrically connected to the sixth conductive plate, wherein the sixth connection portion and the seventh connection portion sandwich the fifth extension portion, the plurality of third semiconductor elements are disposed on the fourth conductive plate, the plurality of fourth semiconductor elements are disposed on the fifth conductive plate, the semiconductor device further includes third wires respectively electrically connecting the plurality of third semiconductor elements to the fifth conductive plate, fourth wires respectively electrically connecting the plurality of fourth semiconductor elements to the sixth conductive plate, the case includes a seventh opening and eighth opening facing each other, the fourth main current wiring member passing through the seventh opening so that the fourth external terminal portion is exposed outside the case, the fifth and sixth main current wiring members passing through the eighth opening so that the fifth and sixth external terminal portions are exposed outside the case, the sixth external terminal portion, the sixth conductive plate, the fourth conductive plate, and the fifth external terminal portion are arranged in this order in the second direction from the eighth opening to the seventh opening, a high-potential power supply voltage is supplied to the fourth external terminal portion, a low-potential power supply voltage is supplied to the sixth external terminal portion, an output current is output from the fifth external terminal portion, the first extension portion and the fourth extension portion are continuous with each other, and the third extension portion and the sixth extension portion are continuous with each other.

18. The semiconductor device according to claim 11, further comprising:

a third conductive plate disposed on the substrate; and a third main current wiring member including a third external terminal portion that is disposed outside the case, and further including a third extension portion and a fourth connection portion that are disposed inside the case, the third extension portion connecting the third external terminal portion to the fourth connection portion, the fourth connection portion being electrically connected to the third conductive plate, wherein the plurality of first semiconductor elements are disposed on the first conductive plate, the plurality of second semiconductor elements are disposed on the second conductive plate, the semiconductor device further includes first wires respectively electrically connecting the plurality of first semiconductor elements to the third conductive plate, and second wires respectively electrically connecting the plurality of second semiconductor elements to the first conductive plate, the case includes a first opening and a second opening facing each other, the first main current wiring member passing through the first opening so that the first external terminal portion is exposed outside the case, the second and third main current wiring members passing through the second opening so that the second and third external terminal portions are exposed outside the case, the third external terminal portion, the third conductive plate, the first conductive plate, and the first external terminal portion are arranged in this order in the second direction from the second opening to the first opening, a high-potential power supply voltage is supplied to the second external terminal portion, a low-potential power supply voltage is supplied to the third external terminal portion, and an output current is output from the first external terminal portion.

19. The semiconductor device according to claim 18, further comprising an insulating member disposed between the second main current wiring member and the third main current wiring member in the thickness direction orthogonal to the first principal surface.

20. The semiconductor device according to claim 19, further comprising a conductive block disposed on the third conductive plate, wherein the second main current wiring member includes a third opening, the insulating member includes a fourth opening located inside the third opening so that the fourth connection portion is exposed through the fourth opening, the fourth connection portion is welded to the conductive block so that the fourth connection portion is electrically connected to the third conductive plate via the conductive block.

21. The semiconductor device according to claim 19, further comprising:

a plurality of first sense emitter wires respectively electrically connected to emitters of the plurality of first semiconductor elements;

a plurality of second sense emitter wires respectively electrically connected to emitters of the plurality of second semiconductor elements;

a plurality of first gate wires respectively electrically connected to gates of the plurality of first semiconductor elements;

a plurality of second gate wires respectively electrically connected to gates of the plurality of second semiconductor elements;

first external sense emitter terminals respectively electrically connected to the plurality of first sense emitter wires;

second external sense emitter terminals respectively electrically connected to the plurality of second sense emitter wires;

first external gate terminals respectively electrically connected to the plurality of first gate wires; and second external gate terminals respectively electrically connected to the plurality of second gate wires, wherein the plurality of first sense emitter wires and the plurality of first gate wires are located directly under the third extension portion, and the plurality of second sense emitter wires and the plurality of second gate wires are located directly under the first extension portion.

22. The semiconductor device according to claim 19, wherein the first conductive plate includes a first output conductive pattern on which at least one first semiconductor element of the plurality of first semiconductor elements is disposed and a second output conductive pattern on which one or more remaining first semiconductor elements of the plurality of first semiconductor elements are disposed, the first and second output conductive patterns being separate from each other, the first connection portion is electrically connected to the first output conductive pattern, the second connection portion is electrically connected to the second output conductive pattern, and part of the second conductive plate, part of the third conductive plate, the second extension portion, the third extension portion, the third connection portion, and the fourth connection portion are located between the first output conductive pattern and the second output conductive pattern.

23. The semiconductor device according to claim 11, further comprising:

a third conductive plate disposed on the substrate; and a third main current wiring member including a third external terminal portion that is disposed outside the case, and further including a third extension portion and a fourth connection portion that are disposed inside the case, the third extension portion connecting the third external terminal portion to the fourth connection portion, the fourth connection portion being electrically connected to the third conductive plate, wherein the plurality of first semiconductor elements are disposed on the second conductive plate, the plurality of second semiconductor elements are disposed on the third conductive plate, the semiconductor device further includes first wires respectively electrically connecting the plurality of first semiconductor elements to the first conductive plate, and second wires respectively electrically connecting the plurality of second semiconductor elements to the second conductive plate, the case includes a first opening and a second opening facing each other, the first and third main current wiring members passing through the first opening so that the first and third external terminal portions are exposed outside the case, the second main current wiring member passing through the second opening so that the second external terminal portion is exposed outside the case, the third external terminal portion, the third conductive plate, the first conductive plate, and the second external terminal portion are arranged in this order in the second direction from the first opening to the second opening, a high-potential power supply voltage is supplied to the third external terminal portion, a low-potential power supply voltage is supplied to the first external terminal portion, and an output current is output from the second external terminal portion.

24. The semiconductor device according to claim 23, further comprising a first insulating member disposed between the first main current wiring member and the third main current wiring member in the thickness direction orthogonal to the first principal surface, a second insulating member disposed between the third main current wiring member and the plurality of second semiconductor elements, and a third insulating member disposed between the second main current wiring member and the plurality of first semiconductor elements.

25. The semiconductor device according to claim 24, further comprising a conductive block disposed on the third conductive plate, wherein the first main current wiring member includes a third opening, the first insulating member includes a fourth opening located inside the third opening so that the fourth connection portion is exposed through the fourth opening, and the fourth connection portion is welded to the conductive block so that the fourth connection portion is electrically connected to the third conductive plate via the conductive block.

26. The semiconductor device according to claim 24, further comprising:

a plurality of first sense emitter wires respectively electrically connected to emitters of the plurality of first semiconductor elements;

a plurality of second sense emitter wires respectively electrically connected to emitters of the plurality of second semiconductor elements;

a plurality of first gate wires respectively and electrically connected to gates of the plurality of first semiconductor elements;

a plurality of second gate wires respectively electrically connected to gates of the plurality of second semiconductor elements;

first external sense emitter terminals respectively electrically connected to the plurality of first sense emitter wires;

second external sense emitter terminals respectively electrically connected to the plurality of second sense emitter wires;

first external gate terminals respectively electrically connected to the plurality of first gate wires; and second external gate terminals respectively electrically connected to the plurality of second gate wires, wherein the plurality of first sense emitter wires and the plurality of first gate wires are located directly under the third insulating member, and the plurality of second sense emitter wires and the plurality of second gate wires are located directly under the second insulating member.

* * * * *